(12) United States Patent
Xiong et al.

(10) Patent No.: US 12,284,660 B2
(45) Date of Patent: *Apr. 22, 2025

(54) ENHANCEMENT ON SCHEDULING AND HARQ-ACK FEEDBACK FOR URLLC, MULTIPLEXING SCHEME FOR CONTROL/DATA CHANNEL AND DM-RS FOR NR, AND ACTIVATION MECHANISM, SCHEDULING ASPECTS, AND SYNCHRONIZATION SIGNAL (SS) BLOCKS FOR NEW RADIO (NR) SYSTEM WITH MULTIPLE BANDWIDTH PARTS (BWPS)

(71) Applicant: Apple Inc., Cupertino, CA (US)

(72) Inventors: Gang Xiong, Portland, OR (US); Jeongho Jeon, San Jose, CA (US); Joonyoung Cho, Portland, OR (US); Debdeep Chatterjee, San Jose, CA (US); Sergey Panteleev, Nizhny Novgorod (RU); Yushu Zhang, Beijing (CN)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/477,064

(22) Filed: Sep. 28, 2023

(65) Prior Publication Data
US 2024/0032055 A1 Jan. 25, 2024

Related U.S. Application Data

(63) Continuation of application No. 16/466,446, filed as application No. PCT/US2018/037316 on Jun. 13, 2018, now Pat. No. 11,832,264.
(Continued)

(51) Int. Cl.
*H04W 52/02* (2009.01)
*H04L 5/00* (2006.01)
(Continued)

(52) U.S. Cl.
CPC ............ *H04W 72/23* (2023.01); *H04L 5/0053* (2013.01); *H04W 84/042* (2013.01); *H04W 88/08* (2013.01)

(58) Field of Classification Search
CPC ... H04L 5/0092; H04L 1/1812; H04L 1/1825; H04L 1/1861; H04L 27/26025;
(Continued)

(56) References Cited

U.S. PATENT DOCUMENTS 11,064,477 B2 * 7/2021 Li ..................... H04W 72/51
11,290,919 B2 * 3/2022 Zhang ................ H04W 76/28
(Continued)

FOREIGN PATENT DOCUMENTS

CN     101521937 A     9/2009
CN     102244631 A     11/2011
(Continued)

OTHER PUBLICATIONS

Ericsson; Way Forward on bandwidth part for efficient wideband operation in NR; 3GPP TSG-RAN WG1 #89; R1-1708902; May 15, 2017.
(Continued)

*Primary Examiner* — Edan Orgad
*Assistant Examiner* — Vanneilian Lalchinthang
(74) *Attorney, Agent, or Firm* — Eschweiler & Potashnik, LLC; Matthew W Glause

(57) ABSTRACT

An apparatus, method, system and machine-readable medium. The apparatus may be an apparatus of a New Radio (NR) gNodeB or of a NR User Equipment (UE), and may include a memory and processing circuitry. The processing circuitry for the apparatus of the gNodeB is to: configure a plurality of bandwidth parts (BWPs) associated with respective numerologies; determine a physical downlink control channel (PDCCH) including downlink control information
(Continued)

(DCI), the DCI including information on scheduled resources including BWP index for a data transmission to or from a User Equipment (UE), the data transmission to occupy one of the plurality of BWPs or multiple ones of the plurality of BWPs; encode the PDCCH for transmission; and process the data transmission based on the DCI. The apparatus of the NR UE is to: process a physical downlink control channel (PDCCH) from a NR gNodeB, the PDCCH including downlink control information (DCI) indicating scheduled resources for a data transmission to or from the UE, the data transmission to occupy one or multiple ones of a plurality of BWPs configured by the gNodeB; and process the data transmission based on the DCI.

20 Claims, 25 Drawing Sheets

Related U.S. Application Data

(60) Provisional application No. 62/520,878, filed on Jun. 16, 2017, provisional application No. 62/519,705, filed on Jun. 14, 2017, provisional application No. 62/518,848, filed on Jun. 13, 2017.

(51) Int. Cl.
*H04W 72/23* (2023.01)
*H04W 74/00* (2009.01)
*H04W 84/04* (2009.01)
*H04W 88/08* (2009.01)

(58) Field of Classification Search
CPC ... H04L 5/0007; H04L 5/0012; H04L 5/0048; H04L 5/0053; H04L 5/0055; H04L 2001/125; H04L 5/0044; H04W 72/23; H04W 72/14; H04W 88/08; H04W 16/10; H04W 72/231; H04W 72/232; H04W 84/042; Y02D 30/70
USPC ........................................................ 370/329
See application file for complete search history.

(56) References Cited

U.S. PATENT DOCUMENTS

| | | | |
|---|---|---|---|
| 2012/0294153 A1 | 11/2012 | Lee et al. | |
| 2017/0367046 A1* | 12/2017 | Papasakellariou | H04L 5/0053 |
| 2018/0131430 A1 | 5/2018 | Gao et al. | |
| 2018/0183551 A1* | 6/2018 | Chou | H04W 72/044 |
| 2018/0198590 A1* | 7/2018 | Lee | H04L 1/1671 |
| 2018/0199343 A1* | 7/2018 | Deogun | H04L 5/0044 |
| 2018/0220398 A1* | 8/2018 | John Wilson | H04B 7/0695 |
| 2018/0279218 A1* | 9/2018 | Park | H04W 48/20 |
| 2018/0279360 A1* | 9/2018 | Park | H04W 72/23 |
| 2019/0103941 A1* | 4/2019 | Seo | H04L 1/0072 |
| 2019/0150110 A1* | 5/2019 | Ko | H04W 56/00 370/350 |
| 2019/0349046 A1* | 11/2019 | Liu | H04B 7/0626 |
| 2020/0322945 A1* | 10/2020 | Futaki | H04W 72/04 |

FOREIGN PATENT DOCUMENTS

| | | |
|---|---|---|
| CN | 102263583 A | 11/2011 |
| WO | 2012/130180 A1 | 10/2012 |
| WO | 2014163302 A1 | 10/2014 |

OTHER PUBLICATIONS

NTT Docomo, Inc.; New Radio (NR) Access Technology; 3GPP TSG RAN meeting #76; RP-171137; Jun. 5, 2017.
Non-Final Office Action dated Jun. 8, 2020 in connection with U.S. Appl. No. 16/466,446.
Final Office Action dated Mar. 10, 2021 in connection with U.S. Appl. No. 16/466,446.
Notice of Allowance dated Jul. 13, 2023 in connection with U.S. Appl. No. 16/466,446.
European Extended Search Report dated Jan. 2, 2025 in connection with application No. 24201804.2.
AT&T; "Multiplexing eMBB and URLLC in NR Downlink"; 3GPP TSG RAN WG1 Meeting #88 R1-1702275; Feb. 13, 2017.
Huawei, Hisilicon; "Demodulation RS design for DL control channel"; 3GPP TSG RAN WG1 Meeting #87 R1-1611209; Nov. 14, 2016.
European Extended Search Report dated Jan. 2, 2025 in connection with application No. 24201805.9.
Huawei, Hisilicon; "On bandwidth part and bandwidth adaptation"; 3GPP Tsg Ran WG1 Meeting #89 R1-1706900; May 15, 2017.
Ericsson; "On bandwidth parts"; 3GPP Tsg-Ran WG1 #89 R1-170054; May 15, 2017.
Intel Corporation; "Bandwidth parts configuration and operations"; 3GPP TSG WG1 Meeting #89 R1-1707420; May 15, 2017.
European Office Action dated Feb. 6, 2025 in connection with application No. 18818740.5.
Intel Corporation; "Timing relationships for DL scheduling"; 3GPP Draft; R1-1707403; vol. RAN WG1; May 14, 2017.

\* cited by examiner

ENHANCEMENT ON SCHEDULING AND HARQ-ACK FEEDBACK FOR URLLC, MULTIPLEXING SCHEME FOR CONTROL/DATA CHANNEL AND DM-RS FOR NR, AND ACTIVATION MECHANISM, SCHEDULING ASPECTS, AND SYNCHRONIZATION SIGNAL (SS) BLOCKS FOR NEW RADIO (NR) SYSTEM WITH MULTIPLE BANDWIDTH PARTS (BWPS)

CROSS REFERENCE TO RELATED APPLICATIONS

This application claims the benefit of and priority from U.S. Provisional Patent Application No. 62/518,848 entitled "Multiplexing Scheme for Control/Data Channel and DM-RS for NR," filed Jun. 13, 2017, from U.S. Provisional Patent Application No. 62/519,705 entitled "Enhancement on Scheduling and HARQ-ACK Feedback for URLLC," filed Jun. 14, 2017, and from U.S. Provisional Patent Application No. 62/520,878 entitled "Activation Mechanism, Scheduling Aspects, and Synchronization Signal (SS) Blocks for New Radio (NR) System with Multiple Bandwidth Parts (BWPs)," filed Jun. 16, 2017, the entire disclosures of which are incorporated herein by reference.

TECHNICAL FIELD

This disclosure generally relates to the use of New Radio involving multiple bandwidth parts for cellular communication.

BACKGROUND

Figure 1:
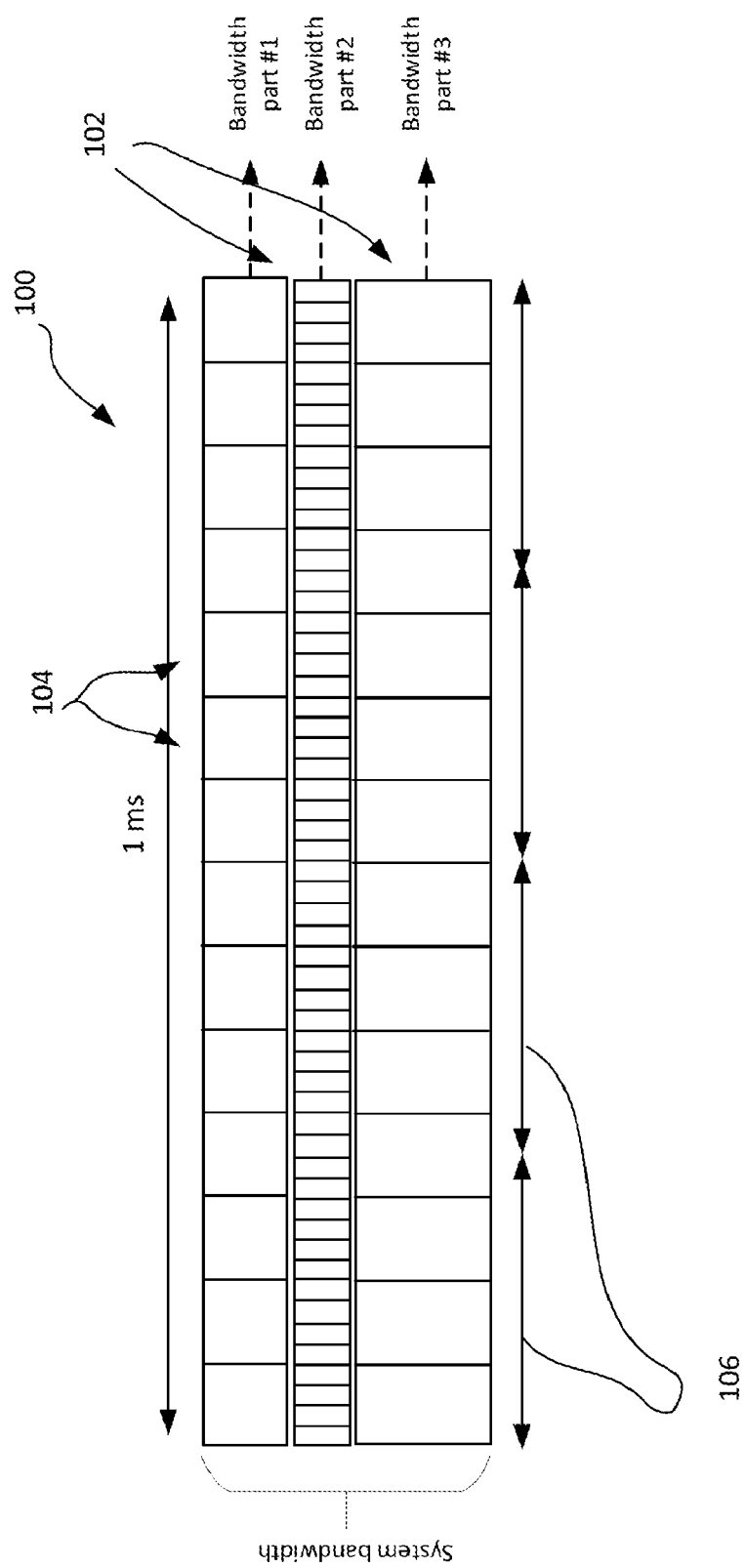
FIG. 1 depicts a partitioned system bandwidth (BW) showing three bandwidth parts (BWPs)

Mobile cellular communication has evolved significantly over the course of generations. The next generation 5G wireless communication system for which the Third Generation Partnership Project (3GPP) new radio (NR) system is targeting will provide much more improved performance compared to the 4G system in many aspects including spectral efficiency, low latency, and high reliability, etc. These multi-dimensional goals are driven by different services and applications including enhanced Mobile Broadband (eMBB), ultra-reliable low-latency cellular (URLLC) networks, etc. The 3GPP NR system targeting to be 5G system will enrich people lives with faster, more responsive, and more reliable wireless connectivity solutions. Improvement however are needed in NR networks with respect to enhancements on scheduling and hybrid automatic repeat request acknowledgement (HARQ-ACK) feedback for URLL, to multiplexing schemes for control/data channels and demodulation reference signal (DM-RS) and to activation mechanisms, scheduling aspects, and synchronization signal (ss) blocks for system with multiple bandwidth parts (BWPs).

DETAILED DESCRIPTION

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrase "A or B" means (A), (B), or (A and B).

Embodiments herein are related to release 15 (Rel-15) new radio (NR) or fifth generation (5G) networks.

As agreed in NR, from the Radio Access Network 1 (RAN1) specification perspective, a maximum channel bandwidth per NR carrier is 400 MHz. For a UE not capable of supporting the carrier bandwidth however, resource allocation for data transmission can be derived based on a two-step frequency-domain assignment process, where a first step involves indicating a bandwidth part and a second step involves indicating the physical resource blocks (PRBs) within the bandwidth part (BWP). For a given UE, one or multiple bandwidth part configurations for each component carrier can be semi-statically signaled to a UE. Further, configuration of a BWP may include numerology, frequency location and bandwidth. In addition, in RAN1, a UE can expect at least one downlink (DL) BWP and one uplink (UL) BWP being active among the set of configured BWPs for a given time instant. In RAN1, a UE is only assumed to receive/transmit within active DL/UL BWP(s) using the associated numerology.

FIG. 1 is a diagram of a partitioned system bandwidth (BW) 100 showing BW part #1, BW part #2, and BW part #3. As shown in FIG. 1, BW parts #1 and #3 are configured to include a slot 102 of 1 ms duration with 14 symbols 104 with 15 kHz subcarrier spacing, while BWP #2 is configured to include slots 106 of roughly 0.25 ms duration with 14 symbols each with 60 kHz subcarrier spacing. Further, as agreed in NR, symbol level alignment across different subcarrier spacings with the same cyclic prefix (CP) overhead is assumed within a subframe duration in a NR carrier (all symbol and slot boundaries are aligned).

For URLLC, in order to meet stringent robustness and latency requirement, a gNodeB (gNB) may schedule data transmission spanning a plurality of symbols and occupying a wide transmission bandwidth. Given that a UE may be configured with multiple BWPs, it may not be desirable in terms of implementation complexity for the data transmission to span multiple BWPs with different numerologies, such as those of FIG. 1 for example. Such implementation may not be feasible where the UE does not support frequency division multiplexing (FDM) of different numerologies within a carrier for a given time instance. To address this issue, certain mechanisms are needed to indicate the numerology for data transmission spanning multiple BWPs. Such mechanisms will be described in greater detail in the section entitled "Scheduled Data Transmission on Multiple BWPs" below.

A first set of embodiments herein relate to an enhancement on scheduling and hybrid automatic repeat request—acknowledgement (HARQ-ACK) feedback for URLLC. In particular, embodiments may include one or more of: scheduled data transmission on multiple BWPs, and enhancement on HARQ-ACK feedback on PUCCH.

In addition to the above issues surrounding BWP partitioning, in NR use case families, enhanced mobile broadband (eMBB) and ultra-reliable and low latency communications (URLCC) have very different requirements in terms of user plane (U-plane) latency and required coverage levels. The key requirements for URLLC relate to U-plane latency and reliability. For URLLC, the target for U-plane latency should be 0.5 ms for UL, and 0.5 ms for DL, and the target for reliability should be $1\text{-}10^{-5}$ within 1 ms. It NR, it has been agreed that data transmission can have a minimum duration of 1 symbol and can start at any OFDM symbol. Per NR, a UE can be configured to perform "DL control channel monitoring" per 1 symbol or per one slot with respect to the numerology of the DL control channel. In particular, a UE may be configured with a symbol level or slot level control resource set (CORESET) with certain offset/periodicity in one slot for DL control channel monitoring occasions.

Figure 2:
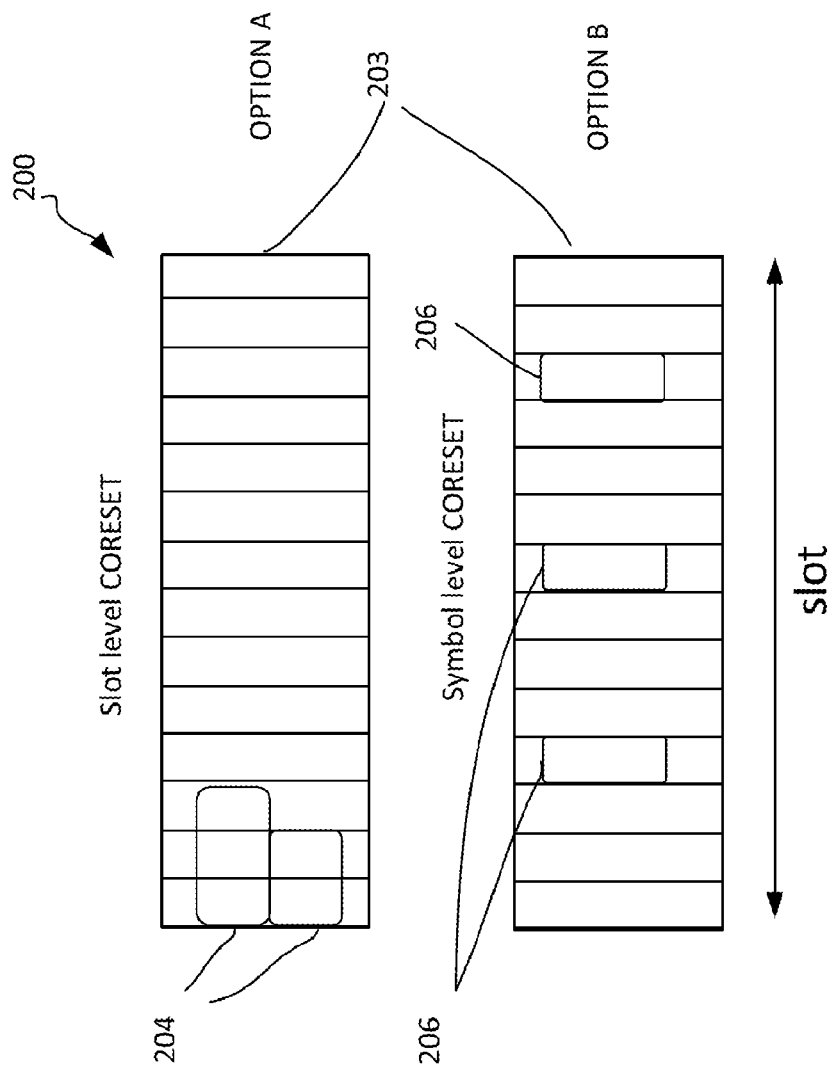
FIG. 2 depicts a diagram of a slot showing a first option involving control resource set (CORESET) on a slot level and a second option showing CORESET on a symbol level according to one embodiment.

FIG. 2 illustrates a slot 200 including 14 symbols 202 and shows two examples of CORESET for a given UE. According to Option A in FIG. 2, the CORESET 204 for the particular UE may be implemented on a per slot basis, spanning across symbols 202. According to Option B in FIG. 2, the CORESET 206 may be implemented on a symbol by symbol basis only. In the context of CORESET implementation, each configured DL BWP (BWP) includes at least one CORESET for the UE to monitor possible reception of control information for the UE.

Figure 3:
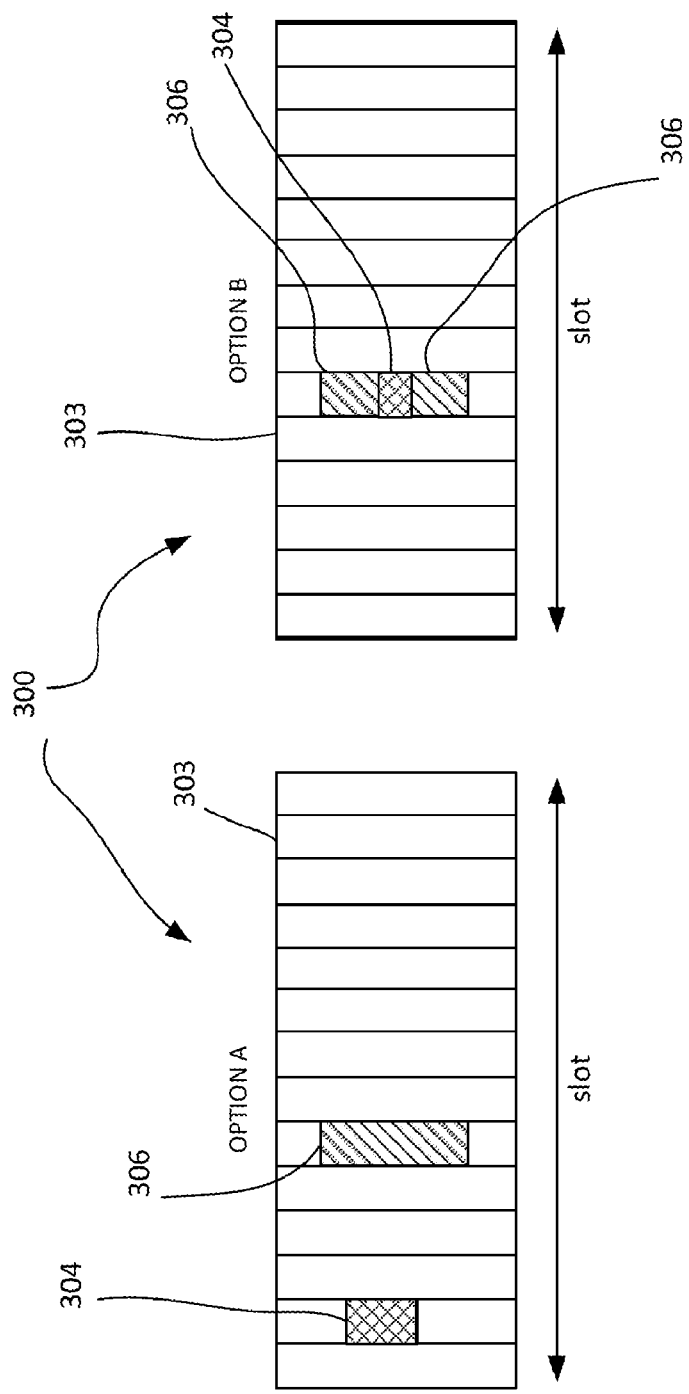
FIG. 3 depicts a slot including multiplexing of Physical Downlink Control Channel (PDCCH) 304 and Physical Uplink Control Channel (PDSCH) 306 therein according to some embodiments.

FIG. 3 illustrates a slot 300 including 14 symbols 302, and shows examples of multiplexing Physical Downlink Control Channel (PDCCH) 304 and Physical Uplink Control Channel (PDSCH) 306 in a same slot. For symbol level data transmission according to NR, the DL data channel PDSCH may be transmitted in different symbols of a slot (Option A) or in the same symbol(s) (Option B) as compared with the DL control channel PDCCH. The latter case, Option A, is more suitable for low latency applications, such as, for example, URLLC, while Option B is more suitable otherwise. In Option A, PDCCH and PDSCH are multiplexed in a time division multiplexing (TDM) manner and are transmitted in different symbols. In Option B, PDCCH and PDSCH are multiplexed in a frequency division multiplexing (FDM) manner.

For the two options in FIG. 3, it may be more desirable to place the demodulation reference signal (DM-RS) in different constellation positions to multiplex DM-RS and control/data channel more efficiency. To further improve the spectrum efficiency, it may be desirable to multiplex PDCCH and PDSCH in a spatial division multiplexing (SDM) manner. In this case, certain DM-RS may be shared between PDCCH and PDSCH on the overlapped resource. Such mechanisms will be described in greater detail in the section entitled "Multiplexing scheme when PDCCH and PDSCH are transmitted in different symbol(s)" below.

A second set of embodiments relate to multiplexing schemes for control/data channel and DM-RS for NR. In particular, embodiments may include one or more of the following: Multiplexing scheme when PDCCH and PDSCH are transmitted in different symbol(s); and Multiplexing scheme when PDCCH and PDSCH are transmitted in the same symbol(s).

In addition to the above issues surrounding bandwidth partitioning and the multiplexing of DM-RS and control/data channels, in RAN1, it was agreed that one or multiple BWPs can be semi-statically configured to a UE. The use of BWPs can be envisioned in the following example scenarios according to RAN 1: according to the frequency range contemplated for the larger NR BWs for high data rate communication (including taking into consideration BW and the center frequency), and/or according to the different numerologies as between different BWPs (including taking into consideration subcarrier spacing and slot length). Regarding the frequency range scenario, RAN1 contemplates the adaptation of DL reception bandwidth from a small bandwidth to a larger bandwidth in cases of large BW PDSCH scheduling (e.g., 10 MHz for one BWP and 50 MHz for another BWP), and further the adjustment of UL transmission bandwidth to a larger one in accordance to the scheduled bandwidth for a physical uplink shared channel (PUSCH). Regarding the different numerology scenario as between different BWPs, RAN1 contemplates configuration different services such as URLLC and eMBB with different numerologies.

The power consumption of radio frequency (RF), analog-to-digital (A/D) or digital-to-analog (D/A) converters and the digital front end increase as the RF bandwidth becomes wider. The baseband power consumption mainly depends on the fast Fourier transform (FFT) size and on the data rate. As it was agreed in RAN1, the NR maximum component carrier bandwidth is 400 MHz. Thus, in RAN1 high power consumption can be expected even at low data rates or while idling, mainly because of the RF power consumption.

Therefore, having the operating bandwidth adjustment capability depending on the data rate can be beneficial in terms of reducing the UE power consumption. If a UE is configured with small BWP, it can benefit from low power consumption. When a high data rate is demanded, the BWP can be switched to a wider one. Such a wide BWP could be equal to that of the component carrier configured to the UE in accordance with the UE's bandwidth capability.

Another use case can be the scenarios in which multiple numerologies should be supported on an NR cell. For example, in cases where slot-based transmissions for a URLLC service is employed in a cell, larger subcarrier spacing can be configured for the BWP for the URLLC service in order to have short slot lengths for reduced latency, while using separate time-frequency resources from the eMBB service. Such mechanisms will be described in greater detail in the section entitled "Adjusting Operating Bandwidth Capability Depending on Data Rate" below.

A third set of embodiments herein relate to multiple BWPs. Specifically, embodiments herein relate to the activation mechanism, scheduling aspects and SS block numerology for multiple BWPs.

Scheduled Data Transmission on Multiple BWPs

As mentioned previously, when a UE is configured with multiple BWPs using different numerologies, it is more appropriate to employ a single numerology for data transmission occupying multiple bandwidth parts, which can help to reduce UE implementation complexity and to simplify the design. The above regime can be applied for UEs that do not support FDM involving different numerologies within a carrier for a given time instance.

According to a first set of embodiments, a scheduling DL or UL data transmission on multiple BWPs is provided.

According to one embodiment, where the UE is configured with a plurality of BWPs with different respective numerologies, and a scheduled data transmission occupies multiple ones of the bandwidth parts, a numerology used for the data transmission in each BWP may be determined based on the configured numerology. The above would advantageously do away with the need for explicit signaling for the numerology used in each BWP in the downlink control information (DCI), which helps in reducing signaling overhead.

Figure 4:
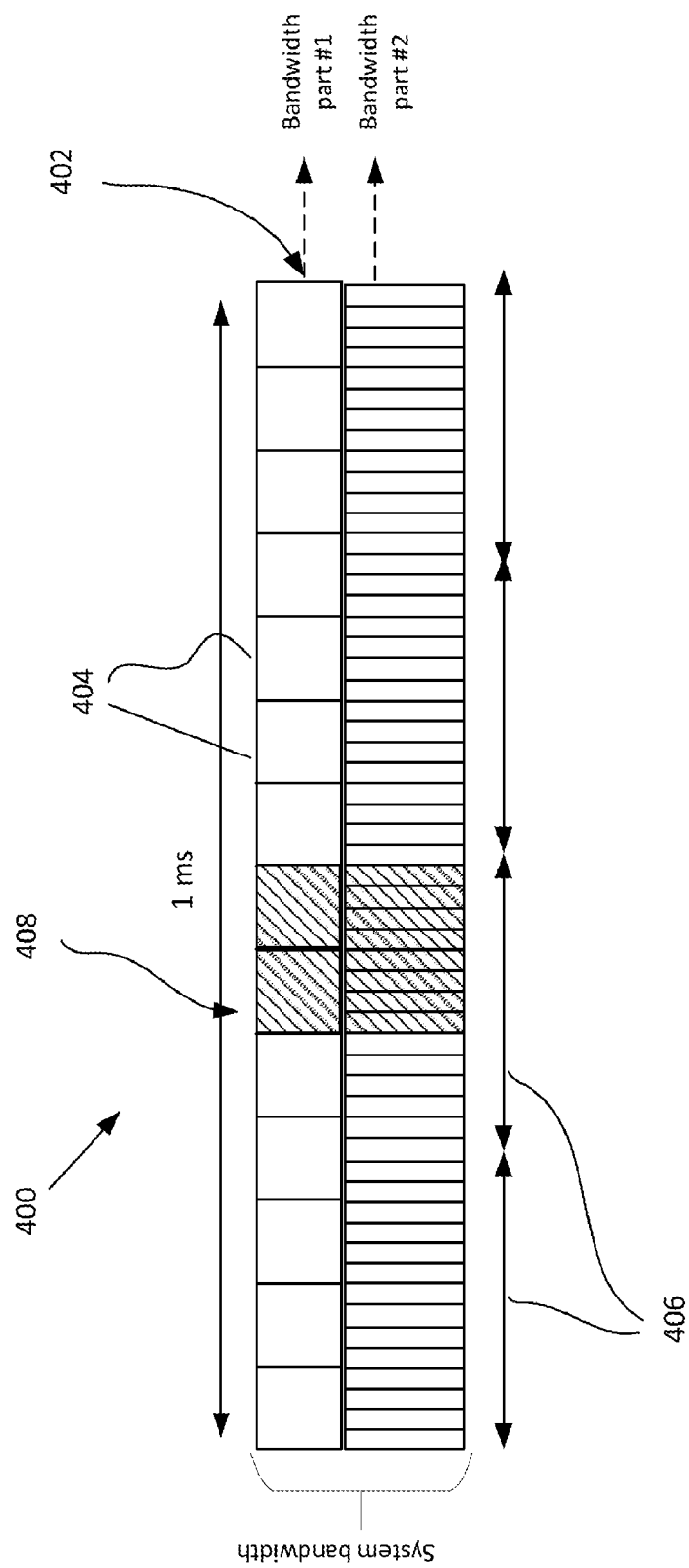
FIG. 4 depicts a partitioned system BW showing one example of configured numerologies for data transmission occupying multiple BWPs according to some embodiments.

FIG. 4 is diagram of a partitioned system bandwidth (BW) 400 showing BW part #1, and BW part #2. As shown in FIG. 4, BW part #1 is configured to include a slot 402 of 1 ms duration with 14 symbols 404 with 15 kHz subcarrier spacing, while BWP #2 is configured to include slots 406 of roughly 0.25 ms duration with 14 symbols each with 60 kHz subcarrier spacing. FIG. 4 illustrates one example of configured numerologies for data transmission 408 occupying multiple BWPs. In the example, 15 KHz and 60 KHz subcarrier spacings are configured for bandwidth part #1 and #2, respectively and employed for the data transmission occupying BWP #1 and #2. Given that different BWPs may be associated with different numerologies as suggested in the example of FIG. 4, resource allocation or physical resource block (PRB) indexing to specifically identify the resources allocated for data transmission may be defined in accordance with a reference numerology (e.g. 15 KHz), or with a numerology which has a smallest or a largest subcarrier spacing in configured BWPs. Alternatively, the resource allocation or PRB indexing may be defined in accordance with a numerology configured by higher layers via NR minimum system information (MSI), NR remaining minimum system information (RMSI), NR system information block (SIB) or radio resource control (RRC) signaling. In addition, for a data transmission occupying multiple BWPs using different numerologies, encoded symbols may be mapped in the frequency first and time second manner and fill all available resources in one BWP, and subsequently, continue to be mapped into the next BWP.

In another embodiment, where a UE is configured with multiple BWPs associated with different numerologies, and scheduled data transmission occupies multiple bandwidth parts, numerology used in each BWP can be explicitly signaled in the DCI (the DCI would include explicit information on the numerology used in each BWP). In such a case, the numerology signaled in the DCI would override the numerology which is configured for the UE for the bandwidth part. Such a dynamic signaling approach achieved through DCI signaling can be specified for UL transmissions to allow transmissions with different numerologies from different UEs within a single BWP, irrespective of any default numerology that may be configured for the BWP for a given UE. On the other hand, for DL scheduling, the DCI-indicated numerology of a scheduled PDSCH can be different from the configured numerology for a BWP only for PDSCH allocations spanning at least a number of BWPs.

Where a UE does not support FDM of multiple numerologies within a carrier for a given time instance, a single numerology may be applied for the data transmission occupying multiple BWPs. In this case, single numerology value can be explicitly indicated in the DCI. Note that the resource allocation or PRB indexing may be defined in accordance with the numerology which is signaled in the DCI.

Figure 5:
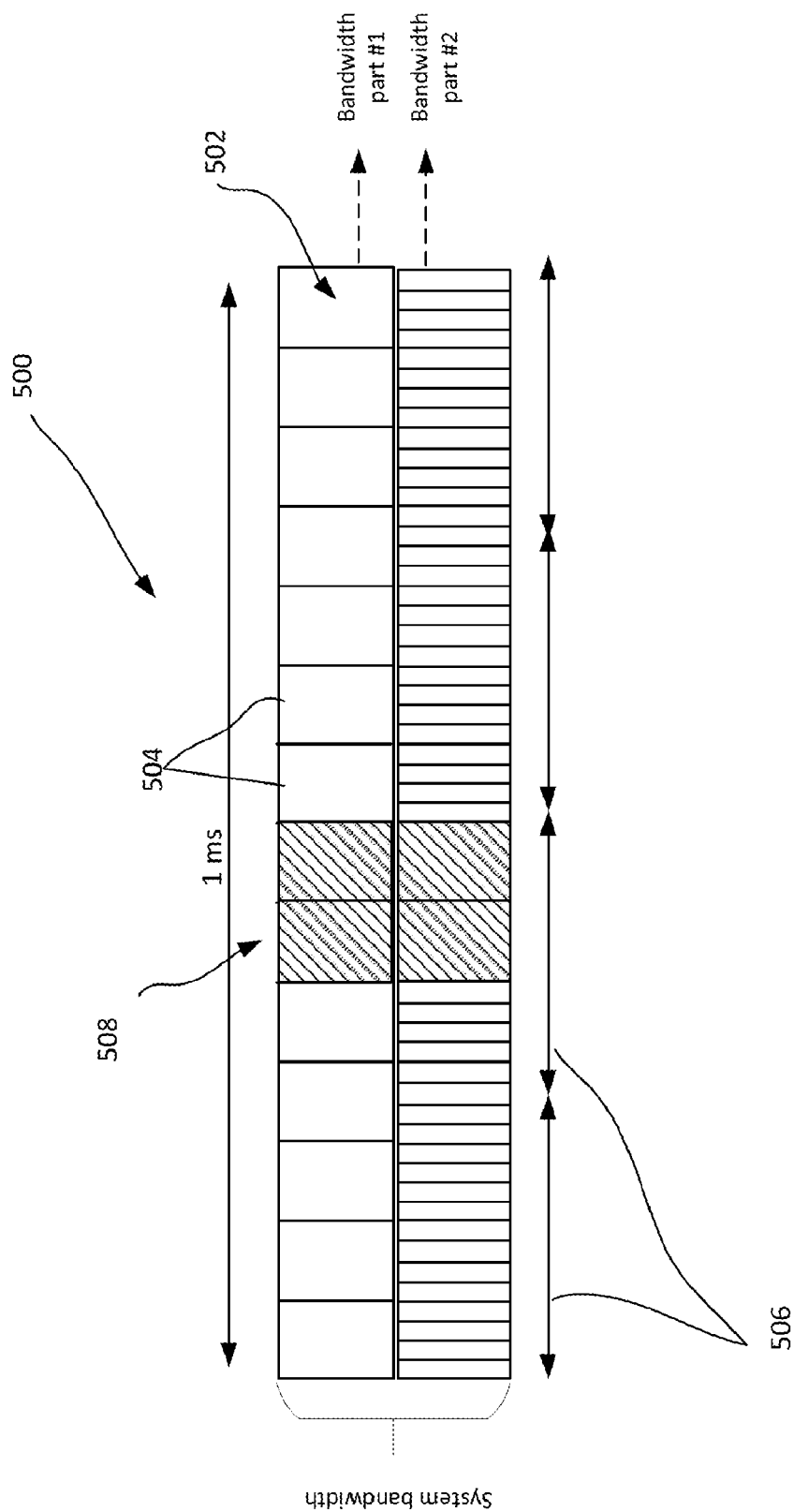
FIG. 5 depicts a partitioned system BW showing one example of using a single numerology for data transmission occupying multiple BWPs according to some embodiments.

FIG. 5 is diagram of a partitioned system bandwidth (BW) 500 showing BW part #1, and BW part #2. As shown in FIG. 5, BW part #1 is configured to include a slot 502 of 1 ms duration with 14 symbols 504 with 15 kHz subcarrier spacing, while BWP #2 is configured to include slots 506 of roughly 0.25 ms duration with 14 symbols each with 60 kHz subcarrier spacing. FIG. 5 illustrates one example of using a single numerology for data transmission occupying multiple BWPs. In the example, the data transmission 508 spans 2 symbols in the time domain and occupies BWP #1 and #2 using a 15 KHz subcarrier spacing. Further, in this option, it is understood that a 15 KHz subcarrier spacing was previously explicitly indicated in the DCI scheduling the data transmission 508.

Figure 6:
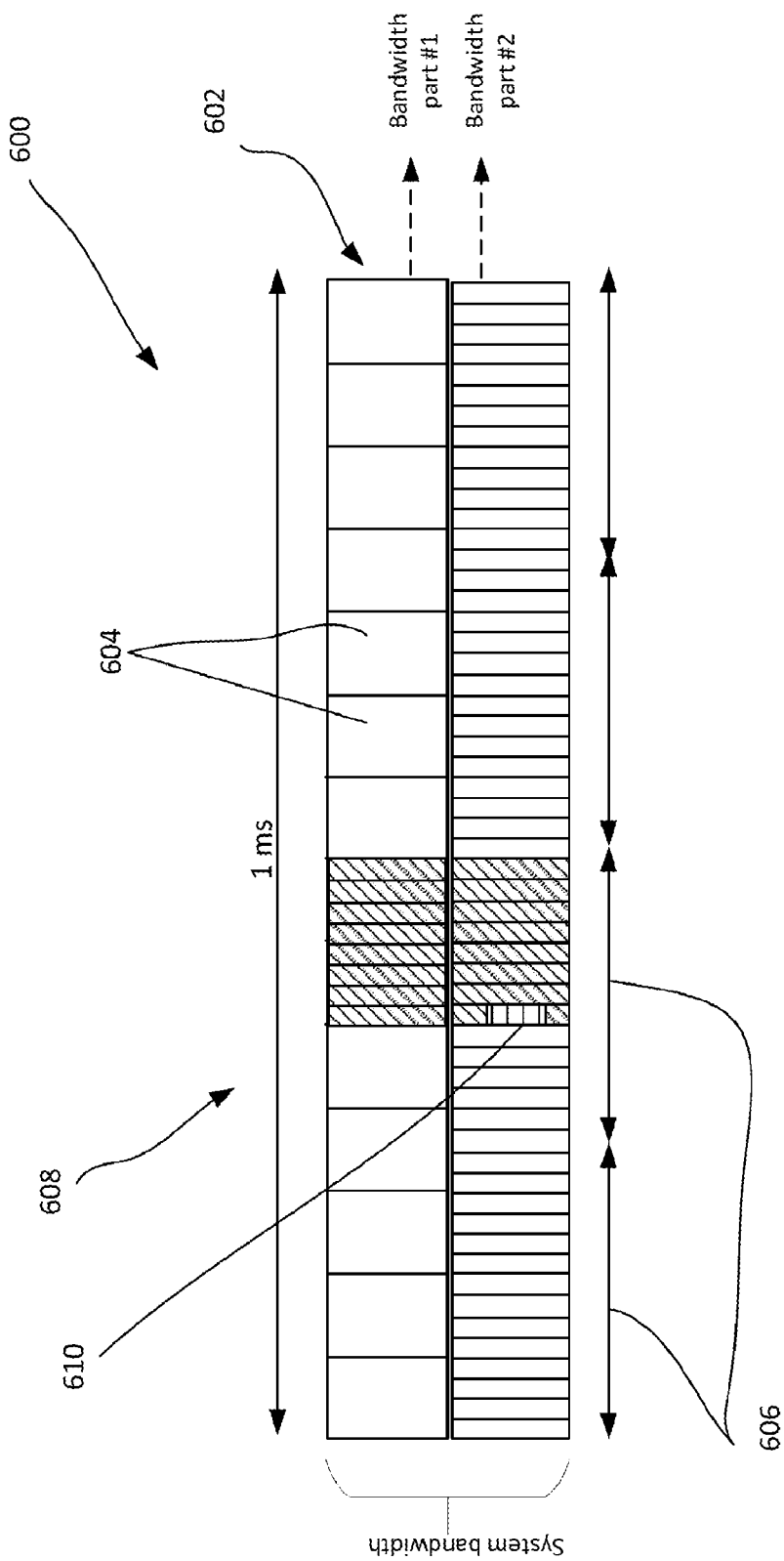
FIG. 6 depicts a partitioned system BW showing one example of a same numerology for the transmission of PDCCH and scheduled PDSCH according to some embodiments.

FIG. 6 is diagram of a partitioned system bandwidth (BW) 600 showing BW part #1, and BW part #2. As shown in FIG. 6, BW part #1 is configured to include a slot 602 of 1 ms duration with 14 symbols 604 with 15 kHz subcarrier spacing, while BWP #2 is configured to include slots 606 of roughly 0.25 ms duration with 14 symbols each with 60 kHz subcarrier spacing. FIG. 6 illustrates one example of same numerology for the transmission of PDCCH 610 and scheduled PDSCH 608. In the example, both PDCCH 610 and scheduled PDSCH 608 employ a 60 kHz subcarrier spacing numerology. Further, a numerology including a 15 kHz subcarrier spacing, is applied for the PDSCH 608 occupying both BWPs #1 and #2.

In another, related embodiment, where the UE is configured with multiple BWPs associated with different numerologies, and a scheduled data transmission occupies multiple bandwidth parts, a single numerology may be applied for the transmission of data, where the single numerology is derived from the numerology used for the transmission of the PDCCH scheduling the corresponding data transmission. As a further extension, a single numerology may be applied for the data transmission and for the PDCCH scheduling the corresponding data transmission. This regime may largely simplify the design and implementation of data transmission scheduling in multiple BWPs associated with different numerologies. In other words, the numerology employed for the transmission of PDCCH would override the numerology which is configured for the BWP used by the UE.

Figure 7:
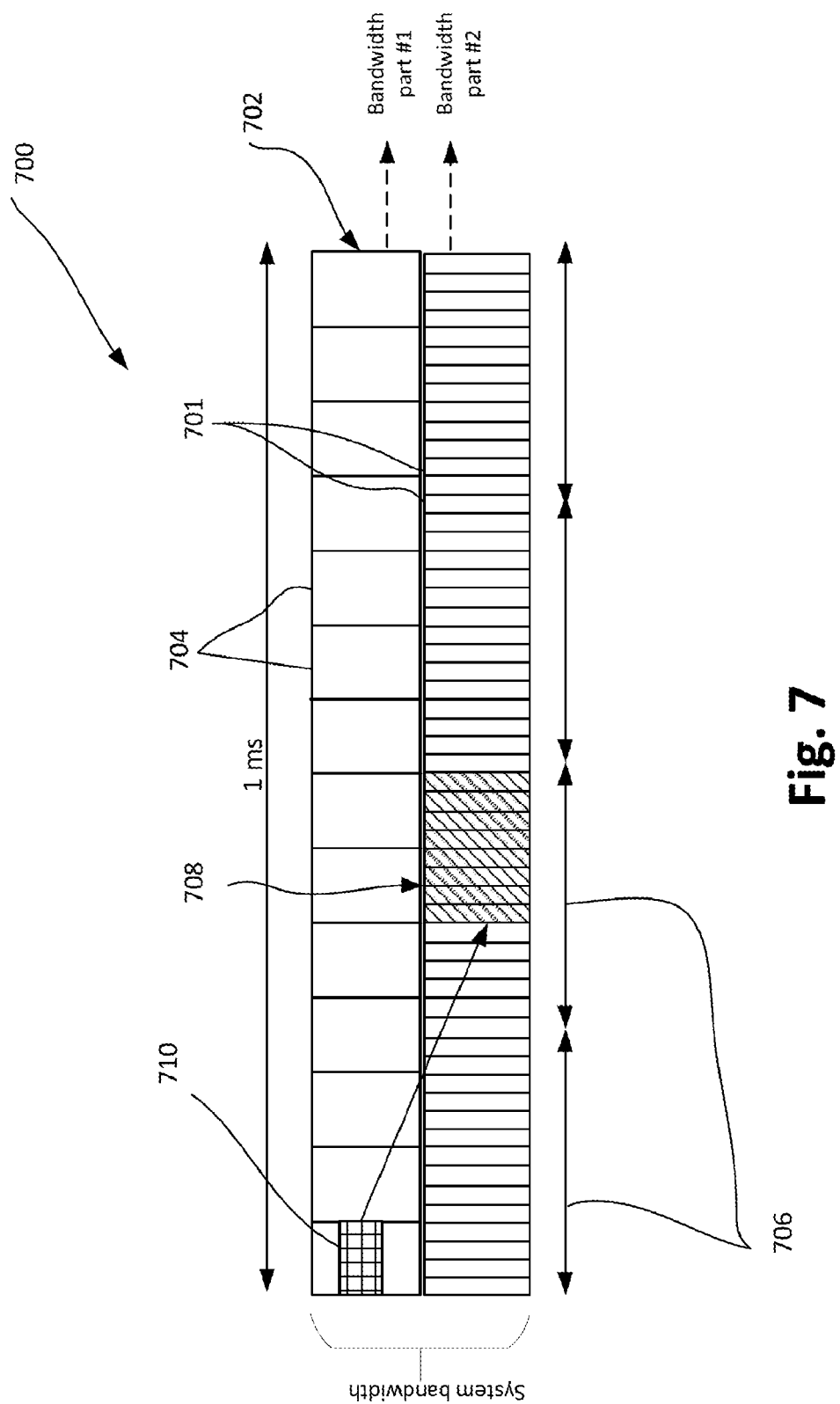
FIG. 7 depicts a partitioned system BW showing one example of cross numerology scheduling for data transmission according to some embodiments.

FIG. 7 is diagram of a partitioned system bandwidth (BW) 700 showing BW part #1, and BW part #2. As shown in FIG. 7, BW part #1 is configured to include a slot 702 of 1 ms duration with 14 symbols 704 with 15 kHz subcarrier spacing, while BWP #2 is configured to include slots 706 of roughly 0.25 ms duration with 14 symbols each with 60 kHz subcarrier spacing. FIG. 7 illustrates one example of cross numerology scheduling for data transmission. In the example, PDCCH 710 in BWP #1 using 15 KHz subcarrier spacing is used to schedule the PDSCH 708 in bandwidth part #2 using 60 KHz subcarrier spacing. Thus, PDCCH 710 and the scheduled data transmission may be transmitted in the different BWPs associated with different numerologies. For instance, a BWP configured with larger subcarrier spacing can be allocated for data transmission so as to reduce latency. Similar to above, no explicit signaling is needed in the DCI to indicate the numerology for data transmission, since the DCI or higher layer signaling, or a combination of the two, will indicate the BWP index for the PDSCH 708 to the UE. Where BWPs overlap, a principle similar to the above is possible, according to which a PDCCH in the first BWP may schedule PDSCH in the second BWP overlapped with the first. In such as case, a UE may not be assumed to continue a monitoring of PDCCH and PDSCH in the first BWP when receiving PDSCH in the second BWP because of the overlap. Nevertheless, the UE may in fact be adapted to monitor both BWPs according to the UE's capabilities.

Figure 8:
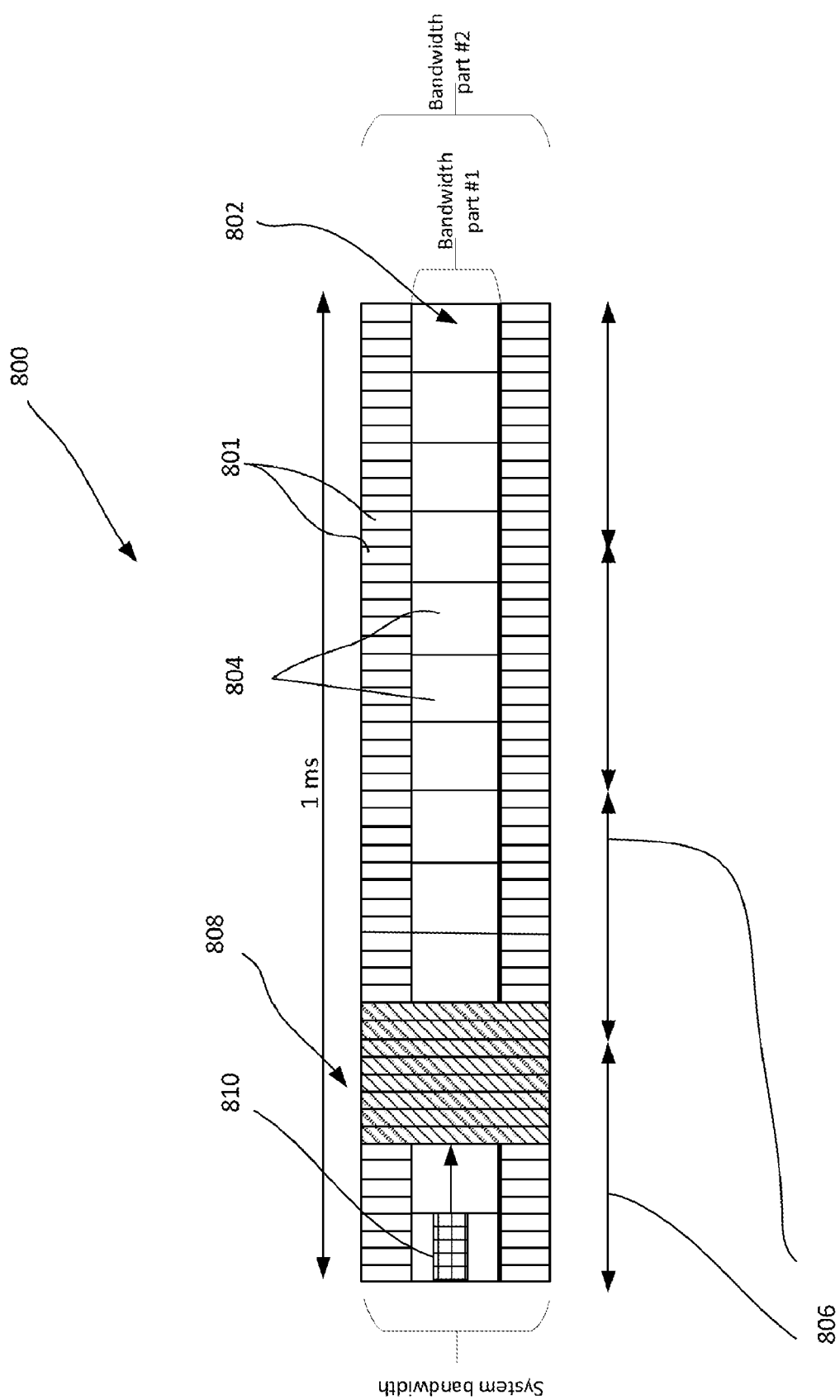
FIG. 8 depicts a partitioned system BW showing another example of cross numerology scheduling for data transmission according to some embodiments.

FIG. 8 is diagram of a partitioned system bandwidth (BW) 800 showing BW part #1, and BW part #2. As shown in FIG. 8, BW part #1 is configured to include a slot 802 of 1 ms duration with 14 symbols 804 with 15 kHz subcarrier spacing, while BWP #2, which includes BWP part #1 within it, is configured, exclusive of BWP #1, to include slots 806 of roughly 0.25 ms duration with 14 symbols each with 60 kHz subcarrier spacing. FIG. 8 illustrates another example of cross numerology scheduling for data transmission. In the example, PDCCH 810 in BWP #1 using 15 KHz subcarrier spacing is used to schedule the PDSCH 808 in BWP #2 using 60 KHz subcarrier spacing where BWP #2 contains BWP #1.

According to some embodiments, a BWP may be configured with a predetermined time pattern, which time pattern may be semi-statically configured via UE-specific RRC signaling to indicate the active BWP at a certain instance of time. Accordingly, two or more BWPs may be multiplexed in a time division multiplexing (TDM) manner. In one option, the transmission time including symbol/slot offset of a transmission and periodicity for the BWP may be configured in a semi-static manner by the gNodeB. Note that to achieve finer granularity of a BWP configuration, a periodicity which is at a symbol level may be configured for the BWP by the gNodeB.

In another option, the time pattern for BWP configuration can be realized by configuring the monitoring occasions for NR PDCCH monitoring by the UE with different PDCCH CORESETs corresponding to different BWPs. Accordingly, the NR PDCCH monitoring occasions that can be configured at slot- or symbol-level via a periodicity and time offsets can effectively indicate the BWPs to monitor for DL control channel reception or PDSCH reception or for UL transmissions by the UE. For PDSCH reception or UL transmissions (PUSCH, PUCCH, SRS), only the time domain resource indication and possible frequency domain resource allocation within the activated BWP for the corresponding time duration may be necessary. Where multiple BWPs have the same numerology, such time patterns may also be used to indicate instances when the UE may be scheduled using multiple BWPs or may be scheduled to receive PDCCH and PDSCH simultaneously on two or more BWPs. Alternatively, in another option, certain time gap may be defined between the times when a BWP may be active. Further, the time gap can be defined as a function of physical or virtual cell ID, UE ID (e.g., Cell Radio Network Temporary Identifier (C-RNTI)), etc.

Enhancement on HARQ-ACK Feedback on PUCCH

Especially in URLLC applications (although embodiments are not so limited), not only is low latency a significant goal (hence the discussion of multiple BWP use in the DL and UL above), but so is reliability. The section here relating to HARQ-ACK addresses in part reliability in URLLC applications.

For NR, HARQ-ACK feedback can be carried in short or long physical uplink control channel (PUCCH). Further, short PUCCH may span 1 or 2 symbols while long PUCCH may span from 4 to 14 symbols. In the case of HARQ-ACK feedback for the DL data transmission, depending on the UE location or channel status, long PUCCH or aggregation of short PUCCH may be employed to improve the robustness of PUCCH detection. To reduce latency for URLLC DL transmission, for instance, where a UE feeds back NACK for a corresponding PDSCH, early termination of NACK feedback may be desirable so as to allow the gNodeB to reschedule the retransmission as soon as possible.

Embodiments of enhancement on HARQ-ACK feedback on PUCCH are provided as follows below According to one embodiment, a long PUCCH to carry HARQ-ACK feedback may be configured or dynamically indicated in the DCI scheduling PDSCH for UE. In NR, it was agreed that time domain orthogonal cover code (OCC) can be applied over multiple uplink control information (UCI)/DeModulation Reference Signal (DMRS) symbols per frequency hop for a long PUCCH that carries one or two-bit HARQ-ACK feedback. In this case, according to one embodiment, time domain OCC may be disabled for URLLC to achieve a potential early termination of HARQ-NACK feedback. Whether a time domain OCC is disabled or enabled can be configured by higher layers via NR MSI, NR RMSI, NR SIB or RRC signaling.

In another embodiment, aggregation of a 1 or 2 symbol short PUCCH may be employed for carrying HARQ-ACK feedback. To further improve the link level performance, frequency hopping may be applied for the transmission of aggregated short PUCCH to exploit the benefit of frequency diversity. In one option, a frequency hopping pattern may be defined as a function of one or more following parameters: physical or virtual cell ID, UE ID (e.g., Cell Radio Network Temporary Identifier (C-RNTI)), symbol or slot or frame index, and a parameter which is indicated in the DCI. Further, the resource for the first transmission of short PUCCH can be configured by RRC signaling or dynamically indicated in the DCI or combination thereof.

Figure 9:
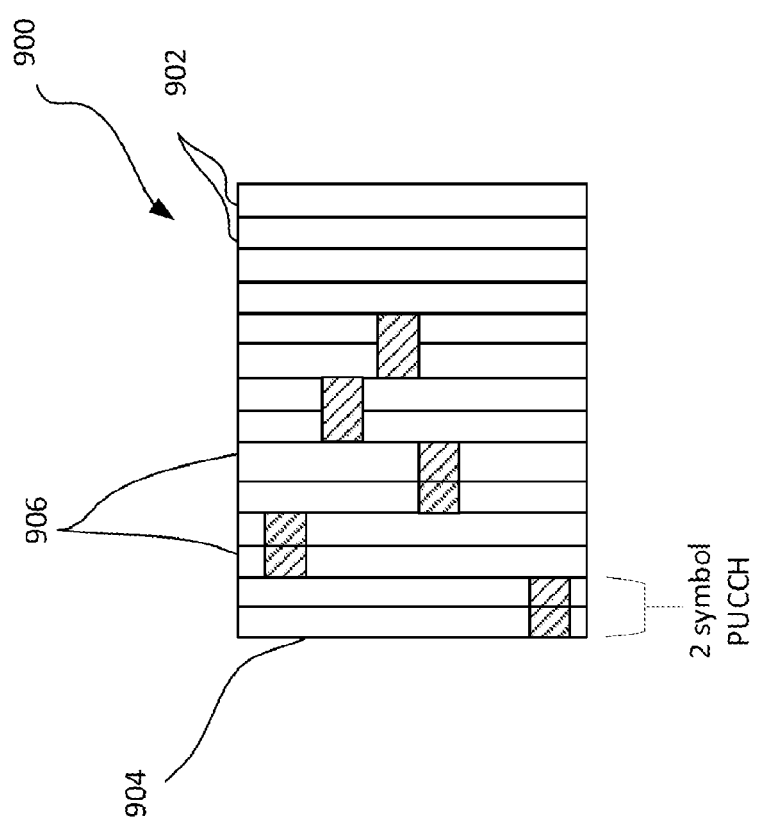
FIG. 9 depicts a slot where short physical uplink control channels (PUCCHs) are aggregated according to some embodiments.

FIG. 9 illustrates one example of a slot 900 having 14 symbols 902 therein, where frequency hopping for an aggregated PUCCH 904 including 2-symbol short PUCCHs 906 is shown. In the example, five 2-symbol short PUCCHs 906 are aggregated. The aggregation can be configured by higher layers via RRC signaling, or it may be dynamically indicated in the DCI, or combination thereof. In another option, the frequency hopping pattern may be configured by higher layers via NR MSI, NR RMSI, NR SIB or RRC signaling. In yet another option, frequency hopping for aggregated 2-symbol short PUCCHs can be performed across multiple BWPs using a same numerology or with different numerologies.

In another embodiment, where a UE is configured with multiple UL BWPs, to reduce latency, a PUCCH carrying HARQ-ACK may be transmitted in a different UL BWP as compared with the BWP for monitoring and reception of PDCCH or PDSCH. There may be a one-to-one association between a DL BWP and a UL BWP, similar to a system information block 2 (SIB2) linkage between DL and UL carriers in LTE. Where a larger subcarrier spacing as compared with BWP for PDCCH/PDSCH is configured in the BWP for the transmission of PUCCH, the latency on HARQ-ACK feedback may be reduced, assuming that sufficient link budget is guaranteed. For the above to take place, the BWP index is to be indicated in the DCI, or is to be configured by higher layers via RRC signaling, or a combination of the two, the BWP index indicating the higher subcarrier spacing.

In one another embodiment, where a UE has received multiple PDSCHs on multiple DL BWPs, either in different slots or in the same slot, HARQ-ACKs corresponding to the PDSCHs received on the different BWPs can be carried by a single PUCCH on a BWP. The BWPs may employ different numerologies with respect to one another and/or the PDSCHs may employ different numerologies with respect to one another. While a PUCCH carrying HARQ-ACK for a single BWP may employ the same numerology as the DL data channel, the PUCCH carrying the HARQ-ACKs for the BWPs employing different numerologies may employ the numerology corresponding to the BWP where the PUCCH is transmitted. This can avoid inter-modulation distortion and reduce peak-to-average-power ratio compared to sending multiple PUCCHs on the respective BWPs separately. A choice as to which BWP and/or as to which numerology the PUCCH should use can be configured via higher layers or indicated via DCI or a combination thereof. The mapping of the HARQ-ACK bits onto the PUCCH can be pre-defined or configured via higher layers or a combination thereof. It is to be noted that a PUCCH carrying HARQ-ACK for a single BWP may also have a different numerology as that of the DL data channel, and the different numerology could be configured via higher layers or indicated via DCI or a combination thereof.

A first set of embodiments relating to an enhancement on scheduling and hybrid automatic repeat request-acknowledgement (HARQ-ACK) feedback for URLLC having been described above, including on scheduled data transmission on multiple BWPs, and enhancement on HARQ-ACK feedback on PUCCH, the description to follow will address multiplexing schemes for the transmission of PDCCH and PDSCH on different symbols and also on the same symbols.

The Demodulation Reference Signals (DM-RS) are used to enable coherent signal demodulation at the receiver. DM-RS are typically time multiplexed with DL or UL data, and are transmitted on symbols of a slot, using the same bandwidth as the data.

Embodiments of multiplexing schemes for DM-RS and PDSCH can be provided as follows below.

Multiplexing Scheme when PDCCH and PDSCH are Transmitted in Different Symbol(s)

According to one embodiment, a DM-RS can be multiplexed with PDSCH in a TDM manner and can be transmitted prior to or after PDSCH. In this case, multiple UEs may share the same symbol for DM-RS transmission. In NR, it was agreed that front-load DM-RS would be supported, and that a DM-RS position for slot-based transmission would be fixed regardless of the first symbol location of PDSCH. According to embodiments, depending on the location of DM-RS and the symbol gap between DM-RS and PDSCH, additional DM-RS symbols in the slot may be configured to improve the channel estimation performance. Note that the above option can apply for uplink data transmissions where Discrete Fourier Transform Spread Orthogonal Frequency Division Multiplexing (DFT-s-OFDM) based waveform is used on the uplink. In such a case, to maintain a single carrier property, TDM of the DM-RS and the data transmission can be used.

Figure 10:
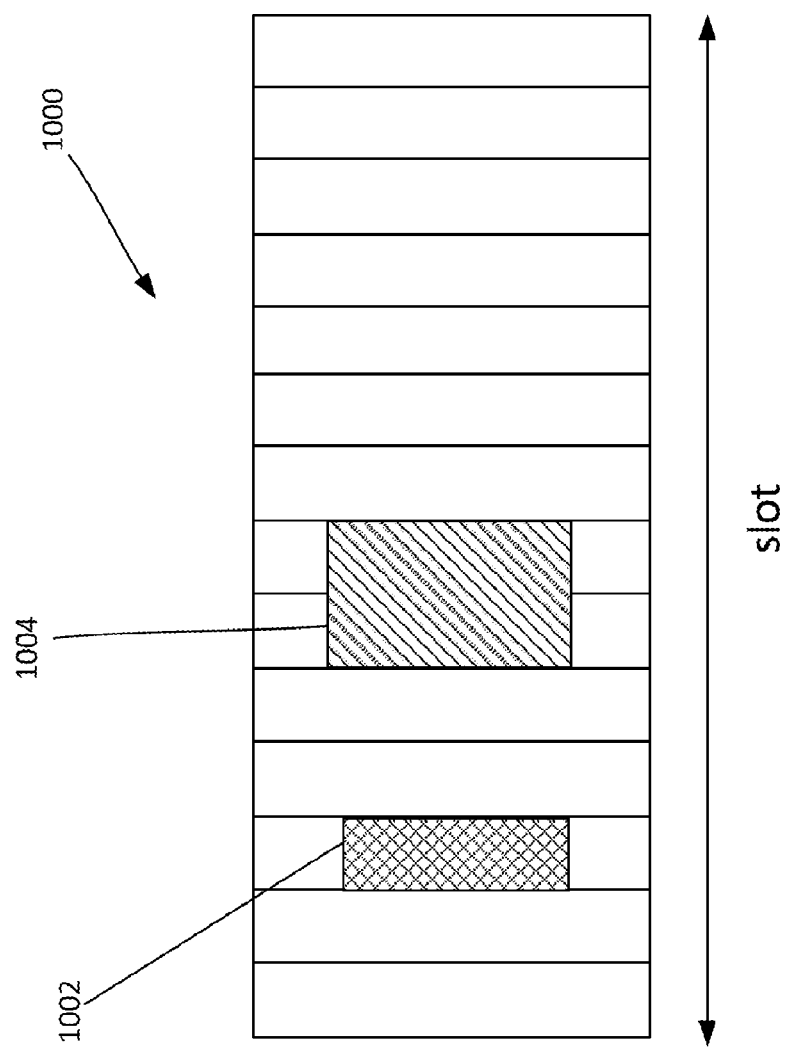
FIG. 10 depicts a slot showing one example of a multiplexing of demodulation reference signal (DM-RS) and PDSCH in a TDM manner on a per symbol basis according to some embodiments.

Reference is now made to FIG. 10, which shows a diagram of a slot 1000 having 14 symbols, and showing symbol-level transmissions therein. FIG. 10 illustrates one example of a multiplexing of DM-RS 1002 and PDSCH 1004 in a TDM manner on a per symbol basis. In the example, a same resource (slot) is allocated for the transmission of DM-RS 1002 and PDSCH 1004.

Figure 11:
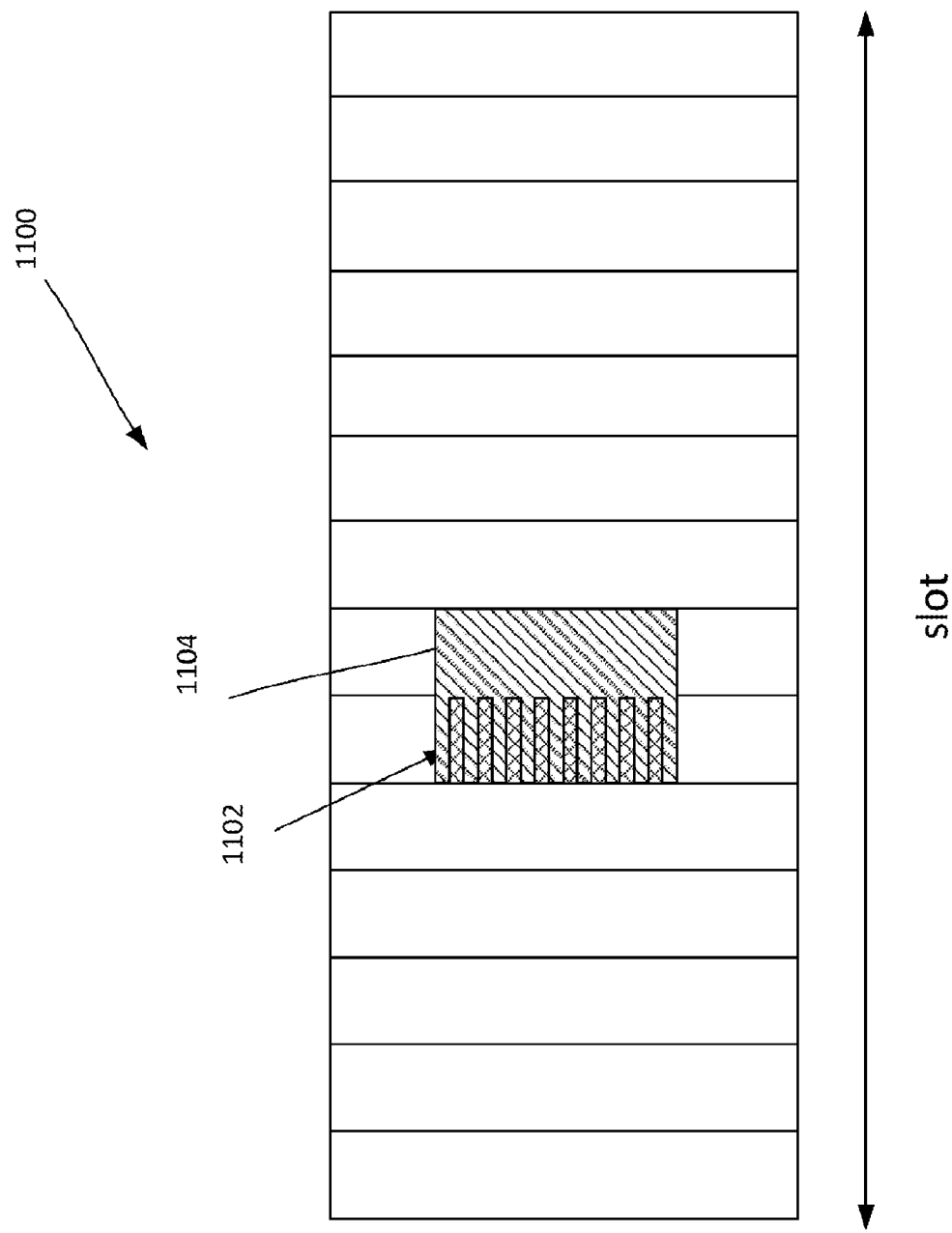
FIG. 11 depicts a slot showing one example of using frequency division multiplexing (FDM) for the transmission of DM-RS and PDSCH according to some embodiments.

Referring now to FIG. 11, a diagram of a slot 1100 is shown having 14 symbols, and showing symbol-level transmission therein. In the embodiment of FIG. 11, a DM-RS 1102 can be multiplexed with a PDSCH 1104 in a FDM manner, and can be transmitted on the symbol(s) where the PDSCH 1104 is scheduled. In particular, unused resource elements (RE) in a symbol carrying the DM-RS 1102 can be used for the transmission of PDSCH 1104 as shown in FIG. 11. In particular, FIG. 11 illustrates one example of using FDM for the transmission of DM-RS 1102 and PDSCH 1104, where in the first symbol 1108, PDSCH 1104 is transmitted in the unused DM-RS REs while in the second symbol 1110, PDSCH 1104 occupies the whole allocated resource. The multiplexing of DM-RS in one or more symbols where the data is transmitted can also apply for the multiplexing of DM-RS and physical uplink shared channel (PUSCH).

In another embodiment, for the above two options of FIGS. 10 and 11, a choice as to which option is employed may be configured by higher layers or dynamically indicated in the downlink control information (DCI) or a combination thereof, or implicitly determined by the subcarrier spacing and/or MCS and/or allocated bandwidth. For uplink transmissions, the option to be used can also be determined based on the waveform of the PUSCH. For instance, for a URLLC application, a FDM of DM-RS and PDSCH may be beneficial in term of reduced latency, while for data transmission in the high band, TDM of DM-RS and PDSCH may be more appropriate as it may improve the spectrum efficiency due to a sharing DM-RS among multiple UEs.

Multiplexing Scheme when PDCCH and PDSCH are Transmitted in the Same Symbol(s)

Referring back to FIG. 3, for symbol-level transmission of PDSCH 304, PDCCH 306 and PDSCH 304 are multiplexed in a FDM manner and transmitted in the same symbol(s) in the slot. In this case, the UE may be configured to monitor symbol level CORESET for PDCCH candidates. Thus, when PDCCH 306 and PDSCH 304 are transmitted in the same symbol(s), they can be multiplexed in a FDM manner. Depending on the number of symbols allocated for PDCCH and PDSCH, various options can be considered on the multiplexing schemes for DM-RS and PDCCH/PDSCH. Where PDSCH 304 and PDCCH 306 span the same symbol (s), dedicated DM-RS can be used for each of PDSCH and PDCCH, respectively. Further, the PRB bundling size for PDSCH and PDCCH (where bundling is effected to reduce signaling overhead and improve channel estimation) may be aligned to simplify the implementation at the UE side.

Figure 12:
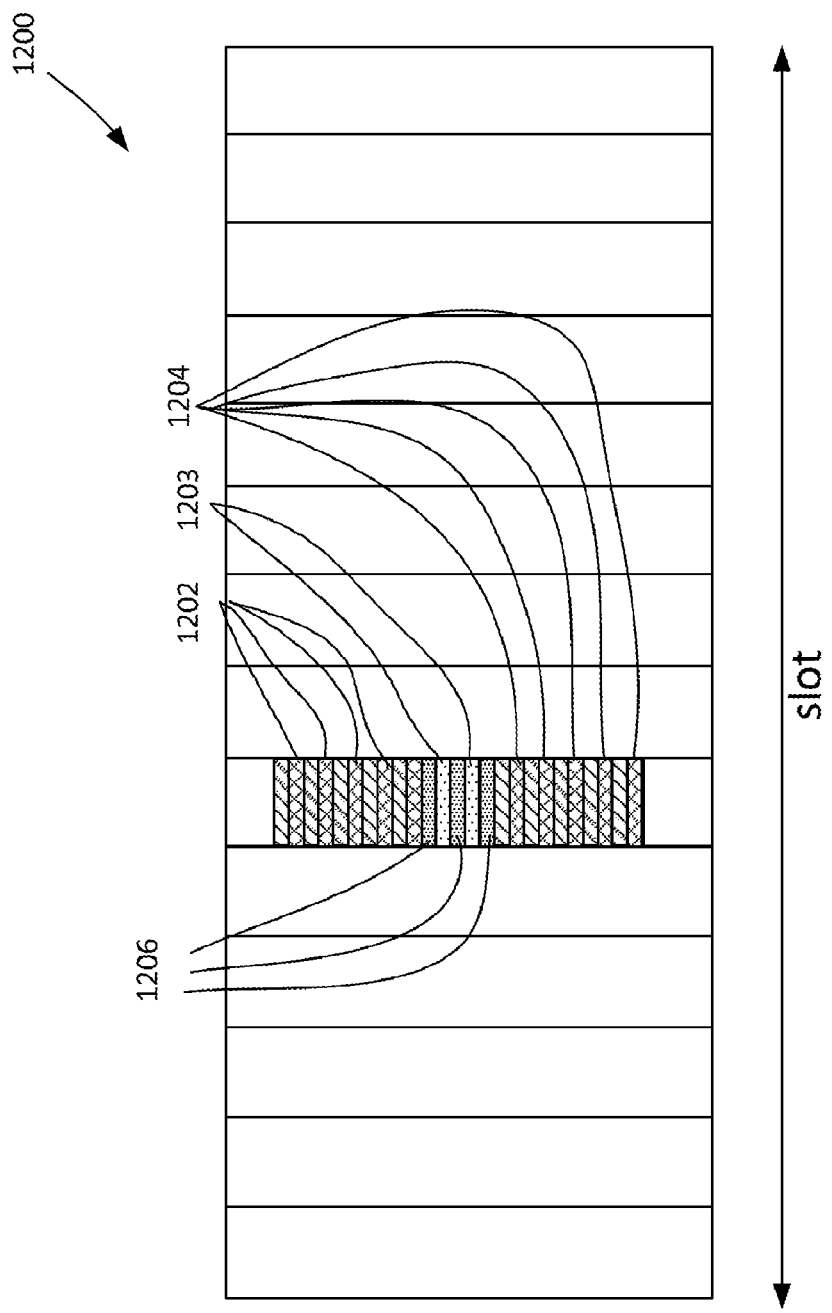
FIG. 12 depicts a slot showing one example of dedicated DM-RS 1202 for PDSCH 1204 and dedicated DM-RS 1203 for PDCCH 1206 respectively according to some embodiments.

Referring now to FIG. 12, a diagram of a slot 1200 is shown having 14 symbols, and showing symbol-level transmission therein. FIG. 12 illustrates one example of dedicated DM-RS 1202 for PDSCH 1204 and dedicated DM-RS 1203 for PDCCH 1206 respectively, where PDSCH 1204 and PDCCH 1206 are transmitted in the same symbol. In the example, localized transmission is employed for PDCCH 1206 (in terms of a localized frequency) while a distributed transmission (in terms of the frequencies used for the PDSCH 1204 transmission being distributed across a top region and bottom region of the slot bandwidth) is employed. In addition, different DM-RS patterns in the frequency domain, including DM-RS density in the frequency domain, may be used for the transmission of PDCCH and PDSCH, respectively as shown in FIG. 12.

Where the PDSCH and/or PDCCH span two or more symbols, depending on a transmission duration of the PDCCH transmission, different DM-RS positions may be considered.

Figure 13:
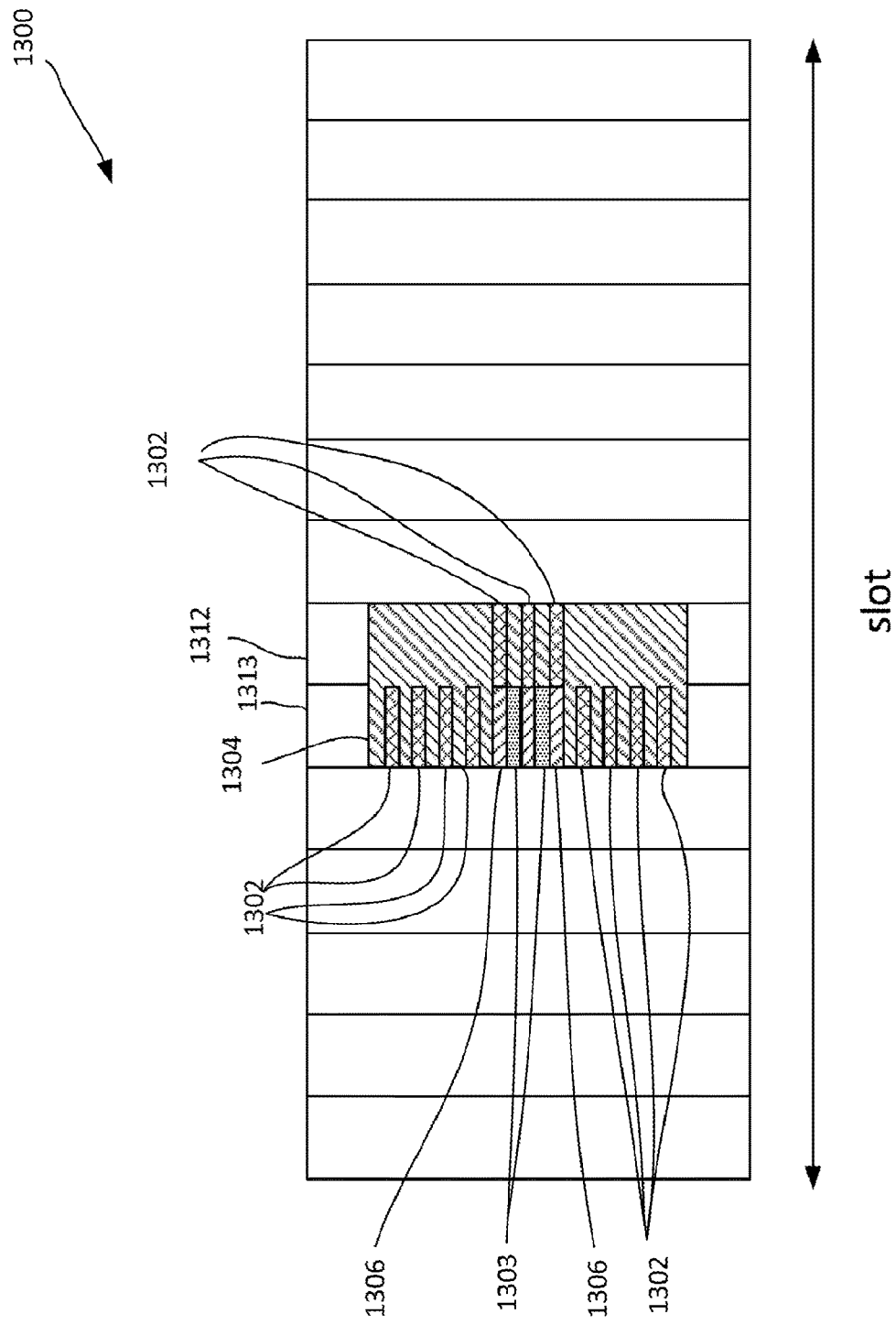
FIG. 13 depicts a slot showing one example of a PDSCH spanning more than one symbol, with a PDCCH transmitted in the first symbol of an allocated PDSCH resource, where the DM-RS for PDSCH is transmitted in the first symbol within the resource where PDSCH and PDCCH do not overlap according to some embodiments.

In this regard, reference is first made to FIG. 13. FIG. 13 shows a diagram of a slot 1300 having 14 symbols, and showing a PDSCH 1304 which spans two symbols 1312 and 1313. According to a first option, as shown in FIG. 13, where the PDSCH, such as PDSCH 1304, spans more than one symbol, and where a PDCCH 1306 is transmitted in the first symbol of an allocated PDSCH resource (in this case, in symbol 1312), the DM-RS 1302 for PDSCH is transmitted in the first symbol within the resource where PDSCH and PDCCH do not overlap. Alternatively, or additionally, in the second symbol of PDSCH transmission, DM-RS 1302 for PDSCH can be transmitted on the frequency resources in the second symbol where PDSCH and PDCCH overlap the first symbol as seen in the frequency domain. As shown, the DM-RS 1303 for PDCCH is transmitted in the first symbol.

In another, second option, in case when a PDSCH spans more than one symbol and a PDCCH is transmitted in the first symbol of an allocated PDSCH resource, DM-RS for PDSCH is transmitted in the second symbol of the PDSCH transmission. In this regard, reference is made to FIG. 14, which shows a diagram of a slot 1400 having 14 symbols, and showing a PDSCH 1404 which spans two symbols 1412 and 1413, along with PDCCH 1406 which spans one symbol. In addition, a dedicated DM-RS 1403 is employed for the PDCCH transmission, and a dedicated DM-RS 1402 is employed for PDSCH transmission. FIG. 7 illustrates one example of option 2 for DM-RS positions when PDSCH spans two symbols.

Figure 14:
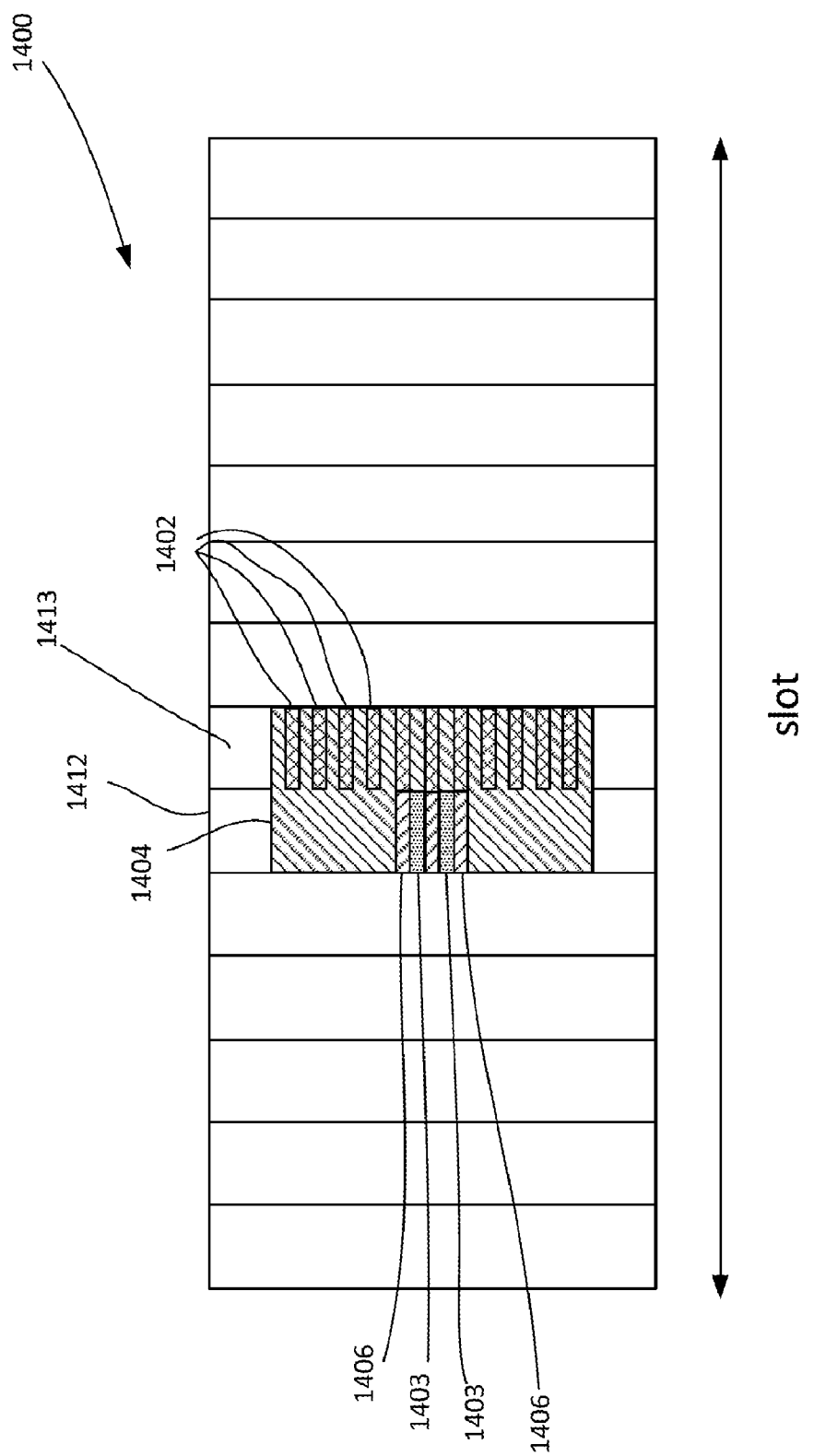
FIG. 14 depicts a slot showing one example of a PDSCH spanning two symbols, along with a PDCCH spanning one symbol, with a dedicated DM-RS for the PDCCH transmission, and a dedicated DM-RS PDSCH the transmission according to some embodiments.

A same principle for the first and second options shown by way of example in FIGS. 13 and 14 respectively may apply for a case where a duration of a PDSCH transmission is greater than a duration of a PDCCH transmission. For example, when a PDSCH spans 3 symbols, and PDCCH spans 2 symbols.

Figure 15:
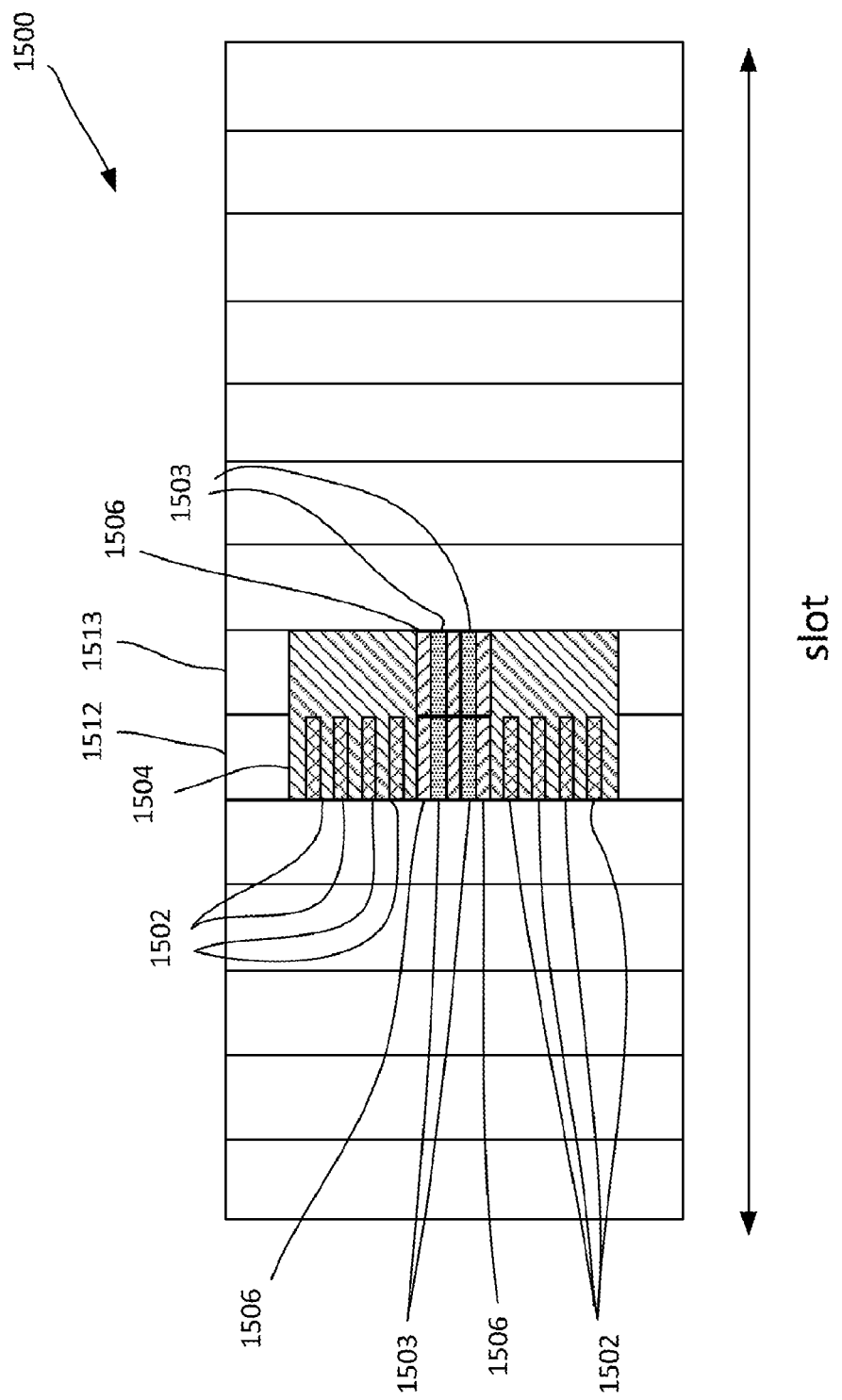
FIG. 15 depicts a slot showing another example of a PDSCH spanning two symbols, along with a PDCCH spanning one symbol, with a dedicated DM-RS for the PDCCH transmission, and a dedicated DM-RS PDSCH the transmission according to some embodiments.

According to a third option, when the PDSCH and PDCCH are transmitted in two symbols, a DM-RS for PDSCH is transmitted in the first symbol of PDSCH transmission in the allocated resource, while DM-RS for PDCCH is transmitted in the first symbol only or both symbols for PDCCH transmission. In this regard, reference is made to FIG. 15, which shows a diagram of a slot 1500 having 14 symbols, and showing a PDSCH 1504 which spans two symbols 1512 and 1513, along with PDCCH 1506 which spans two symbols. In addition, a dedicated DM-RS 1503 is employed for the PDCCH transmission, and a dedicated DM-RS 1502 is employed for PDSCH transmission. Here, DM-RS 1502 for PDSCH is transmitted in the first symbol of PDSCH transmission in the allocated resource, while DM-RS 1503 for PDCCH is transmitted in both symbols for PDCCH transmission.

Whether DM-RS for PDCCH and DM-RS for PDSCH can share the same symbol can be determined by the antenna port (AP) multiplexing scheme of DM-RS for PDSCH. For example, if different APs are multiplexed in a FDM manner, the DM-RS for PDSCH and the DM-RS for PDCCH can share the same symbol. If different APs are distinguished by different cyclic shifts, the DM-RSs cannot share the same symbol.

According to a further embodiment, when a PDCCH and PDSCH are transmitted in the same symbol(s), the PDSCH and PDCCH can be multiplexed using spatial division multiplexing (SDM), or a combination of FDM and SDM. In particular, where a PDSCH is scheduled based on transmission on multiple layers, one layer can be used for the transmission of PDCCH in the shared physical resource. Further, remaining layers for overlapped resources or all layers for non-overlapped resources can be used for the transmission of PDSCH. An AP index used for the transmission of PDCCH can be pre-defined or configured by higher layers via RRC signaling, or derived from one or more of the following parameters: physical or virtual cell identifier (ID), UE ID, and time or frequency resource index including symbol/slot/frame index, etc. Whether to employ SDM for PDCCH and PDSCH can be configured by higher layers via NR minimum system information (MSI), NR remaining minimum system information (RMSI), NR system information block (SIB) or radio resource control (RRC) signaling.

Figure 16:
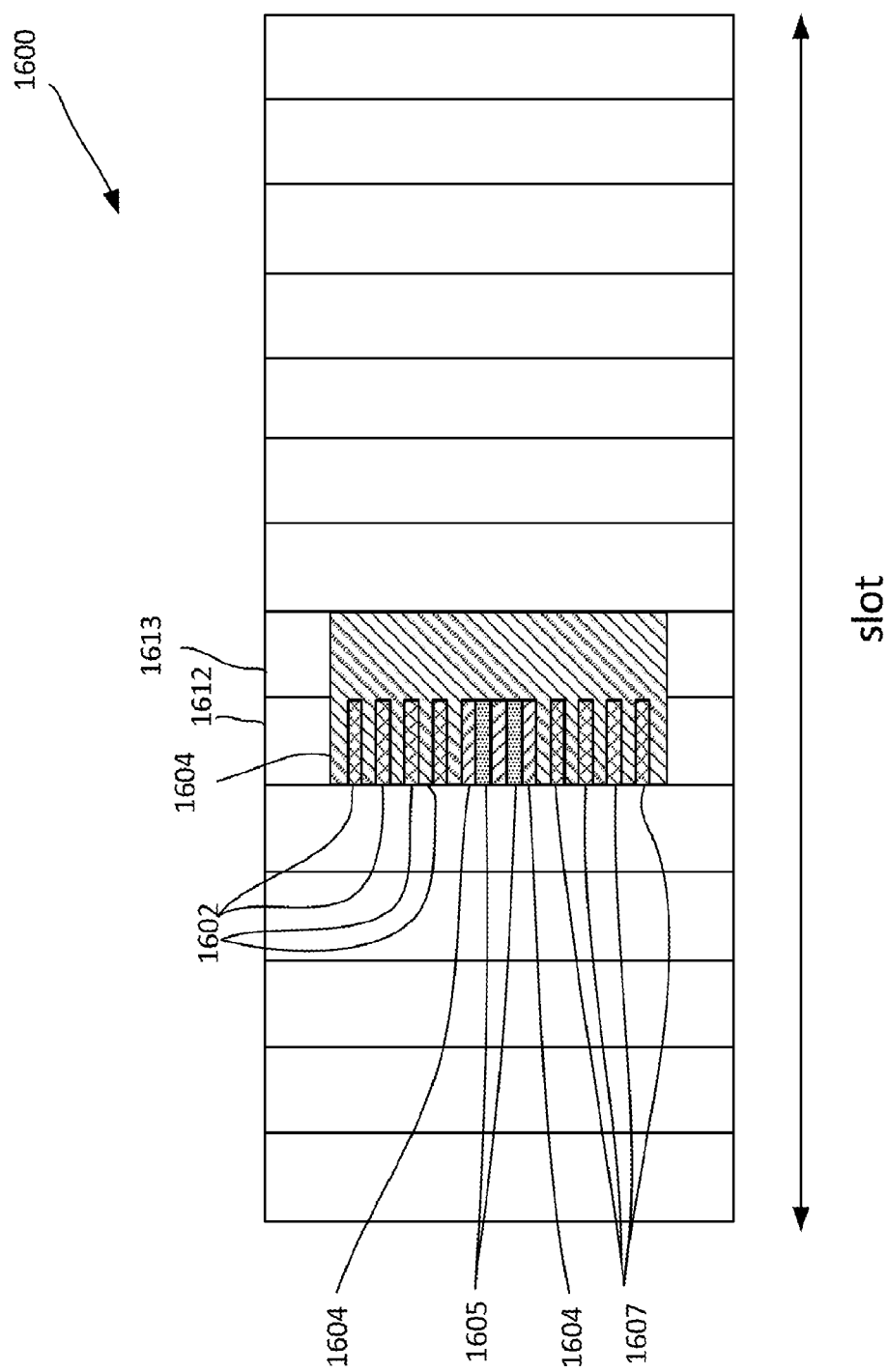
FIG. 16 depicts a slot showing one example of multiplexing of PDSCH and PDCCH in a space division multiplexing (SDM) manner according to some embodiments.

FIG. 16 illustrates one example of multiplexing of PDSCH and PDCCH in a SDM manner. FIG. 16 shows a diagram of a slot 1600 having 14 symbols, and showing a PDSCH 1604 which spans two symbols 1612 and 1613, along with a shared resource 1607 for PDSCH and PDCCH, which shared resource 1607 spans one symbol. In addition, a dedicated DM-RS 1602 is employed for PDSCH transmission, while a shared DM-RS 1605 is employed for both PDSCH and PDCCH. In the example, two symbols are allocated for PDSCH transmission 1604, and PDCCH is transmitted in the first symbol of PDSCH transmission (multiplexed using SDM). Shared resource and shared DM-RS in the first symbol is employed for the transmission of PDCCH and PDSCH. Thus, according to one embodiment, a shared DM-RS can be used for the transmission of PDSCH and PDCCH on a shared resource. According to one option, the shared DM-RS can be generated based on the DM-RS used for the PDCCH. Alternatively, the shared DM-RS can be generated based on the DM-RS used for the PDSCH.

If different APs of DM-RS are multiplexed in a FDM manner, the resource elements (REs) used for PDCCH can be around the REs for DM-RS allocated by the APs for PDCCH. If different APs of DM-RS are distinguished by different cyclic shifts, there can be only the DM-RS for PDSCH, and the PDCCH can be quasi-co-located (QCL'd) with one or some APs of DM-RS. The block-wise DM-RS can be used, where the search space of one UE could be within one block. If Orthogonal Cover Code (OCC) can be configured or used for DM-RS transmission, no-OCC may be applied when the shared DM-RS for PDCCH and PDSCH is used.

As another embodiment, the DM-RS location (in the time domain) for a symbol-level PDSCH can be made to depend on the location of the first symbol of the scheduled symbol-level PDSCH within the slot. Specifically, for a symbol-level PDSCH occurring within a certain number of symbols from a front-loaded DM-RS location for slot-level scheduling, the DM-RS for the symbol-level PDSCH occurs in the same symbol as the front-loaded DM-RS for slot-level scheduling, e.g., the $2^{nd}$, $3^{rd}$ or $4^{th}$ symbol within a slot. According to this embodiment, the maximum time gap in number of symbols from the end of front-loaded DM-RS to the beginning of the first symbol of the symbol-level PDSCH for slot-level scheduling can be specified or configured via higher layers (NR minimum system information (MSI), NR remaining minimum system information (RMSI), NR system information block (SIB) or radio resource control (RRC) signaling.

In one example, the maximum time gap can be defined such that the first symbol of the symbol-level PDSCH occurs in the same slot (for 7-symbol slots) or in the same first half of the slot (for 14-symbol slot) as the front-loaded DM-RS. Although NR does not use 7 symbols slots, the use of 7 symbol slots may be implemented in next generation cellular standards. In another example, the maximum time gap is defined similarly, but with the additional constraint that the first symbol of the PDSCH occurs at least after the front-loaded slot-level DM-RS symbol. Such a consideration is in view of support of pipelined implementation in the UE receiver to aid fast receiver processing time. In case the relative timing constraint is not satisfied, the symbol-level PDSCH can be configured with DM-RS embedded within the PDSCH symbols as in one or more of the embodiments presented in the previous sections of this disclosure.

If an additional DM-RS symbol (in addition to the front-loaded DM-RS symbol) is configured in case of a 14-symbol slot case, in an example, the front-loaded DM-RS for a symbol-level PDSCH with the first symbol occurring in the second half of a 14-symbol slot can be similarly associated with the additional DM-RS symbol occurring within the second half of the 14-symbol slot, i.e., based on the relative position of the first symbol of the symbol-level PDSCH and the additional DM-RS location within the second half of the 14-symbol slot. Otherwise, the symbol-level PDSCH can be configured with DM-RS embedded within the PDSCH symbols as in one or more of the embodiments presented in the previous sections of this disclosure.

For the above embodiments, it may be necessary for the UE to buffer the received DM-RS symbols until the PDCCH scheduling the symbol-level PDSCH is received and decoded to determine the association to the appropriate DM-RS symbol.

Additionally, for the cases of configured additional DM-RS symbol(s), a time domain bundling for channel estimation may be configured. For example, a one-bit indication as to whether channel estimation may be interpolated/extrapolated over all configured symbols or per configured symbols and applied only on symbols which associated with the DM-RS may be signaled.

It is to be noted that, although localized transmission is shown in FIG. 16, a similar design concept can be straightforwardly extended to the case when distributed transmission is employed for PDCCH and PDSCH.

A second set of embodiments relating to multiplexing schemes for control/data channel and DM-RS for NR having been described above, a third embodiment relating to the activation mechanism. scheduling aspects and Synchronization Signal (SS) block numerology for multiple BWPs.

Adjusting Operating Bandwidth Capability Depending on Data Rate

According to a third set of embodiments, an activation of multiple BWPs with a same numerology is either allowed or not allowed. There appears to be no RF power saving by activating multiple BWPs instead of activating one wider BWP containing the multiple BWPs. The above is because, for a single RF chain, the opened RF BW cannot be discontinuous. From the perspective of configuring different slot durations on a per symbol basis, the activation of multiple BWPs can be useful. For instance, where one BWP has a 7-symbol slot duration, while another BWP has a 14-symbol slot duration, the configuration of different slot durations can be helpful to serve traffics with different latency requirement. For a BWP configured with longer slot durations, the PDCCH monitoring overhead can be reduced. It is to be noted that, although NR does not implement varying slot durations (the slot duration in NR being 14 symbols long at the time of the instant disclosure and NR not encompassing a 7-symbol slot), the above regime may be useful in later iterations of cellular standards. For a given UE, there seems to be no use case of configuring different CP types for simultaneously activated different BWPs with the same numerology, and it is expected that the support of multiple BWPs with same numerology would not impose significant burden to UE implementation.

As suggested above, an activation of multiple BWPs with same numerology may be allowed with different slot durations. The number of BWPs with different numerologies that can be simultaneously supported can be based on the UE's capability. In the latter case, the UE may use signaling to communicate such capability to the gNodeB. According to one embodiment, simultaneously activated BWPs may overlap in the frequency domain, or they may not be allowed to overlap in the frequency domain.

According to one embodiment, an activation of multiple BWPs with different numerologies is allowed, regardless of whether the UE in question either supports or does not support different numerologies at the same time instance. A motivating scenario favored by the simultaneous activation of multiple BWPs with different numerologies includes serving URLLC traffic with wider subcarrier spacing (SCS) than that for eMBB traffic. As noted previously, the multiple BWPs can be overlapping or non-overlapping in the frequency domain. If a BWP for URLLC overlaps with a BWP for eMBB, the preemption based URLLC transmission over eMBB transmission may be employed.

An activation of multiple BWPs with different numerologies may imply that a UE has to be able to process different numerologies in the same time instance. Supporting multiple numerologies at a given time instance requires a UE to implement multiple FFT/IFFT and digital signal processing chains to process different numerologies at the same time. As a result, RAN1 has derived an agreement in a previous meeting to the effect that: "[i]t does not imply that it is required for UE to support different numerologies at the same Instance." As noted previously, a number of BWPs with different numerologies that can be simultaneously supported may be based on a UE's capabilities. If a UE supports different numerologies at the same time instance, multiple BWPs with different numerologies can be activated by gNodeB.

However, it is also possible that multiple BWPs with different numerologies can be activated while a UE does not support different numerologies at the same instance. In such a situation, the following options can be considered from a UE perspective: (1) signaling a semi-static TDM pattern of multiple BWPs to the UE; (2) using adaptive TDM on the multiple BWPs; and; (3) using dynamic indication as between the BWPs. Each of the above three options will be described in more detail below.

According to the first option involving semi-static TDM of multiple BWPs, for a given periodicity, the semi-static TDM pattern of multiple BWPs may be signaled to the UE. At a given time instance, the UE may monitor only the PDCCH with the corresponding numerology. Alternatively, different CORESETs in different BWPs can be configured to be monitored with different periodicities and time offsets with respect to a common reference time (e.g., system frame number=0 and slot index=0). At a given time instance, the UE then monitors only the PDCCH with the corresponding numerology. This can be achieved by configuring the BWP index along with the CORESET configuration as part of or separately from the PDCCH search space configuration. The option of semi-static TDM represents a simplest option out of the above three options, but may be the least efficient.

According to the second option involving adaptive TDM of multiple BWPs, a UE monitors the PDCCH using a default BWP. If a switching command is received to switch among the activated BWPs, the UE then moves to the signaled BWP for its signaling. However, if the UE has not been scheduled over some time period in the BWP, the UE goes back to the default BWP. Alternatively, or additionally, the UE can be configured to periodically monitor the default BWP, possibly with larger periodicity, by monitoring a common or UE-specific search space as a fallback mechanism. The default BWP can be configured such that the PDCCH monitoring overhead can be minimized.

According to the third option involving dynamic indication between the multiple BWPs, a current slot can indicate, such as via PDCCH, the BWP of the next slot for K symbols later among the set of activated BWPs. Although it is conceptually similar to activate one BWP at a time via DCI, it can be regarded that there is no RF retuning to be performed by a UE when multiple BWPs are activated, since the UE RF BW will be already opened up to cover the multiple BWPs. This option is the most efficient but has the risk of lost switching command.

With respect to a scheduling of BWPs, in the case of one active DL BWP for a given time instant, a configuration of a DL BWP may include at least one CORESET. Where multiple BWPs are active, multiple options may be considered according to some embodiments, including, by way of example, two options: (1) self-BWP scheduling; and (2) cross-BWP scheduling;

According to the first option involving self-BWP scheduling, each CORESET is configured for each BWP, and self-BWP scheduling applies in the sense that the PDCCH and the correspondingly scheduled PDSCH are contained within the same BWP. An analogy is the LTE self-carrier scheduling. Self-BWP scheduling provides the simplest approach, but the UE has to monitor multiple CORESETs.

According to the second option involving cross-BWP scheduling, a CORESET may be configured on only one BWP, and other activated BWPs do not have CORESET at the same time instance. CORESETs in other BWPs may be configured with TDM of monitoring occasions. The above option implies that the PDCCH is monitored in only one BWP in a given time instance and PDSCH in other BWPs must be scheduled by the PDCCH sent in the BWP having configured CORESET. The above is similar to cross-carrier scheduling. The cross-BWP scheduling can be especially suited for multiple activated BWPs with different numerologies. The above is because, if the SCSs of the multiple activated BWPs are different, it is not possible for a UE to monitor CORESETs with different SCS at the same instance, if the UE does not have such capability, i.e., processing multiple numerologies at a given instance. With cross-BWP scheduling, the PDSCH in other BWPs can be scheduled by PDCCH in a monitored BWP. The UE can be configured such that a UE expects to receive PDCCH in one BWP but not PDSCH in the same BWP. The UE does not need to monitor multiple CORESETs with different numerologies at the same time. According to one embodiment, the BWP ID can be indicated in the DCI. Cross-BWP scheduling can also be utilized for a UE with resource allocation for PDSCH or PUSCH spanning multiple BWPs, i.e., to realize a resource allocation over aggregated BWPs. In this case, the indices of the aggregated BWPs, contiguous in the frequency-domain, can be indicated to the UE via the scheduling DCI, along with the resource allocation information for each BWP. For the resource allocation, the starting BWP and PRB index and the last allocated BWP with the last PRB index may be indicated via the DCI, with an assumption of a contiguous resource allocation between the start and end PRBs.

This section discusses possible restrictions on NR system operation concerning with the numerology for SS block. Regarding SS block numerology, if a UE supports multiple numerologies at a given time instance (if it has separate chains dedicated for processing the SS block), according to one embodiment, the numerology, e.g., SCS or CP type, for an SS block can be different from the numerology of a BWP that may contain in it a frequency range for the SS block. If a UE supports only a single numerology at a given time instance, the UE is not expected to be scheduled during the slots containing SS blocks with different numerologies. If a UE supports only a single numerology at a given instance, the UE is not expected to be configured for a BWP having a different numerology with respect to the numerology for the SS block. Thus, the UE is not expected to be scheduled during the slots containing SS blocks with different numerologies. In other words, the UE may not monitor the PDCCH or receive PDSCH in those slots. In addition, the UE is not expected to be configured for a BWP having different numerology with the numerology for SS block. In other words, the UEs that do not have the capability to process multiple numerologies at the same time are expected to be configured such that the numerology for BWP containing SS block and the numerology for SS block are the same.

Example networks and architectures that may be used to implement some demonstrative embodiments will be shown and described with respect to FIGS. 17-24 below.

Figure 17:
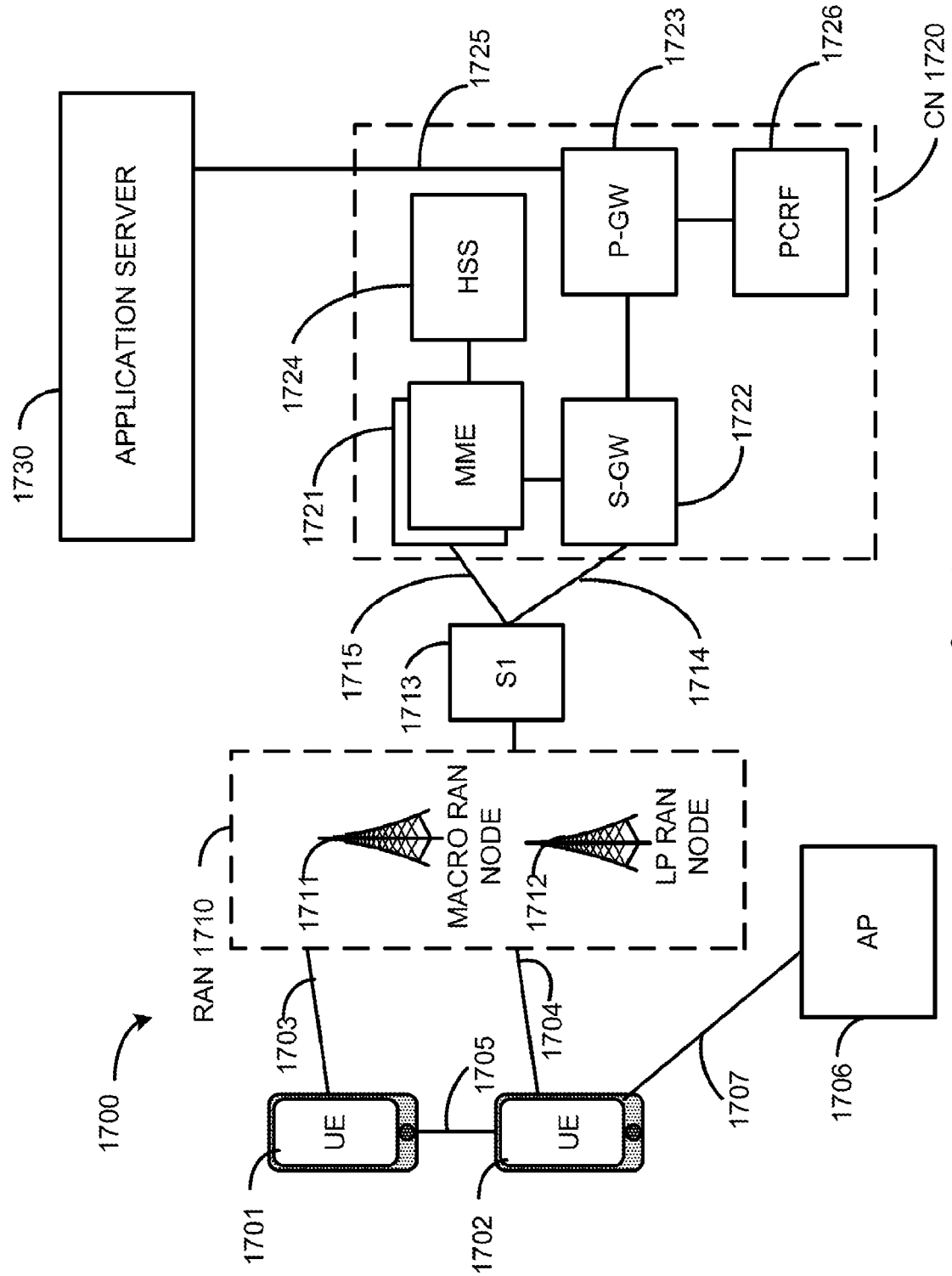
FIG. 17 depicts an architecture of a system of a network in accordance with some embodiments.

FIG. 17 illustrates an architecture of a system 1700 of a network in accordance with some embodiments. The system 1700 is shown to include a user equipment (UE) 1701 and a UE 1702. The UEs 1701 and 1702 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface. These UEs could include NR UEs.

In some embodiments, any of the UEs 1701 and 1702 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 1701 and 1702 may be configured to connect, e.g., communicatively couple, with a radio access network (RAN) 1710—the RAN 1710 may be, for example, an Evolved Universal Mobile Telecommunications System (UMTS) Terrestrial Radio Access Network (E-UTRAN), a NextGen RAN (NG RAN), or some other type of RAN. The UEs 1701 and 1702 utilize connections 1703 and 1704, respectively, each of which comprises a physical communications interface or layer (discussed in further detail below); in this example, the connections 1703 and 1704 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 1701 and 1702 may further directly exchange communication data via a ProSe interface 1705. The ProSe interface 1705 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 1702 is shown to be configured to access an access point (AP) 1706 via connection 1707. The connection 1707 can comprise a local wireless connection, such as a connection consistent with any IEEE 802.11 protocol, wherein the AP 1706 would comprise a wireless fidelity (WiFi®) router. In this example, the AP 1706 is shown to be connected to the Internet without connecting to the core network of the wireless system (described in further detail below).

The RAN 1710 can include one or more access nodes that enable the connections 1703 and 1704. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 1710 may include one or more RAN nodes for providing macrocells, e.g., macro RAN node 1711, and one or more RAN nodes for providing femtocells or picocells (e.g., cells having smaller coverage areas, smaller user capacity, or higher bandwidth compared to macrocells), e.g., low power (LP) RAN node 1712.

Any of the RAN nodes 1711 and 1712 can terminate the air interface protocol and can be the first point of contact for the UEs 1701 and 1702. In some embodiments, any of the RAN nodes 1711 and 1712 can fulfill various logical functions for the RAN 1710 including, but not limited to, radio network controller (RNC) functions such as radio bearer management, uplink and downlink dynamic radio resource management and data packet scheduling, and mobility management.

In accordance with some embodiments, the UEs 1701 and 1702 can be configured to communicate using Orthogonal Frequency-Division Multiplexing (OFDM) communication signals with each other or with any of the RAN nodes 1711 and 1712 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 1711 and 1712 to the UEs 1701 and 1702, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 1701 and 1702. The physical downlink control channel (PDCCH) may carry information about the transport format and resource allocations related to the PDSCH channel, among other things. It may also inform the UEs 1701 and 1702 about the transport format, resource allocation, and H-ARQ (Hybrid Automatic Repeat Request) information related to the uplink shared channel. Typically, downlink scheduling (assigning control and shared channel resource blocks to the UEs 1702, 1702 within a cell) may be performed at any of the RAN nodes 1711 and 1712 based on channel quality information fed back from any of the UEs 1701 and 1702. The downlink resource assignment information may be sent on the PDCCH used for (e.g., assigned to) each of the UEs 1701 and 1702.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as an enhanced resource element groups (EREGs). An ECCE may have other numbers of EREGs in some situations.

The RAN 1710 is shown to be communicatively coupled to a core network (CN) 1720—via an S1 interface 1713. In embodiments, the CN 1720 may be an evolved packet core (EPC) network, a NextGen Packet Core (NPC) network, or some other type of CN. In this embodiment the S1 interface 1713 is split into two parts: the S1-U interface 1714, which carries traffic data between the RAN nodes 1711 and 1712 and the serving gateway (S-GW) 1722, and the S1-mobility management entity (MME) interface 1715, which is a signaling interface between the RAN nodes 1711 and 1712 and MMEs 1721.

In this embodiment, the CN 1720 comprises the MMEs 1721, the S-GW 1722, the Packet Data Network (PDN) Gateway (P-GW) 1723, and a home subscriber server (HSS) 1724. The MMEs 1721 may be similar in function to the control plane of legacy Serving General Packet Radio Service (GPRS) Support Nodes (SGSN). The MMEs 1721 may manage mobility aspects in access such as gateway selection and tracking area list management. The HSS 1724 may comprise a database for network users, including subscription-related information to support the network entities' handling of communication sessions. The CN 1720 may comprise one or several HSSs 1724, depending on the number of mobile subscribers, on the capacity of the equipment, on the organization of the network, etc. For example, the HSS 1724 can provide support for routing/roaming, authentication, authorization, naming/addressing resolution, location dependencies, etc.

The S-GW 1722 may terminate the S1 interface 1713 towards the RAN 1710, and routes data packets between the RAN 1710 and the CN 1720. In addition, the S-GW 1722 may be a local mobility anchor point for inter-RAN node handovers and also may provide an anchor for inter-3GPP mobility. Other responsibilities may include lawful intercept, charging, and some policy enforcement.

The P-GW 1723 may terminate an SGi interface toward a PDN. The P-GW 1723 may route data packets between the CN 1723 and external networks such as a network including the application server 1730 (alternatively referred to as application function (AF)) via an Internet Protocol (IP) interface 1725. Generally, the application server 1730 may be an element offering applications that use IP bearer resources with the core network (e.g., UMTS Packet Services (PS) domain, LTE PS data services, etc.). In this embodiment, the P-GW 1723 is shown to be communicatively coupled to an application server 1730 via an IP communications interface 1725. The application server 1730 can also be configured to support one or more communication services (e.g., Voice-over-Internet Protocol (VoIP) sessions, PTT sessions, group communication sessions, social networking services, etc.) for the UEs 1701 and 1702 via the CN 1720.

The P-GW 1723 may further be a node for policy enforcement and charging data collection. Policy and Charging Enforcement Function (PCRF) 1726 is the policy and charging control element of the CN 1720. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 1726 may be communicatively coupled to the application server 1730 via the P-GW 1723. The application server 1730 may signal the PCRF 1726 to indicate a new service flow and select the appropriate Quality of Service (QoS) and charging parameters. The PCRF 1726 may provision this rule into a Policy and Charging Enforcement Function (PCEF) (not shown) with the appropriate traffic flow template (TFT) and QoS class of identifier (QCI), which commences the QoS and charging as specified by the application server 1730.

Figure 18:
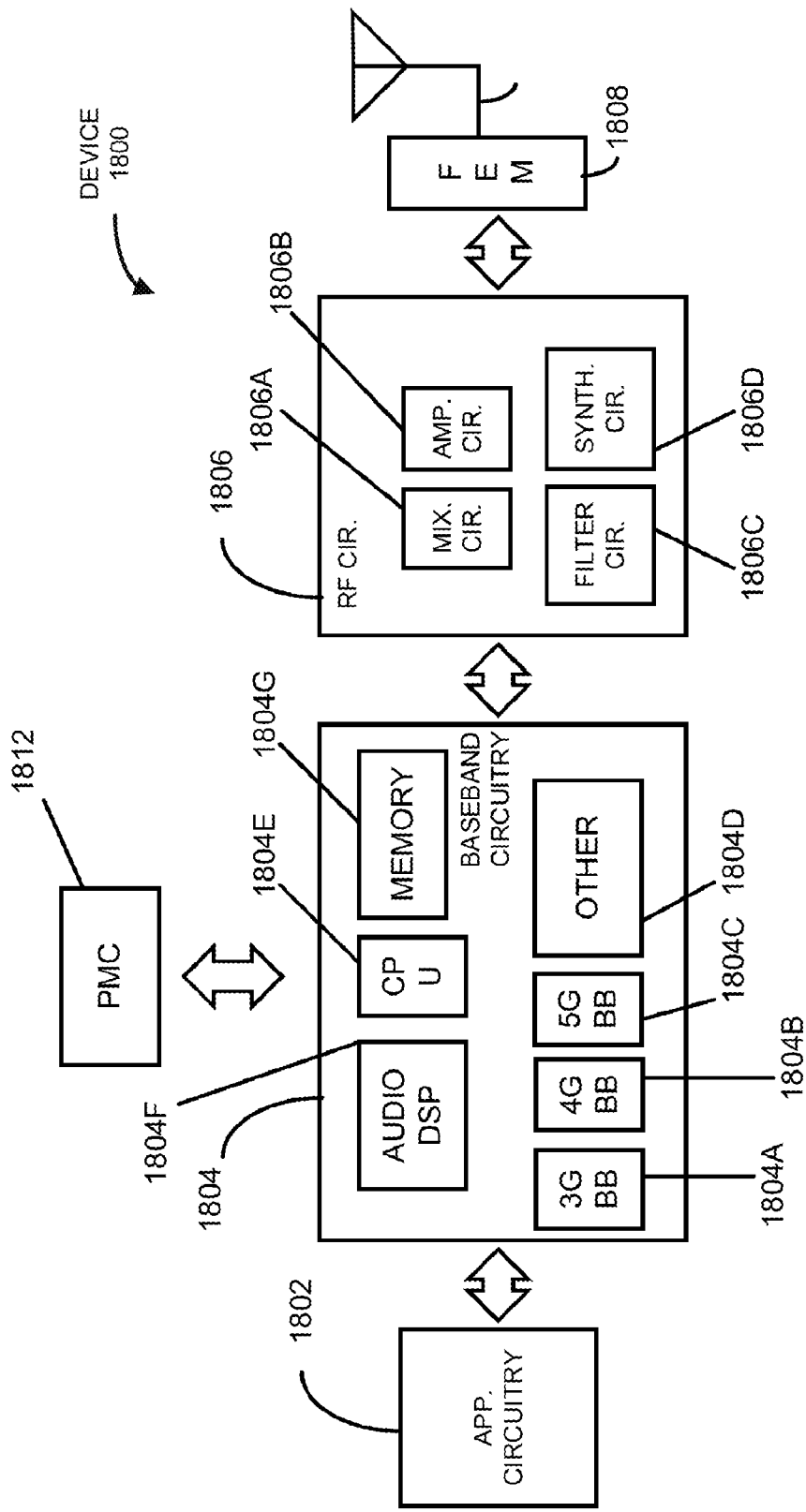
FIG. 18 depicts example components of a device in accordance with some embodiments.

FIG. 18 illustrates example components of a device 1800 in accordance with some embodiments. In some embodiments, the device 1800 may include application processing circuitry 1802, baseband processing circuitry 1804, Radio Frequency (RF) circuitry 1806, front-end module (FEM) circuitry 1808, one or more antennas 1810, and power management circuitry (PMC) 1812 coupled together at least as shown. The components of the illustrated device 1800 may be included in a UE or a RAN node. In some embodiments, the device 1800 may include less elements (e.g., a RAN node may not utilize application processing circuitry 1802, and instead include a processor/controller to process IP data received from an EPC). In some embodiments, the device 1800 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application processing circuitry 1802 may include one or more application processors. For example, the application processing circuitry 1802 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 1800. In some embodiments, processors of application processing circuitry 1802 may process IP data packets received from an EPC.

The baseband processing circuitry 1804 may include circuitry such as, but not limited to, one or more single-core or multi-core processors. The baseband processing circuitry 1804 may include one or more baseband processors or control logic to process baseband signals received from a receive signal path of the RF circuitry 1806 and to generate baseband signals for a transmit signal path of the RF circuitry 1806. Baseband processing circuitry 1804 may interface with the application processing circuitry 1802 for generation and processing of the baseband signals and for controlling operations of the RF circuitry 1806. For example, in some embodiments, the baseband processing circuitry 1804 may include a third generation (3G) baseband processor 1804A, a fourth generation (4G) baseband processor 1804B, a fifth generation (5G) baseband processor 1804C, or other baseband processor(s) 1804D for other existing generations, generations in development or to be developed in the future (e.g., second generation (2G), sixth generation (6G), etc.). The baseband processing circuitry 1804 (e.g., one or more of baseband processors 1804A-D) may handle various radio control functions that enable communication with one or more radio networks via the RF circuitry 1806. In other embodiments, some or all of the functionality of baseband processors 1804A-D may be included in modules stored in the memory 1804G and executed via a Central Processing Unit (CPU) 1804E. The radio control functions may include, but are not limited to, signal modulation/demodulation, encoding/decoding, radio frequency shifting, etc. In some embodiments, modulation/demodulation circuitry of the baseband processing circuitry 1804 may include Fast-Fourier Transform (FFT), precoding, or constellation mapping/demapping functionality. In some embodiments, encoding/decoding circuitry of the baseband processing circuitry 1804 may include convolution, tail-biting convolution, turbo, Viterbi, or Low-Density Parity Check (LDPC) encoder/decoder functionality. Embodiments of modulation/demodulation and encoder/decoder functionality are not limited to these examples and may include other suitable functionality in other embodiments. The baseband processing circuitry may cause transmission of signals by encoding baseband signals for further processing and transmission by way of the RF circuitry and antennas.

In some embodiments, the baseband processing circuitry 1804 may include one or more audio digital signal processor(s) (DSP) 1804F. The audio DSP(s) 1804F may be include elements for compression/decompression and echo cancellation and may include other suitable processing elements in other embodiments. Components of the baseband processing circuitry may be suitably combined in a single chip, a single chipset, or disposed on a same circuit board in some embodiments. In some embodiments, some or all of the constituent components of the baseband circuitry 1804 and the application processing circuitry 1802 may be implemented together such as, for example, on a system on a chip (SOC).

In some embodiments, the baseband processing circuitry 1804 may provide for communication compatible with one or more radio technologies. For example, in some embodiments, the baseband processing circuitry 1804 may support communication with an evolved universal terrestrial radio access network (EUTRAN) or other wireless metropolitan area networks (WMAN), a wireless local area network (WLAN), a wireless personal area network (WPAN). Embodiments in which the baseband processing circuitry 1804 is configured to support radio communications of more than one wireless protocol may be referred to as multi-mode baseband processing circuitry.

RF circuitry 1806 may enable communication with wireless networks using modulated electromagnetic radiation through a non-solid medium. In various embodiments, the RF circuitry 1806 may include switches, filters, amplifiers, etc. to facilitate the communication with the wireless network. RF circuitry 1806 may include a receive signal path which may include circuitry to down-convert RF signals received from the FEM circuitry 1808 and provide baseband signals to the baseband processing circuitry 1804. RF circuitry 1806 may also include a transmit signal path which may include circuitry to up-convert baseband signals provided by the baseband processing circuitry 1804 and provide RF output signals to the FEM circuitry 1808 for transmission.

In some embodiments, the receive signal path of the RF circuitry 1806 may include mixer circuitry 1806a, amplifier circuitry 1806b and filter circuitry 1806c. In some embodiments, the transmit signal path of the RF circuitry 1806 may include filter circuitry 1806c and mixer circuitry 1806a. RF circuitry 1806 may also include synthesizer circuitry 1806d for synthesizing a frequency for use by the mixer circuitry 1806a of the receive signal path and the transmit signal path. In some embodiments, the mixer circuitry 1806a of the receive signal path may be configured to down-convert RF signals received from the FEM circuitry 1808 based on the synthesized frequency provided by synthesizer circuitry 1806d. The amplifier circuitry 1806b may be configured to amplify the down-converted signals and the filter circuitry 1806c may be a low-pass filter (LPF) or band-pass filter (BPF) configured to remove unwanted signals from the down-converted signals to generate output baseband signals. Output baseband signals may be provided to the baseband processing circuitry 1804 for further processing. In some embodiments, the output baseband signals may be zero-frequency baseband signals, although this is not a requirement. In some embodiments, mixer circuitry 1806a of the receive signal path may comprise passive mixers, although the scope of the embodiments is not limited in this respect.

In some embodiments, the mixer circuitry 1806a of the transmit signal path may be configured to up-convert input baseband signals based on the synthesized frequency provided by the synthesizer circuitry 1806d to generate RF output signals for the FEM circuitry 1808. The baseband signals may be provided by the baseband processing circuitry 1804 and may be filtered by filter circuitry 1806c.

In some embodiments, the mixer circuitry 1806a of the receive signal path and the mixer circuitry 1806a of the transmit signal path may include two or more mixers and may be arranged for quadrature downconversion and upconversion, respectively. In some embodiments, the mixer circuitry 1806*a* of the receive signal path and the mixer circuitry 1806*a* of the transmit signal path may include two or more mixers and may be arranged for image rejection (e.g., Hartley image rejection). In some embodiments, the mixer circuitry 1806*a* of the receive signal path and the mixer circuitry 1806*a* may be arranged for direct downconversion and direct upconversion, respectively. In some embodiments, the mixer circuitry 1806*a* of the receive signal path and the mixer circuitry 1806*a* of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 1806 may include analog-to-digital converter (ADC) and digital-to-analog converter (DAC) circuitry and the baseband processing circuitry 1804 may include a digital baseband interface to communicate with the RF circuitry 1806.

In some dual-mode embodiments, a separate radio IC circuitry may be provided for processing signals for each spectrum, although the scope of the embodiments is not limited in this respect.

In some embodiments, the synthesizer circuitry 1806*d* may be a fractional-N synthesizer or a fractional N/N+1 synthesizer, although the scope of the embodiments is not limited in this respect as other types of frequency synthesizers may be suitable. For example, synthesizer circuitry 1806*d* may be a delta-sigma synthesizer, a frequency multiplier, or a synthesizer comprising a phase-locked loop with a frequency divider.

The synthesizer circuitry 1806*d* may be configured to synthesize an output frequency for use by the mixer circuitry 1806*a* of the RF circuitry 1806 based on a frequency input and a divider control input. In some embodiments, the synthesizer circuitry 1806*d* may be a fractional N/N+1 synthesizer.

In some embodiments, frequency input may be provided by a voltage-controlled oscillator (VCO), although that is not a requirement. Divider control input may be provided by either the baseband processing circuitry 1804 or the applications processor 1802 depending on the desired output frequency. In some embodiments, a divider control input (e.g., N) may be determined from a look-up table based on a channel indicated by the applications processor 1802.

Synthesizer circuitry 1806*d* of the RF circuitry 1806 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 1806*d* may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 1806 may include an IQ/polar converter.

FEM circuitry 1808 may include a receive signal path which may include circuitry configured to operate on RF signals received from one or more antennas 1810, amplify the received signals and provide the amplified versions of the received signals to the RF circuitry 1806 for further processing. FEM circuitry 1808 may also include a transmit signal path which may include circuitry configured to amplify signals for transmission provided by the RF circuitry 1806 for transmission by one or more of the one or more antennas 1810. In various embodiments, the amplification through the transmit or receive signal paths may be done solely in the RF circuitry 1806, solely in the FEM 1808, or in both the RF circuitry 1806 and the FEM 1808.

In some embodiments, the FEM circuitry 1808 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 1806). The transmit signal path of the FEM circuitry 1808 may include a power amplifier (PA) to amplify input RF signals (e.g., provided by RF circuitry 1806), and one or more filters to generate RF signals for subsequent transmission (e.g., by one or more of the one or more antennas 1810).

In some embodiments, the PMC 1812 may manage power provided to the baseband processing circuitry 1804. In particular, the PMC 1812 may control power-source selection, voltage scaling, battery charging, or DC-to-DC conversion. The PMC 1812 may often be included when the device 1800 is capable of being powered by a battery, for example, when the device is included in a UE. The PMC 1812 may increase the power conversion efficiency while providing desirable implementation size and heat dissipation characteristics.

While FIG. 18 shows the PMC 1812 coupled only with the baseband processing circuitry 1804. However, in other embodiments, the PMC 1812 may be additionally or alternatively coupled with, and perform similar power management operations for, other components such as, but not limited to, application processing circuitry 1802, RF circuitry 1806, or FEM 1808.

In some embodiments, the PMC 1812 may control, or otherwise be part of, various power saving mechanisms of the device 1800. For example, if the device 1800 is in an RRC_Connected state, where it is still connected to the RAN node as it expects to receive traffic shortly, then it may enter a state known as Discontinuous Reception Mode (DRX) after a period of inactivity. During this state, the device 1800 may power down for brief intervals of time and thus save power.

If there is no data traffic activity for an extended period of time, then the device 1800 may transition off to an RRC_Idle state, where it disconnects from the network and does not perform operations such as channel quality feedback, handover, etc. The device 1800 goes into a very low power state and it performs paging where again it periodically wakes up to listen to the network and then powers down again. The device 1800 may not receive data in this state, in order to receive data, it must transition back to RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application processing circuitry 1802 and processors of the baseband processing circuitry 1804 may be used to execute elements of one or more instances of a protocol stack. For example, processors of the baseband processing circuitry 1804, alone or in combination, may be used execute Layer 3, Layer 2, or Layer 1 functionality, while processors of the application processing circuitry 1804 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 19:
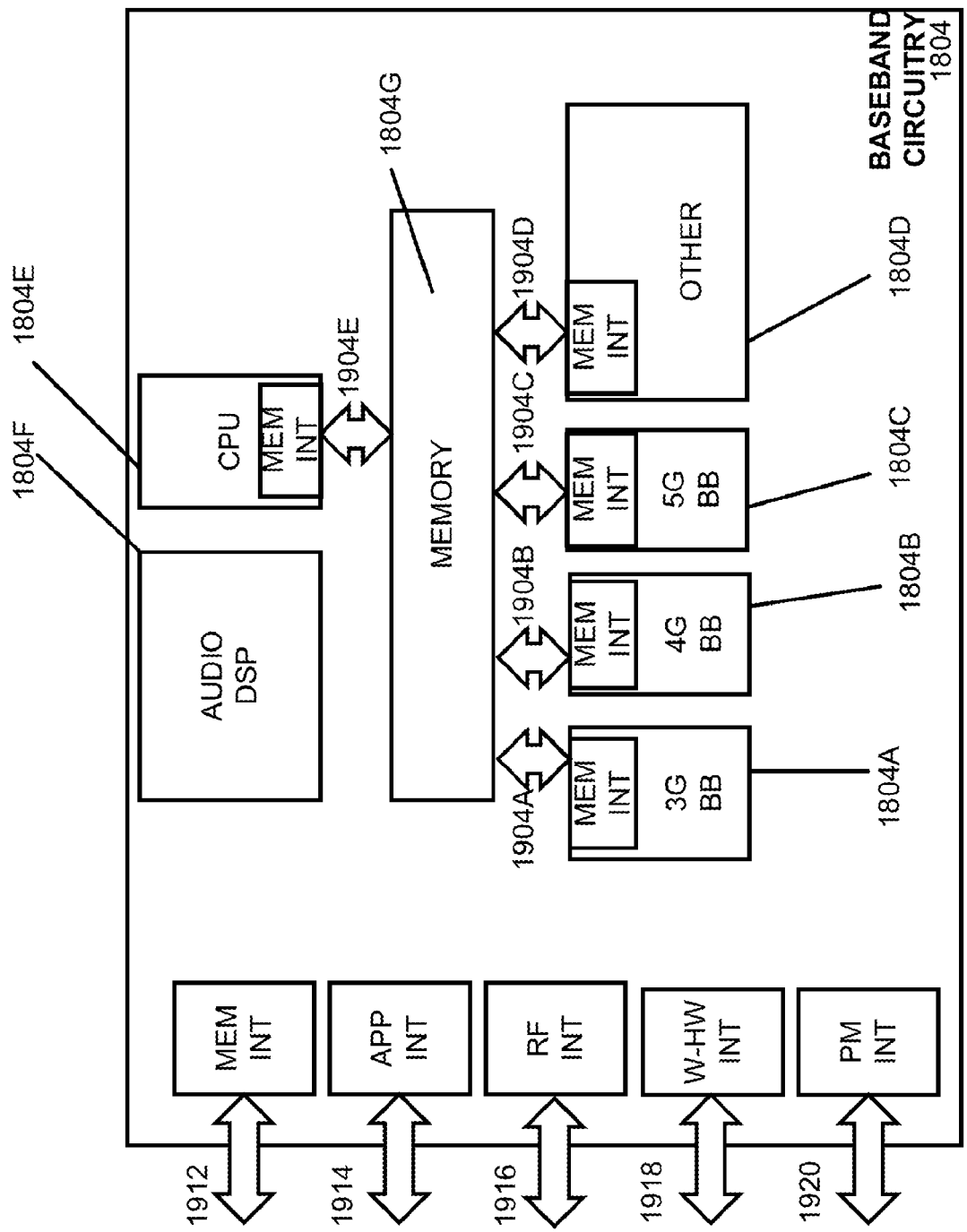
FIG. 19 depicts example interfaces of baseband processing circuitry in accordance with some embodiments.

FIG. 19 illustrates example interfaces of baseband processing circuitry in accordance with some embodiments. As discussed above, the baseband processing circuitry 1804 of FIG. 18 may comprise processors 1804A-XT04E and a memory 1804G utilized by said processors. Each of the processors 1804A-XT04E may include a memory interface, 1904A-XU04E, respectively, to send/receive data to/from the memory 1804G.

The baseband processing circuitry 1804 may further include one or more interfaces to communicatively couple to other circuitries/devices, such as a memory interface 1912 (e.g., an interface to send/receive data to/from memory external to the baseband processing circuitry 1804), an application processing circuitry interface 1914 (e.g., an interface to send/receive data to/from the application processing circuitry 1802 of FIG. 18), an RF circuitry interface 1916 (e.g., an interface to send/receive data to/from RF circuitry 1806 of FIG. 18), a wireless hardware connectivity interface 1918 (e.g., an interface to send/receive data to/from Near Field Communication (NFC) components, Bluetooth® components (e.g., Bluetooth® Low Energy), Wi-Fi® components, and other communication components), and a power management interface 1920 (e.g., an interface to send/receive power or control signals to/from the PMC 1812.

Figure 20:
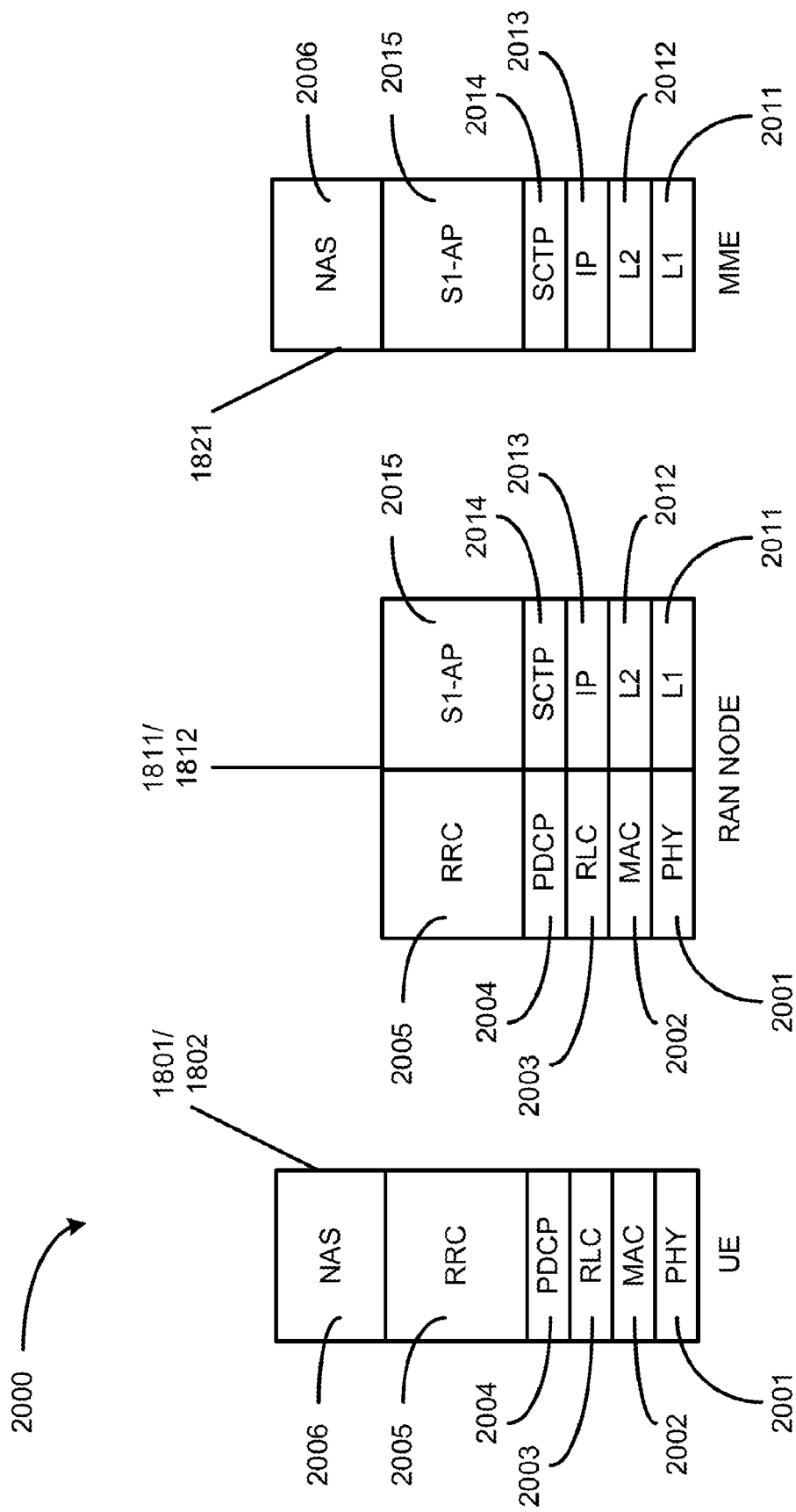
FIG. 20 depicts an illustration of a control plane protocol stack in accordance with some embodiments.

FIG. 20 is an illustration of a control plane protocol stack in accordance with some embodiments. In this embodiment, a control plane 2000 is shown as a communications protocol stack between the UE 1701 (or alternatively, the UE 1702), the RAN node 1711 (or alternatively, the RAN node 1712), and the MME 1721.

The PHY layer 2001 may transmit or receive information used by the MAC layer 2002 over one or more air interfaces. The PHY layer 2001 may further perform link adaptation or adaptive modulation and coding (AMC), power control, cell search (e.g., for initial synchronization and handover purposes), and other measurements used by higher layers, such as the RRC layer 2005. The PHY layer 2001 may still further perform error detection on the transport channels, forward error correction (FEC) coding/decoding of the transport channels, modulation/demodulation of physical channels, interleaving, rate matching, mapping onto physical channels, and Multiple Input Multiple Output (MIMO) antenna processing.

The MAC layer 2002 may perform mapping between logical channels and transport channels, multiplexing of MAC service data units (SDUs) from one or more logical channels onto transport blocks (TB) to be delivered to PHY via transport channels, de-multiplexing MAC SDUs to one or more logical channels from transport blocks (TB) delivered from the PHY via transport channels, multiplexing MAC SDUs onto TBs, scheduling information reporting, error correction through hybrid automatic repeat request (HARQ), and logical channel prioritization.

The RLC layer 2003 may operate in a plurality of modes of operation, including: Transparent Mode (TM), Unacknowledged Mode (UM), and Acknowledged Mode (AM). The RLC layer 2003 may execute transfer of upper layer protocol data units (PDUs), error correction through automatic repeat request (ARQ) for AM data transfers, and concatenation, segmentation and reassembly of RLC SDUs for UM and AM data transfers. The RLC layer 2003 may also execute re-segmentation of RLC data PDUs for AM data transfers, reorder RLC data PDUs for UM and AM data transfers, detect duplicate data for UM and AM data transfers, discard RLC SDUs for UM and AM data transfers, detect protocol errors for AM data transfers, and perform RLC re-establishment.

The PDCP layer 2004 may execute header compression and decompression of IP data, maintain PDCP Sequence Numbers (SNs), perform in-sequence delivery of upper layer PDUs at re-establishment of lower layers, eliminate duplicates of lower layer SDUs at re-establishment of lower layers for radio bearers mapped on RLC AM, cipher and decipher control plane data, perform integrity protection and integrity verification of control plane data, control timer-based discard of data, and perform security operations (e.g., ciphering, deciphering, integrity protection, integrity verification, etc.).

The main services and functions of the RRC layer 2005 may include broadcast of system information (e.g., included in Master Information Blocks (MIBs) or System Information Blocks (SIBs) related to the non-access stratum (NAS)), broadcast of system information related to the access stratum (AS), paging, establishment, maintenance and release of an RRC connection between the UE and E-UTRAN (e.g., RRC connection paging, RRC connection establishment, RRC connection modification, and RRC connection release), establishment, configuration, maintenance and release of point to point Radio Bearers, security functions including key management, inter radio access technology (RAT) mobility, and measurement configuration for UE measurement reporting. Said MIBs and SIBs may comprise one or more information elements (IEs), which may each comprise individual data fields or data structures.

The UE 1701 and the RAN node 1711 may utilize a Uu interface (e.g., an LTE-Uu interface) to exchange control plane data via a protocol stack comprising the PHY layer 2001, the MAC layer 2002, the RLC layer 2003, the PDCP layer 2004, and the RRC layer 2005.

The non-access stratum (NAS) protocols 2006 form the highest stratum of the control plane between the UE 1701 and the MME 1721. The NAS protocols 2006 support the mobility of the UE 1701 and the session management procedures to establish and maintain IP connectivity between the UE 1701 and the P-GW 1723.

The S1 Application Protocol (S1-AP) layer 2015 may support the functions of the S1 interface and comprise Elementary Procedures (EPs). An EP is a unit of interaction between the RAN node 1711 and the CN 1720. The S1-AP layer services may comprise two groups: UE-associated services and non UE-associated services. These services perform functions including, but not limited to: E-UTRAN Radio Access Bearer (E-RAB) management, UE capability indication, mobility, NAS signaling transport, RAN Information Management (RIM), and configuration transfer.

The Stream Control Transmission Protocol (SCTP) layer (alternatively referred to as the SCTP/IP layer) 2014 may ensure reliable delivery of signaling messages between the RAN node 1711 and the MME 1721 based, in part, on the IP protocol, supported by the IP layer 2013. The L2 layer 2012 and the L1 layer 2011 may refer to communication links (e.g., wired or wireless) used by the RAN node and the MME to exchange information.

The RAN node 1711 and the MME 1721 may utilize an S1-MME interface to exchange control plane data via a protocol stack comprising the L1 layer 2011, the L2 layer 2012, the IP layer 2013, the SCTP layer 2014, and the S1-AP layer 2015.

Figure 21:
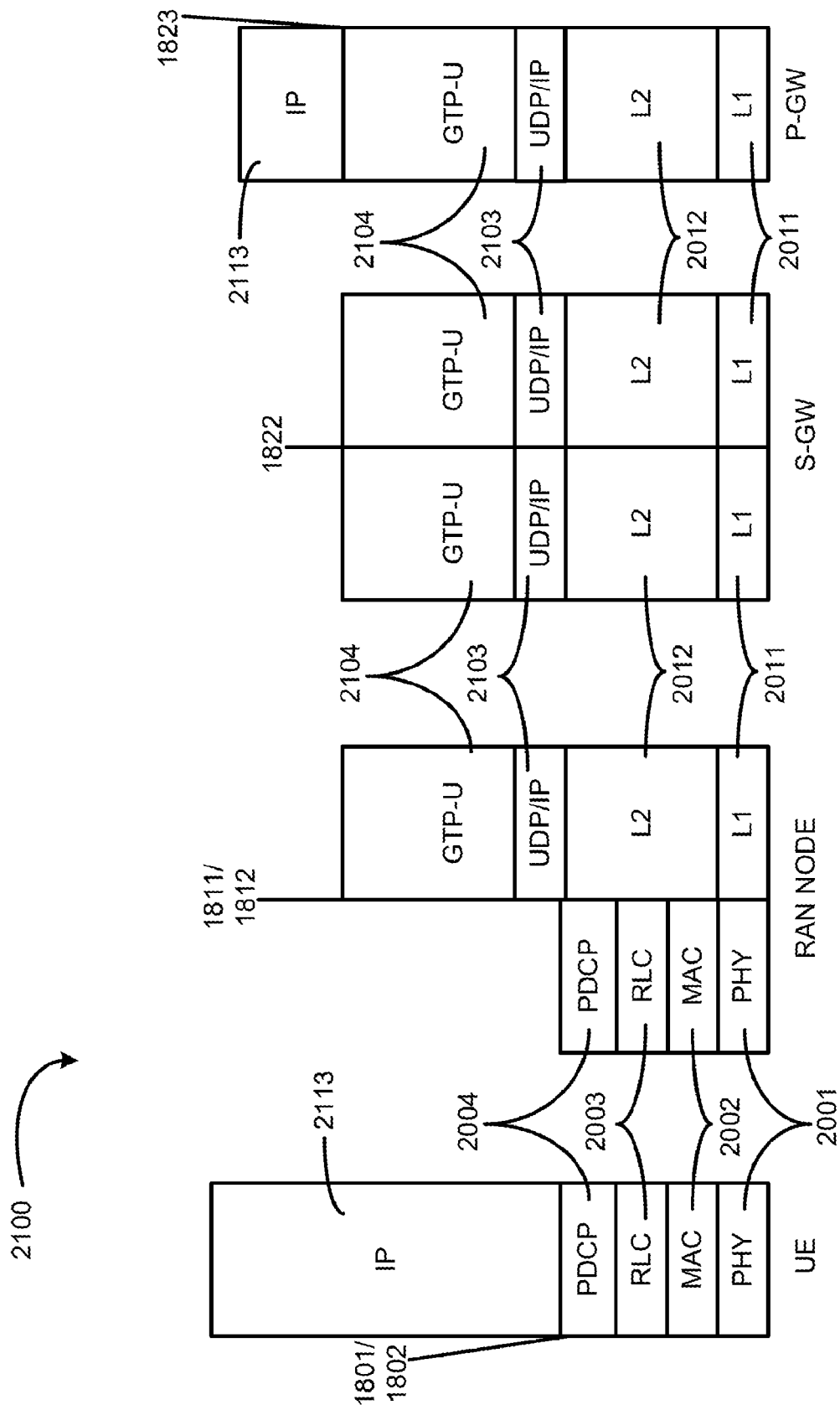
FIG. 21 depicts an illustration of a user plane protocol stack in accordance with some embodiments.

FIG. 21 is an illustration of a user plane protocol stack in accordance with some embodiments. In this embodiment, a user plane 2100 is shown as a communications protocol stack between the UE 1701 (or alternatively, the UE 1702), the RAN node 1711 (or alternatively, the RAN node 1712), the S-GW 1722, and the P-GW 1723. The user plane 2100 may utilize at least some of the same protocol layers as the control plane 2000. For example, the UE 1701 and the RAN node 1711 may utilize a Uu interface (e.g., an LTE-Uu interface) to exchange user plane data via a protocol stack comprising the PHY layer 2001, the MAC layer 2002, the RLC layer 2003, the PDCP layer 2004.

The General Packet Radio Service (GPRS) Tunneling Protocol for the user plane (GTP-U) layer 2104 may be used for carrying user data within the GPRS core network and between the radio access network and the core network. The user data transported can be packets in any of IPv4, IPv6, or PPP formats, for example. The UDP and IP security (UDP/IP) layer 2103 may provide checksums for data integrity, port numbers for addressing different functions at the source and destination, and encryption and authentication on the selected data flows. The RAN node 1711 and the S-GW 1722 may utilize an S1-U interface to exchange user plane data via a protocol stack comprising the L1 layer 2011, the L2 layer 2012, the UDP/IP layer 2103, and the GTP-U layer 2104. The S-GW 1722 and the P-GW 1723 may utilize an S5/S8a interface to exchange user plane data via a protocol stack comprising the L1 layer 2011, the L2 layer 2012, the UDP/IP layer 2103, and the GTP-U layer 2104. As discussed above with respect to FIG. 20, NAS protocols support the mobility of the UE 1701 and the session management procedures to establish and maintain IP connectivity between the UE 1701 and the P-GW 1723.

Figure 22:
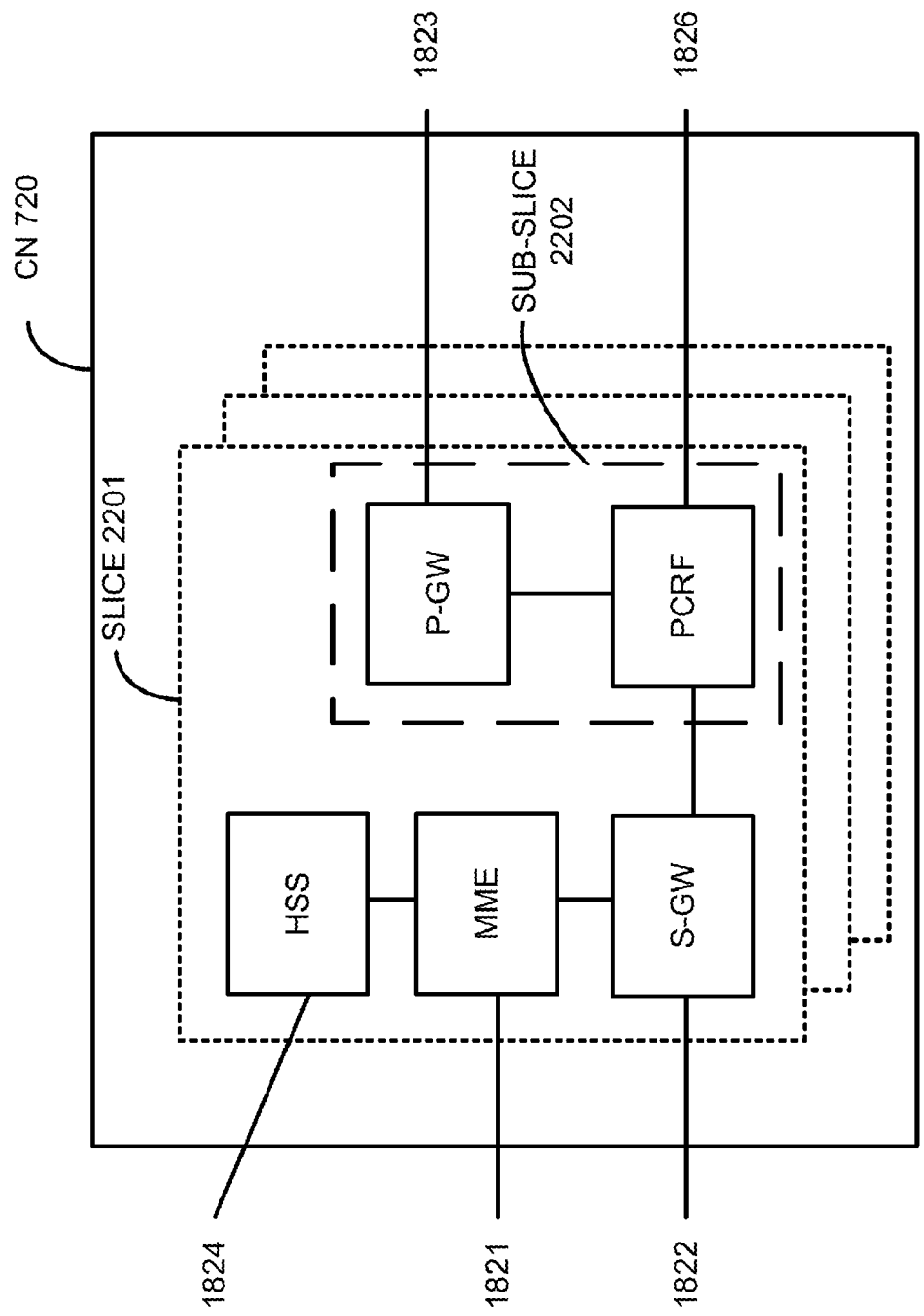
FIG. 22 depicts components of a core network in accordance with some embodiments.

FIG. 22 illustrates components of a core network in accordance with some embodiments. The components of the CN 1720 may be implemented in one physical node or separate physical nodes including components to read and execute instructions from a machine-readable or computer-readable medium (e.g., a non-transitory machine-readable storage medium). In some embodiments, Network Functions Virtualization (NFV) is utilized to virtualize any or all of the above described network node functions via executable instructions stored in one or more computer readable storage mediums (described in further detail below). A logical instantiation of the CN 1720 may be referred to as a network slice 2201. A logical instantiation of a portion of the CN 1720 may be referred to as a network sub-slice 2202 (e.g., the network sub-slice 2202 is shown to include the PGW 1723 and the PCRF 1726).

NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Figure 23:
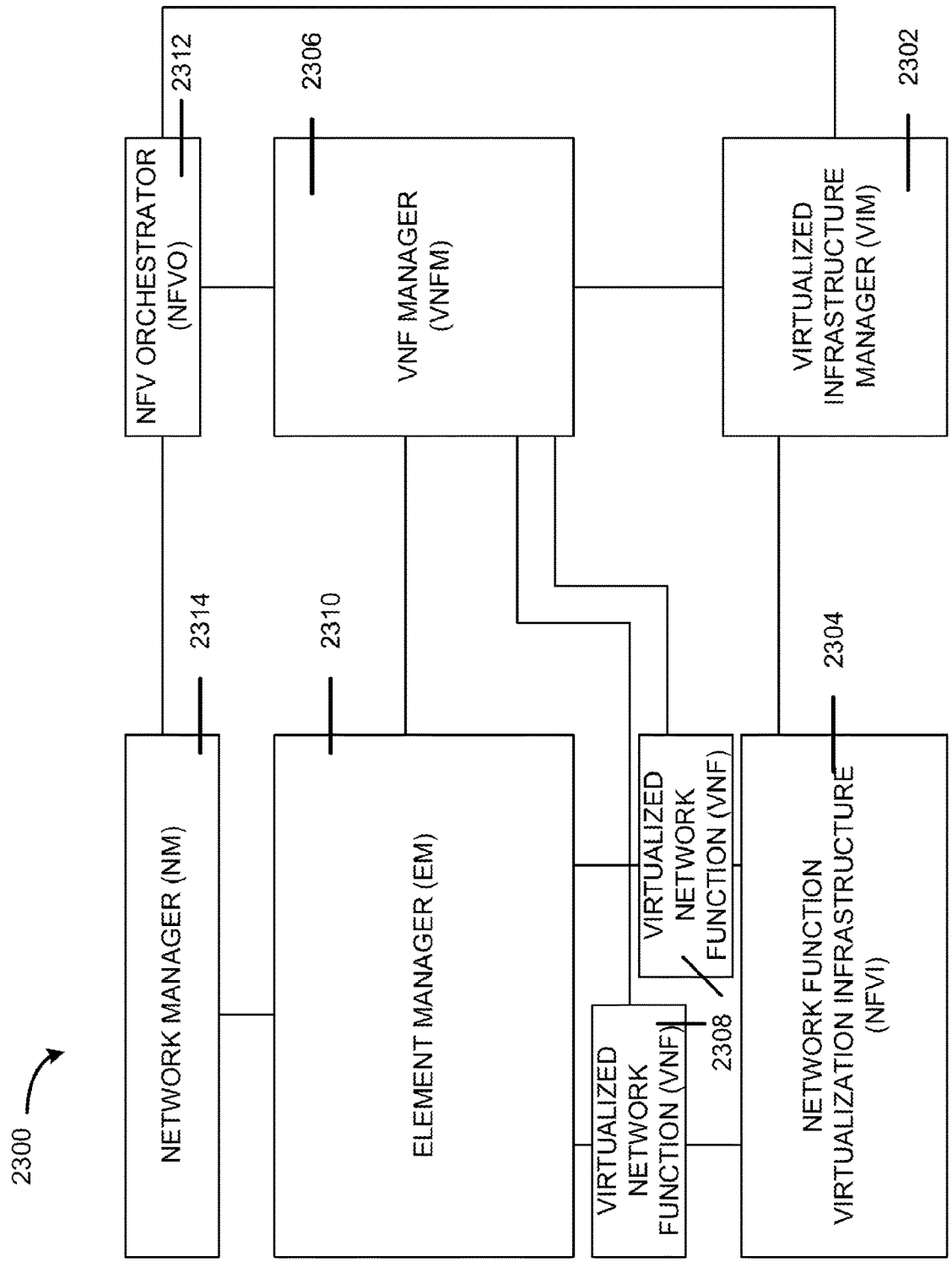
FIG. 23 depicts a block diagram illustrating components, according to some example embodiments, of a system for support Network Functions Virtualization (NFV)

FIG. 23 is a block diagram illustrating components, according to some example embodiments, of a system 2300 to support NFV. The system 2300 is illustrated as including a virtualized infrastructure manager (VIM) 2302, a network function virtualization infrastructure (NFVI) 2304, a VNF manager (VNFM) 2306, virtualized network functions (VNFs) 2308, an element manager (EM) 2310, an NFV Orchestrator (NFVO) 2312, and a network manager (NM) 2314.

The VIM 2302 manages the resources of the NFVI 2304. The NFVI 2304 can include physical or virtual resources and applications (including hypervisors) used to execute the system 2300. The VIM 2302 may manage the life cycle of virtual resources with the NFVI 2304 (e.g., creation, maintenance, and tear down of virtual machines (VMs) associated with one or more physical resources), track VM instances, track performance, fault and security of VM instances and associated physical resources, and expose VM instances and associated physical resources to other management systems.

The VNFM 2306 may manage the VNFs 2308. The VNFs 2308 may be used to execute EPC components/functions. The VNFM 2306 may manage the life cycle of the VNFs 2308 and track performance, fault and security of the virtual aspects of VNFs 2308. The EM 2310 may track the performance, fault and security of the functional aspects of VNFs 2308. The tracking data from the VNFM 2306 and the EM 2310 may comprise, for example, performance measurement (PM) data used by the VIM 2302 or the NFVI 2304. Both the VNFM 2306 and the EM 2310 can scale up/down the quantity of VNFs of the system 2300.

The NFVO 2312 may coordinate, authorize, release and engage resources of the NFVI 2304 in order to provide the requested service (e.g., to execute an EPC function, component, or slice). The NM 2314 may provide a package of end-user functions with the responsibility for the management of a network, which may include network elements with VNFs, non-virtualized network functions, or both (management of the VNFs may occur via the EM 2310).

Figure 24:
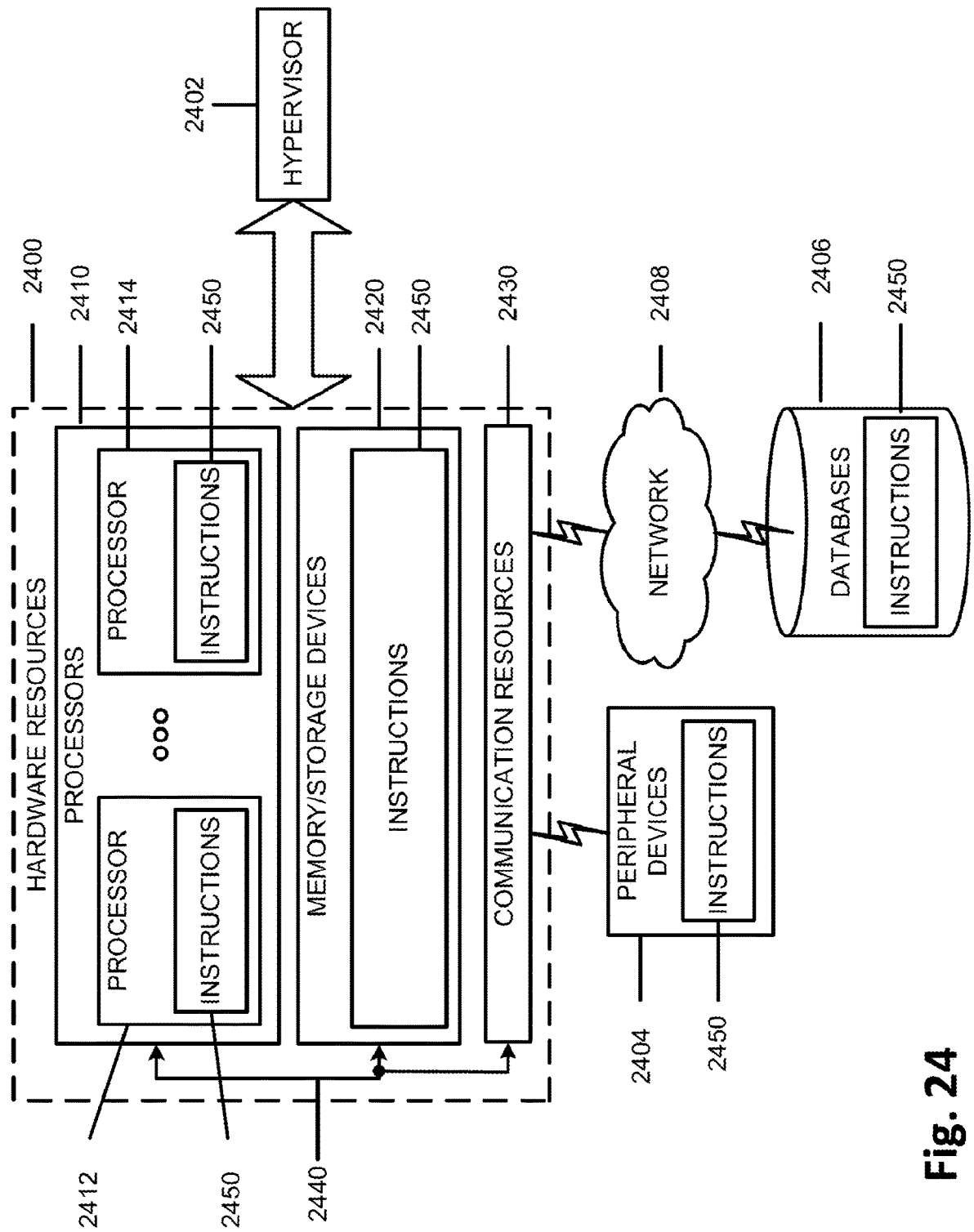
FIG. 24 depicts components, according to some example embodiments, able to read instructions from a machine-readable or computer-readable medium (e.g., a non-transitory machine-readable storage medium) and to perform any one or more of the methodologies discussed herein.

FIG. 24 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 24 shows a diagrammatic representation of hardware resources 2400 including one or more processors (or processor cores) 2410, one or more memory/storage devices 2420, and one or more communication resources 2430, each of which may be communicatively coupled via a bus 2440. For embodiments where node virtualization (e.g., NFV) is utilized, a hypervisor 2402 may be executed to provide an execution environment for one or more network slices/sub-slices to utilize the hardware resources 2400

The processors 2410 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 2412 and a processor 2414.

The memory/storage devices 2420 may include main memory, disk storage, or any suitable combination thereof. The memory/storage devices 2420 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 2430 may include interconnection or network interface components or other suitable devices to communicate with one or more peripheral devices 2404 or one or more databases 2406 via a network 2408. For example, the communication resources 2430 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 2450 may comprise software, a program, an application, an applet, an app, or other executable code for causing at least any of the processors 2410 to perform any one or more of the methodologies discussed herein. The instructions 2450 may reside, completely or partially, within at least one of the processors 2410 (e.g., within the processor's cache memory), the memory/storage devices 2420, or any suitable combination thereof. Furthermore, any portion of the instructions 2450 may be transferred to the hardware resources 2400 from any combination of the peripheral devices 2404 or the databases 2406. Accordingly, the memory of processors 2410, the memory/storage devices 2420, the peripheral devices 2404, and the databases 2406 are examples of computer-readable and machine-readable media.

Figure 25:
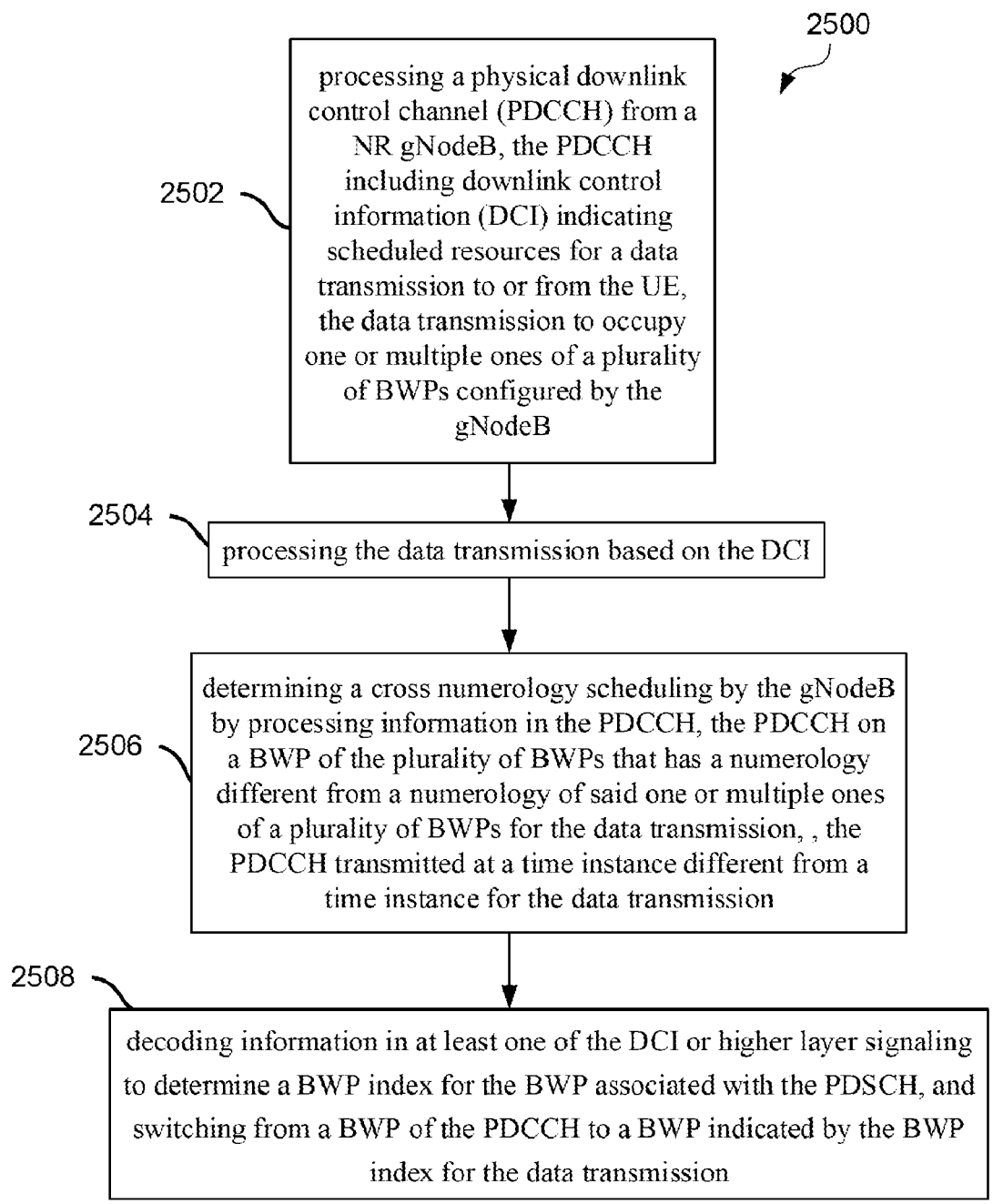
FIG. 25 depicts a flow chart of a method according to some embodiments.

Reference is now made to FIG. 25, which depicts a flow chart of a method 2500 according to some embodiments, the method to take place at an apparatus of a UE. At operation 2502, the method includes processing a physical downlink control channel (PDCCH) from a NR gNodeB, the PDCCH including downlink control information (DCI) indicating information on scheduled resources for a data transmission to or from the UE, the data transmission to occupy one or multiple ones of a plurality of BWPs configured by the gNodeB. At operation 2504, the method includes processing the data transmission based on the DCI. At operation 2506, the method includes determining a cross numerology scheduling by the gNodeB by processing information in the PDCCH, the PDCCH on a BWP of the plurality of BWPs that has a numerology different from a numerology of said one or multiple ones of a plurality of BWPs for the data transmission, the PDCCH transmitted at a time instance different from a time instance for the data transmission. At operation 2508, the method includes decoding information in at least one of the DCI or higher layer signaling to determine a BWP index for the BWP associated with the PDSCH, and switching from a BWP of the PDCCH to a BWP indicated by the BWP index for the data transmission.

In some embodiments, the electronic device(s), network(s), system(s), chip(s) or component(s), or portions or implementations thereof, of Figures herein may be configured to perform one or more processes, techniques, or methods as described herein, or portions thereof.

EXAMPLES

Example 1 includes an apparatus of a New Radio (NR) gNodeB, the apparatus including a memory storing instructions, and processing circuitry to execute the instructions to: configure a plurality of bandwidth parts (BWPs) associated with respective numerologies; determine a physical downlink control channel (PDCCH) including downlink control information (DCI), the DCI including information on scheduled resources including BWP index for a data transmission to or from a User Equipment (UE), the data transmission to occupy one of the plurality of BWPs or multiple ones of the plurality of BWPs; encode the PDCCH for transmission; and process the data transmission based on the DCI.

Example 2 includes the subject matter of Example 1, and optionally, wherein the data transmission includes a physical downlink shared channel (PDSCH), and the processing circuitry is to implement cross numerology scheduling by encoding the PDCCH for transmission on a BWP of the plurality of BWPs having a numerology that is different from a numerology of said one of the plurality of BWPs or multiple ones of the plurality of BWPs for the data transmission, the PDCCH transmitted at a time instance different from a time instance for the data transmission.

Example 3 includes the subject matter of Example 2, and optionally, wherein the processing circuitry is to indicate to the UE a BWP index for the BWP associated with the PDSCH via the DCI such that the UE switches from a BWP of the PDCCH to a BWP indicated by the BWP index for the data transmission.

Example 4 includes the subject matter of any one of Examples 1-3, and optionally, wherein the data transmission includes one of a physical downlink shared channel (PDSCH) or a physical uplink shared channel (PUSCH).

Example 5 includes the subject matter of Example 1, and optionally, wherein the data transmission occupies multiple ones of the plurality of BWPs, and wherein a numerology of respective ones of the multiple ones of the plurality of BWPs used for data transmission is based on a numerology of a corresponding BWP of the plurality of BWPs configured by the processing circuitry.

Example 6 includes the subject matter of Example 1, and optionally, wherein the data transmission occupies multiple ones of the plurality of BWPs, and wherein the DCI includes explicit information on a numerology of respective ones of the multiple ones of the plurality of BWPs used for data transmission, the explicit information to override a numerology of respective corresponding BWPs of the plurality of BWPs.

Example 7 includes the subject matter of Example 1, and optionally, wherein the data transmission occupies multiple ones of the plurality of BWPs, and wherein a numerology of respective ones of the multiple ones of the plurality of BWPs used for data transmission includes a single numerology based on a numerology of the PDCCH.

Example 8 includes the subject matter of Example 1, and optionally, wherein the processing circuitry is to encode the PDCCH for transmission in a BWP different from said one of the plurality of BWPs or multiple ones of the plurality of BWPs, and wherein a BWP for a transmission of the PDCCH has a different numerology than at least one of the said one of the plurality of BWPs or multiple ones of the plurality of BWPs.

Example 9 includes the subject matter of Example 1, and optionally, wherein the processing circuitry is to configure the plurality of BWPs to exhibit a predetermined time pattern, and to multiplex two or more of the plurality of BWPs in a Time Division Multiplexing (TDM) manner.

Example 10 includes the subject matter of any one of Examples 1-3, and optionally, wherein the data transmission includes a PDSCH to the UE, and wherein the processing circuitry is to use one of NR minimum system information (MSI), NR remaining minimum system information (RMSI), NR system information block (SIB) or radio resource control (RRC) signaling to the UE to communicate whether to enable or disable time domain OCC for a hybrid automatic repeat request acknowledgement (HARQ-ACK) feedback from the UE in a physical uplink control channel (PUCCH) to the gNodeB in response to the PDSCH.

Example 11 includes the subject matter of Example 10, and optionally, wherein the processing circuitry is to cause disabling of the time domain OCC to cause a termination of the HARQ-NACK feedback earlier than a termination when OCC is enabled.

Example 12 includes the subject matter of any one of Examples 1-3, and optionally, wherein the data transmission includes a PDSCH to the UE, and wherein the processing circuitry is to process a hybrid automatic repeat request acknowledgement (HARQ-ACK) feedback from the UE in a physical uplink control channel (PUCCH) to the gNodeB in response to the PDSCH, the PUCCH including an aggregation of a 1 symbol or 2 symbol short PUCCH using frequency hopping.

Example 13 includes the subject matter of Example 12, and optionally, wherein the frequency hopping is based on one or more of frequency hopping parameters including: a physical or virtual cell identifier (ID), a UE ID, a Cell Radio Network Temporary ID (C-RNTI), a symbol index, a slot index, a frame index, and wherein the DCI includes information on the one or more of the frequency hopping parameters.

Example 14 includes the subject matter of Example 12, and optionally, wherein the processing circuitry is to use one of NR minimum system information (MSI), NR remaining minimum system information (RMSI), NR system information block (SIB) or radio resource control (RRC) signaling to the UE to communicate a pattern of the frequency hopping.

Example 15 includes the subject matter of Example 12, and optionally, wherein the PUCCH is an aggregated 2 symbol short PUCCH, and wherein the frequency hopping is across multiple ones of the plurality of BWPs.

Example 16 includes the subject matter of Example 1, and optionally, wherein: the data transmission includes a PDSCH to the UE; the processing circuitry is to process a hybrid automatic repeat request acknowledgement (HARQ-ACK) feedback from the UE in a physical uplink control channel (PUCCH) to the gNodeB in response to the PDSCH; and a BWP associated with the PUCCH is different from and exhibits a one-to-one association with a BWP associated with the PDSCH or with a PDCCH from the gNodeB to the UE.

Example 17 includes the subject matter of any one of Examples 1-3, and optionally, further including a front-end module coupled to the processing circuitry.

Example 18 includes the subject matter of Example 17, and optionally, further including at least one antenna coupled to the front-end module.

Example 19 includes a method to be used at an apparatus of a New Radio (NR) gNodeB, the method including: configuring a plurality of bandwidth parts (BWPs) associated with respective numerologies; determining a physical downlink control channel (PDCCH) including downlink control information (DCI), the DCI including information on scheduled resources including BWP index for a data transmission to or from a User Equipment (UE), the data transmission to occupy one of the plurality of BWPs or multiple ones of the plurality of BWPs; encoding the PDCCH for transmission; and processing the data transmission based on the DCI.

Example 20 includes the subject matter of Example 19, and optionally, wherein the data transmission includes a physical downlink shared channel (PDSCH), the method further includes implementing cross numerology scheduling by encoding the PDCCH for transmission on a BWP of the plurality of BWPs having a numerology that is different from a numerology of said one of the plurality of BWPs or multiple ones of the plurality of BWPs for the data transmission, the PDCCH transmitted at a time instance different from a time instance for the data transmission.

Example 21 includes the subject matter of Example 20, and optionally, wherein the method further includes indicating to the UE a BWP index for the BWP associated with the PDSCH via the DCI such that the UE switches from a BWP of the PDCCH to a BWP indicated by the BWP index for the data transmission.

Example 22 includes the subject matter of any one of Examples 19-20, and optionally, wherein the data transmission includes one of a physical downlink shared channel (PDSCH) or a physical uplink shared channel (PUSCH).

Example 23 includes the subject matter of Example 19, and optionally, wherein the data transmission occupies multiple ones of the plurality of BWPs, and wherein a numerology of respective ones of the multiple ones of the plurality of BWPs used for data transmission is based on a numerology of a corresponding BWP of the plurality of BWPs.

Example 24 includes the subject matter of Example 19, and optionally, wherein the data transmission occupies multiple ones of the plurality of BWPs, and wherein the DCI includes explicit information on a numerology of respective ones of the multiple ones of the plurality of BWPs used for data transmission, the explicit information to override a numerology of respective corresponding BWPs of the plurality of BWPs.

Example 25 includes the subject matter of Example 19, and optionally, wherein the data transmission occupies multiple ones of the plurality of BWPs, and wherein a numerology of respective ones of the multiple ones of the plurality of BWPs used for data transmission includes a single numerology based on a numerology of the PDCCH.

Example 26 includes the subject matter of Example 19, and optionally, further including encoding the PDCCH for transmission in a BWP different from said one of the plurality of BWPs or multiple ones of the plurality of BWPs, and wherein a BWP for a transmission of the PDCCH has a different numerology than at least one of the said one of the plurality of BWPs or multiple ones of the plurality of BWPs.

Example 27 includes the subject matter of Example 19, and optionally, further including configuring the plurality of BWPs to exhibit a predetermined time pattern, and multiplexing two or more of the plurality of BWPs in a Time Division Multiplexing (TDM) manner.

Example 28 includes the subject of Example 19, and optionally, wherein the data transmission includes a PDSCH to the UE, and further including using one of NR minimum system information (MSI), NR remaining minimum system information (RMSI), NR system information block (SIB) or radio resource control (RRC) signaling to the UE to communicate whether to enable or disable time domain OCC for a hybrid automatic repeat request acknowledgement (HARQ-ACK) feedback from the UE in a physical uplink control channel (PUCCH) to the gNodeB in response to the PDSCH.

Example 29 includes the subject matter of Example 28, and optionally, further including causing disabling of the time domain OCC to cause a termination of the HARQ-NACK feedback earlier than a termination when OCC is enabled.

Example 30 includes the subject matter of any one of Examples 19-20, and optionally, wherein the data transmission includes a PDSCH to the UE, and further including processing a hybrid automatic repeat request acknowledgement (HARQ-ACK) feedback from the UE in a physical uplink control channel (PUCCH) to the gNodeB in response to the PDSCH, the PUCCH including an aggregation of a 1 symbol or 2 symbol short PUCCH using frequency hopping.

Example 31 includes the subject matter of Example 30, and optionally, wherein the frequency hopping is based on one or more of frequency hopping parameters including: a physical or virtual cell identifier (ID), a UE ID, a Cell Radio Network Temporary ID (C-RNTI), a symbol index, a slot index, a frame index, and wherein the DCI includes information on the one or more of the frequency hopping parameters.

Example 32 includes the subject matter of Example 30, and optionally, further including using one of NR minimum system information (MSI), NR remaining minimum system information (RMSI), NR system information block (SIB) or radio resource control (RRC) signaling to the UE to communicate a pattern of the frequency hopping.

Example 33 includes the subject matter of Example 30, and optionally, wherein the PUCCH is an aggregated 2 symbol short PUCCH, and wherein the frequency hopping is across multiple ones of the plurality of BWPs.

Example 34 includes the subject matter of Example 19, and optionally, wherein: the data transmission includes a PDSCH to the UE; the method includes processing a hybrid automatic repeat request acknowledgement (HARQ-ACK) feedback from the UE in a physical uplink control channel (PUCCH) to the gNodeB in response to the PDSCH; and a BWP associated with the PUCCH is different from and exhibits a one-to-one association with a BWP associated with the PDSCH or with a PDCCH from the gNodeB to the UE.

Example 35 includes an apparatus of a New Radio (NR) gNodeB, the apparatus comprising: means for configuring a plurality of bandwidth parts (BWPs) associated with respective numerologies; means for determining a physical downlink control channel (PDCCH) including downlink control information (DCI), the DCI including information on scheduled resources including BWP index for a data transmission to or from a User Equipment (UE), the data transmission to occupy one of the plurality of BWPs or multiple ones of the plurality of BWPs; means for encoding the PDCCH for transmission; and means for processing the data transmission based on the DCI.

Example 36 includes the subject matter of Example 35, and optionally, wherein the data transmission includes one of a physical downlink shared channel (PDSCH) or a physical uplink shared channel (PUSCH).

Example 37 includes the subject matter of Example 35, and optionally, further including means for implementing cross numerology scheduling by encoding the PDCCH for transmission on a BWP of the plurality of BWPs having a numerology that is different from a numerology of said one of the plurality of BWPs or multiple ones of the plurality of BWPs for the data transmission, the PDCCH transmitted at a time instance different from a time instance for the data transmission.

Example 38 includes the subject matter of Example 37, and optionally, wherein the data transmission includes a physical downlink shared channel (PDSCH), the apparatus further including means for indicating to the UE a BWP index for the BWP associated with the PDSCH via the DCI such that the UE switches from a BWP of the PDCCH to a BWP indicated by the BWP index for the data transmission.

Example 39 includes an apparatus of a New Radio (NR) User Equipment (UE), the apparatus including a memory storing instructions, and processing circuitry to execute the instructions to: process a physical downlink control channel (PDCCH) from a NR gNodeB, the PDCCH including downlink control information (DCI) indicating scheduled resources for a data transmission to or from the UE, the data transmission to occupy one or multiple ones of a plurality of BWPs configured by the gNodeB; and process the data transmission based on the DCI.

Example 40 includes the subject matter of Example 39, and optionally, wherein the processing circuitry is to determine a cross numerology scheduling by the gNodeB by processing information in the PDCCH, the PDCCH on a BWP of the plurality of BWPs that has a numerology different from a numerology of said one or multiple ones of a plurality of BWPs for the data transmission, the PDCCH transmitted at a time instance different from a time instance for the data transmission.

Example 41 includes the subject matter of Example 40, and optionally, wherein the processing circuitry is to decode information in at least one of the DCI or higher layer signaling to determine a BWP index for the BWP associated with the PDSCH, and to switch from a BWP of the PDCCH to a BWP indicated by the BWP index for the data transmission.

Example 42 includes the subject matter of any one of Examples 39-41, and optionally, wherein the data transmission includes one of a physical downlink shared channel (PDSCH) or a physical uplink shared channel (PUSCH).

Example 43 includes the subject matter of Example 39, and optionally, wherein the data transmission occupies multiple ones of the plurality of BWPs, and wherein a numerology of respective ones of the multiple ones of the plurality of BWPs used for data transmission is based on a numerology of a corresponding BWP of the plurality of BWPs configured by the gNodeB.

Example 44 includes the subject matter of Example 39, and optionally, wherein the data transmission occupies multiple ones of the plurality of BWPs, and wherein the DCI includes explicit information on a numerology of respective ones of the multiple ones of the plurality of BWPs used for data transmission, the explicit information to override a numerology of respective corresponding BWPs of the plurality of BWPs configured by the gNodeB.

Example 45 includes the subject matter of Example 39, and optionally, wherein the data transmission occupies multiple ones of the plurality of BWPs, and wherein a numerology of respective ones of the multiple ones of the plurality of BWPs used for data transmission includes a single numerology based on a numerology of the PDCCH.

Example 46 includes the subject matter of Example 39, and optionally, wherein the processing circuitry is to process the PDCCH in a BWP different from said one or multiple ones of a plurality of BWPs, and wherein a BWP for a transmission of the PDCCH has a different numerology than at least one of the said one of the plurality of BWPs or multiple ones of the plurality of BWPs.

Example 47 includes the subject matter of Example 39, and optionally, wherein the plurality of BWPs exhibits a predetermined time pattern, and wherein two or more of the plurality of BWPs are multiplexed in a Time Division Multiplexing (TDM) manner.

Example 48 includes the subject matter of Example 39, and optionally, wherein the data transmission includes a PDSCH to the UE, and wherein the processing circuitry is to process one of NR minimum system information (MSI), NR remaining minimum system information (RMSI), NR system information block (SIB) or radio resource control (RRC) signaling from the gNodeB to determine whether to enable or disable time domain OCC for a hybrid automatic repeat request acknowledgement (HARQ-ACK) feedback to the gNodeB in a physical uplink control channel (PUCCH) in response to the PDSCH.

Example 49 includes the subject matter of Example 46, and optionally, wherein the processing circuitry is to cause disabling of the time domain OCC to cause a termination of the HARQ-NACK feedback earlier than a termination when OCC is enabled.

Example 50 includes the subject matter of any one of Examples 39-41, and optionally, wherein the data transmission includes a PDSCH to the UE, and wherein the processing circuitry is to process a hybrid automatic repeat request acknowledgement (HARQ-ACK) feedback to the gNodeB in a physical uplink control channel (PUCCH) in response to the PDSCH, the PUCCH including an aggregation of a 1 symbol or 2 symbol short PUCCH using frequency hopping.

Example 51 includes the subject matter of Example 48, and optionally, wherein the frequency hopping is based on one or more of frequency hopping parameters including: a physical or virtual cell identifier (ID), a UE ID, a Cell Radio Network Temporary ID (C-RNTI), a symbol index, a slot index, a frame index, and wherein the DCI includes information on the one or more of the frequency hopping parameters.

Example 52 includes the subject matter of Example 48, and optionally, wherein the processing circuitry is to process one of NR minimum system information (MSI), NR remaining minimum system information (RMSI), NR system information block (SIB) or radio resource control (RRC) signaling from the gNodeB to determine a pattern of the frequency hopping.

Example 53 includes the subject matter of Example 48, and optionally, wherein the PUCCH is an aggregated 2 symbol short PUCCH, and wherein the frequency hopping is across multiple ones of the plurality of BWPs.

Example 54 includes the subject matter of Example 39, and optionally, wherein: the data transmission includes a PDSCH to the UE; the processing circuitry is to process a hybrid automatic repeat request acknowledgement (HARQ-ACK) feedback to the gNodeB in a physical uplink control channel (PUCCH) in response to the PDSCH; and a BWP associated with the PUCCH is different from and exhibits a one-to-one association with a BWP associated with the PDSCH or with a PDCCH from the gNodeB to the UE.

Example 55 includes the subject matter of any one of Examples 39-54, and optionally, further including a front-end module coupled to the processing circuitry.

Example 56 includes the subject matter of Example 55, and optionally, further including at least one antenna coupled to the front-end module.

Example 57 includes a method of operating an apparatus of a New Radio (NR) User Equipment (UE), the method including: processing a physical downlink control channel (PDCCH) from a NR gNodeB, the PDCCH including downlink control information (DCI) indicating scheduled resources for a data transmission to or from the UE, the data transmission to occupy one or multiple ones of a plurality of BWPs configured by the gNodeB; and processing the data transmission based on the DCI.

Example 58 includes the subject matter of Example 57, and optionally, wherein the method further includes determining a cross numerology scheduling by the gNodeB by processing information in the PDCCH, the PDCCH on a BWP of the plurality of BWPs that has a numerology different from a numerology of said one or multiple ones of a plurality of BWPs for the data transmission, the PDCCH transmitted at a time instance different from a time instance for the data transmission.

Example 59 includes the subject matter of Example 58, and optionally, wherein the data transmission includes a physical downlink shared channel (PDSCH), and the method further includes decoding information in at least one of the DCI or higher layer signaling to determine a BWP index for the BWP associated with the PDSCH, and switching from a BWP of the PDCCH to a BWP indicated by the BWP index for the data transmission.

Example 60 includes the subject matter of any one of Examples 57-59, and optionally, wherein the data transmission includes one of a physical downlink shared channel (PDSCH) or a physical uplink shared channel (PUSCH).

Example 61 includes the subject matter of Example 57, and optionally, wherein the data transmission occupies multiple ones of the plurality of BWPs, and wherein a numerology of respective ones of the multiple ones of the plurality of BWPs used for data transmission is based on a numerology of a corresponding BWP of the plurality of BWPs configured by the gNodeB.

Example 62 includes the subject matter of Example 57, and optionally, wherein the data transmission occupies multiple ones of the plurality of BWPs, and wherein the DCI includes explicit information on a numerology of respective ones of the multiple ones of the plurality of BWPs used for data transmission, the explicit information to override a numerology of respective corresponding BWPs of the plurality of BWPs configured by the gNodeB.

Example 63 includes the subject matter of Example 57, and optionally, wherein the data transmission occupies multiple ones of the plurality of BWPs, and wherein a numerology of respective ones of the multiple ones of the plurality of BWPs used for data transmission includes a single numerology based on a numerology of the PDCCH.

Example 64 includes the subject matter of Example 57, and optionally, wherein the method further includes processing the PDCCH in a BWP different from said one or multiple ones of a plurality of BWPs, and wherein a BWP for a transmission of the PDCCH has a different numerology than at least one of the said one of the plurality of BWPs or multiple ones of the plurality of BWPs.

Example 65 includes the subject matter of Example 57, and optionally, wherein the plurality of BWPs exhibits a predetermined time pattern, and wherein two or more of the plurality of BWPs are multiplexed in a Time Division Multiplexing (TDM) manner.

Example 66 includes the subject matter of Example 57, and optionally, wherein the data transmission includes a PDSCH to the UE, and wherein the method further includes one of NR minimum system information (MSI), NR remaining minimum system information (RMSI), NR system information block (SIB) or radio resource control (RRC) signaling from the gNodeB to determine whether to enable or disable time domain OCC for a hybrid automatic repeat request acknowledgement (HARQ-ACK) feedback to the gNodeB in a physical uplink control channel (PUCCH) in response to the PDSCH.

Example 67 includes the subject matter of Example 66, and optionally, wherein the method further includes causing disabling of the time domain OCC to cause a termination of the HARQ-NACK feedback earlier than a termination when OCC is enabled.

Example 68 includes the subject matter of any one of Examples 57-59, and optionally, wherein the data transmission includes a PDSCH to the UE, and wherein the method further includes processing a hybrid automatic repeat request acknowledgement (HARQ-ACK) feedback to the gNodeB in a physical uplink control channel (PUCCH) in response to the PDSCH, the PUCCH including an aggregation of a 1 symbol or 2 symbol short PUCCH using frequency hopping.

Example 69 includes the subject matter of Example 68, and optionally, wherein the frequency hopping is based on one or more of frequency hopping parameters including: a physical or virtual cell identifier (ID), a UE ID, a Cell Radio Network Temporary ID (C-RNTI), a symbol index, a slot index, a frame index, and wherein the DCI includes information on the one or more of the frequency hopping parameters.

Example 70 includes the subject matter of Example 68, and optionally, wherein the method further includes processing one of NR minimum system information (MSI), NR remaining minimum system information (RMSI), NR system information block (SIB) or radio resource control (RRC) signaling from the gNodeB to determine a pattern of the frequency hopping.

Example 71 includes the subject matter of Example 68, and optionally, wherein the PUCCH is an aggregated 2 symbol short PUCCH, and wherein the frequency hopping is across multiple ones of the plurality of BWPs.

Example 72 includes the subject matter of Example 57, and optionally, wherein: the data transmission includes a PDSCH to the UE; the method further includes processing a hybrid automatic repeat request acknowledgement (HARQ-ACK) feedback to the gNodeB in a physical uplink control channel (PUCCH) in response to the PDSCH; and a BWP associated with the PUCCH is different from and exhibits a one-to-one association with a BWP associated with the PDSCH or with a PDCCH from the gNodeB to the UE.

Example 73 includes an apparatus of a New Radio (NR) User Equipment (UE), the apparatus including: means for processing a physical downlink control channel (PDCCH) from a NR gNodeB, the PDCCH including downlink control information (DCI) indicating scheduled resources for a data transmission to or from the UE, the data transmission to occupy one or multiple ones of a plurality of BWPs configured by the gNodeB; and means for processing the data transmission based on the DCI.

Example 74 includes the subject matter of Example 73, and optionally, wherein the data transmission includes one of a physical downlink shared channel (PDSCH) or a physical uplink shared channel (PUSCH).

Example 75 includes the subject matter of Example 73, and optionally, wherein the data transmission occupies multiple ones of the plurality of BWPs, and wherein a numerology of respective ones of the multiple ones of the plurality of BWPs used for data transmission is based on a numerology of a corresponding BWP of the plurality of BWPs configured by the gNodeB.

Example 76 includes a machine-readable medium including code which, when executed, is to cause a machine to perform the method of any one of Examples 19-34 and 57-75.

Example 77 includes an apparatus of a New Radio (NR) gNodeB, the apparatus comprising a memory storing instructions and processing circuitry, the processing circuitry to implement the instructions to: determine a multiplexing scheme for a downlink transmission and for a demodulation reference signal (DM-RS) corresponding to the downlink transmission, the downlink transmission including at least one of a physical downlink control channel (PDCCH) or a physical downlink shared channel (PDSCH); encode for transmission to a NR User Equipment (UE) a signal including an indication of the multiplexing scheme; determine the downlink transmission; and encode for transmission the downlink transmission based on the indication of the multiplexing scheme.

Example 78 includes the subject matter of Example 77, and optionally, wherein the signal including the indication of the multiplexing scheme is to be addressed to a plurality of NR User Equipments (UEs) including the NR UE.

Example 79 includes the subject matter of Example 77, and optionally, wherein the processing circuitry is to determine the multiplexing scheme such that, when the PDSCH is transmitted in a symbol different from a symbol used to transmit a corresponding PDCCH, the DM-RS is to be multiplexed with the PDSCH in a time division multiplexing (TDM) manner either before or after the PDSCH.

Example 80 includes the subject matter of Example 77, and optionally, wherein the processing circuitry is to determine the multiplexing scheme such that the DM-RS is multiplexed with the downlink transmission in a frequency division multiplexing (FDM) manner and shares at least one symbol with the downlink transmission.

Example 81 includes the subject matter of Example 77, and optionally, wherein the processing circuitry is to determine the multiplexing scheme such that the DM-RS is multiplexed with the downlink transmission in a frequency division multiplexing (FDM) manner or in a time division multiplexing (TDM) manner.

Example 82 includes the subject matter of Example 81, and optionally, wherein the processing circuitry is to determine whether the FDM manner or the TDM manner is used one of: implicitly based on at least one of a subcarrier spacing, a modulation and coding scheme (MCS), or an allocated bandwidth associated with the downlink transmission; or implicitly based on a waveform of a physical uplink shared channel (PUSCH) from the UE.

Example 83 includes the subject matter of Example 81, and optionally, wherein the processing circuitry is to at least one of: use higher layers to configure a choice as between the FDM manner and the TDM manner; and determine a downlink control information (DCI) to dynamically indicate the FDM manner or the TDM manner.

Example 84 includes the subject matter of Example 77, and optionally, wherein the processing circuitry is to determine the multiplexing scheme such that, when the PDSCH is transmitted in a same symbol as a corresponding PDCCH, the PDSCH and the corresponding PDCCH are to be multiplexed in an frequency division multiplexing (FDM) manner.

Example 85 includes the subject matter of Example 84, and optionally, wherein the PDSCH and the corresponding PDCCH span a single symbol, and wherein the DM-RS includes a dedicated DM-RS for the PDSCH and a dedicated DM-RS for the corresponding PDCCH, the processing circuitry to further align a bundling size for the PDSCH and the corresponding PDCCH.

Example 86 includes the subject matter of Example 84, and optionally, wherein: the PDSCH spans two or more symbols of allocated PDSCH resource; the corresponding PDCCH spans only a first symbol of the two or more symbols of the allocated PDSCH resource; and the DM-RS includes a dedicated DM-RS for the PDSCH and a dedicated DM-RS for the corresponding PDCCH, the dedicated DM-RS for the PDSCH to be transmitted in allocated frequency resources of a first symbol of the two or more symbols where PDSCH and the corresponding PDCCH do not overlap in a frequency domain.

Example 87 includes the subject matter of Example 84, and optionally, wherein: the PDSCH spans two or more symbols of allocated PDSCH resource; the corresponding PDCCH spans only a first symbol of the two or more symbols of the allocated PDSCH resource; and the DM-RS includes a dedicated DM-RS for the PDSCH and a dedicated DM-RS for the corresponding PDCCH, the dedicated DM-RS for the PDSCH to be transmitted in allocated frequency resources of a second symbol of the two or more symbols where PDSCH and the corresponding PDCCH overlap in a frequency domain.

Example 88 includes the subject matter of Example 84, and optionally, wherein: the PDSCH spans two or more symbols of allocated PDSCH resource; the corresponding PDCCH spans only a first symbol of the two or more symbols of the allocated PDSCH resource; and the DM-RS includes a dedicated DM-RS for the PDSCH, the dedicated DM-RS for the PDSCH to be transmitted only in allocated frequency resources of a second symbol of the two or more symbols.

Example 89 includes the subject matter of Example 84, and optionally, wherein: the PDSCH and the corresponding span only two symbols of allocated PDSCH resource; and the DM-RS includes a dedicated DM-RS for the PDSCH and a dedicated DM-RS for the corresponding PDCCH, the dedicated DM-RS for the PDSCH to be transmitted only in allocated frequency resources of a first symbol of the two symbols, the dedicated DM-RS for the PDCCH to be transmitted one of: only in allocated frequency resources of the first symbol or in allocated frequency resources of the two symbols.

Example 90 includes the subject matter of Example 77, and optionally, wherein the DM-RS includes a dedicated DM-RS for the PDSCH and a dedicated DM-RS for the corresponding PDCCH, and wherein the processing circuitry is to determine an antenna port (AP) multiplexing scheme to control whether the dedicated DM-RS for the PDSCH and the dedicated DM-RS for the corresponding PDCCH share a same symbol.

Example 91 includes the subject matter of Example 77, and optionally, wherein the processing circuitry is to determine the multiplexing scheme such that, when the PDSCH is transmitted in a same symbol as a corresponding PDCCH, the PDSCH and the corresponding PDCCH are to be multiplexed in an spatial division multiplexing (SDM) manner or in a combination of a SDM manner and a frequency division multiplexing (FDM) manner.

Example 92 includes the subject matter of Example 91, and optionally, wherein the PDSCH is scheduled based on multiple layers transmission, the processing circuitry to use one layer for transmission of the PDCCH in a shared physical resource.

Example 93 includes the subject matter of Example 91, and optionally, wherein the processing circuitry is to determine an AP index for transmission of the PDCCH by way of at least one of: using a predefined AP index; higher layer configuration using Radio Resource Control (RRC) signaling; or deriving the AP index from at least one of a physical or virtual cell identifier (ID), an UE ID, or a time or frequency resource index including at least one of symbol index, slot index or frame index.

Example 94 includes the subject matter of Example 91, and optionally, wherein the DM-RS includes a shared DM-RS for both the PDSCH and the PDCCH on a shared resource.

Example 95 includes the subject matter of Example 77, and optionally, wherein: the DM-RS is a front-loaded DM-RS; the PDSCH is a symbol-level PDSCH; a location in a time domain of the DM-RS for the PDSCH is based on a location of a first symbol of the PDSCH within a corresponding slot; and the processing circuitry is configured to determine a maximum time gap number of symbols between the front-loaded DM-RS for slot-level scheduling and the PDSCH based on one of a predetermined maximum time gap, and a maximum time gap configured via higher layers including NR minimum system information (MSI), NR remaining minimum system information (RMSI), NR system information block (SIB) or radio resource control (RRC) signaling.

Example 96 includes the subject matter of Example 77, and optionally, wherein the DM-RS includes a front-loaded DM-RS, and additional DM-RS, the processing circuitry further to configure a time domain bundling of DM-RS symbols for channel estimation.

Example 97 includes the subject matter of Example 77, and optionally, further including a front-end module coupled to the processing circuitry.

Example 98 includes the subject matter of Example 97, and optionally, further including at least one antenna coupled to the front-end module.

Example 99 includes a method of operating an apparatus of a New Radio (NR) gNodeB, the method comprising: determining a multiplexing scheme for a downlink transmission and for a demodulation reference signal (DM-RS) corresponding to the downlink transmission, the downlink transmission including at least one of a physical downlink control channel (PDCCH) or a physical downlink shared channel (PDSCH); encoding for transmission to a NR User Equipment (UE) a signal including an indication of the multiplexing scheme; determining the downlink transmission; and encoding the downlink transmission for transmission based on the indication of the multiplexing scheme.

Example 100 includes the subject matter of Example 99, and optionally, wherein the signal including the indication of the multiplexing scheme is to be addressed to a plurality of NR User Equipments (UEs) including the NR UE.

Example 101 includes the subject matter of Example 99, and optionally, wherein the method further includes determining the multiplexing scheme such that, when the PDSCH is transmitted in a symbol different from a symbol used to transmit a corresponding PDCCH, the DM-RS is to be multiplexed with the PDSCH in a time division multiplexing (TDM) manner either before or after the PDSCH.

Example 102 includes the subject matter of Example 99, and optionally, wherein the method further includes determining the multiplexing scheme such that the DM-RS is multiplexed with the downlink transmission in a frequency division multiplexing (FDM) manner and shares at least one symbol with the downlink transmission.

Example 103 includes the subject matter of Example 99, and optionally, wherein the method further includes determining the multiplexing scheme such that the DM-RS is multiplexed with the downlink transmission in a frequency division multiplexing (FDM) manner or in a time division multiplexing (TDM) manner.

Example 104 includes the subject matter of Example 103, and optionally, wherein the method further includes determining whether the FDM manner or the TDM manner is used one of: implicitly based on at least one of a subcarrier spacing, a modulation and coding scheme (MCS), or an allocated bandwidth associated with the downlink transmission; or implicitly based on a waveform of a physical uplink shared channel (PUSCH) from the UE.

Example 105 includes the subject matter of Example 103, and optionally, wherein the method further includes at least one of: using higher layers to configure a choice as between the FDM manner and the TDM manner; and determining a downlink control information (DCI) to dynamically indicate the FDM manner or the TDM manner.

Example 106 includes the subject matter of Example 99, and optionally, wherein the method further includes determining the multiplexing scheme such that, when the PDSCH is transmitted in a same symbol as a corresponding PDCCH, the PDSCH and the corresponding PDCCH are to be multiplexed in an frequency division multiplexing (FDM) manner.

Example 107 includes the subject matter of Example 106, and optionally, wherein the PDSCH and the corresponding PDCCH span a single symbol, and wherein the DM-RS includes a dedicated DM-RS for the PDSCH and a dedicated DM-RS for the corresponding PDCCH, the method further including aligning a bundling size for the PDSCH and the corresponding PDCCH.

Example 108 includes the subject matter of Example 106, and optionally, wherein: the PDSCH spans two or more symbols of allocated PDSCH resource; the corresponding PDCCH spans only a first symbol of the two or more symbols of the allocated PDSCH resource; and the DM-RS includes a dedicated DM-RS for the PDSCH and a dedicated DM-RS for the corresponding PDCCH, the dedicated DM-RS for the PDSCH to be transmitted in allocated frequency resources of a first symbol of the two or more symbols where PDSCH and the corresponding PDCCH do not overlap in a frequency domain.

Example 109 includes the subject matter of Example 106, and optionally, wherein: the PDSCH spans two or more symbols of allocated PDSCH resource; the corresponding PDCCH spans only a first symbol of the two or more symbols of the allocated PDSCH resource; and the DM-RS includes a dedicated DM-RS for the PDSCH and a dedicated DM-RS for the corresponding PDCCH, the dedicated DM-RS for the PDSCH to be transmitted in allocated frequency resources of a second symbol of the two or more symbols where PDSCH and the corresponding PDCCH overlap in a frequency domain.

Example 110 includes the subject matter of Example 106, and optionally, wherein: the PDSCH spans two or more symbols of allocated PDSCH resource; the corresponding PDCCH spans only a first symbol of the two or more symbols of the allocated PDSCH resource; and the DM-RS includes a dedicated DM-RS for the PDSCH, the dedicated DM-RS for the PDSCH to be transmitted only in allocated frequency resources of a second symbol of the two or more symbols.

Example 111 includes the subject matter of Example 106, and optionally, wherein: the PDSCH and the corresponding span only two symbols of allocated PDSCH resource; and the DM-RS includes a dedicated DM-RS for the PDSCH and a dedicated DM-RS for the corresponding PDCCH, the dedicated DM-RS for the PDSCH to be transmitted only in allocated frequency resources of a first symbol of the two symbols, the dedicated DM-RS for the PDCCH to be transmitted one of: only in allocated frequency resources of the first symbol or in allocated frequency resources of the two symbols.

Example 112 includes the subject matter of Example 99, and optionally, wherein the DM-RS includes a dedicated DM-RS for the PDSCH and a dedicated DM-RS for the corresponding PDCCH, and wherein the method further includes determining an antenna port (AP) multiplexing scheme to control whether the dedicated DM-RS for the PDSCH and the dedicated DM-RS for the corresponding PDCCH share a same symbol.

Example 113 includes the subject matter of Example 99, and optionally, wherein the method further includes determining the multiplexing scheme such that, when the PDSCH is transmitted in a same symbol as a corresponding PDCCH, the PDSCH and the corresponding PDCCH are to be multiplexed in an spatial division multiplexing (SDM) manner or in a combination of a SDM manner and a frequency division multiplexing (FDM) manner.

Example 114 includes the subject matter of Example 113, and optionally, wherein the PDSCH is scheduled based on multiple layers transmission, the method further including using one layer for transmission of the PDCCH in a shared physical resource.

Example 115 includes the subject matter of Example 113, and optionally, wherein the method further including determining an AP index for transmission of the PDCCH by way of at least one of: using a predefined AP index; higher layer configuration using Radio Resource Control (RRC) signaling; or deriving the AP index from at least one of a physical or virtual cell identifier (ID), an UE ID, or a time or frequency resource index including at least one of symbol index, slot index or frame index.

Example 116 includes the subject matter of Example 113, and optionally, wherein the DM-RS includes a shared DM-RS for both the PDSCH and the PDCCH on a shared resource.

Example 117 includes the subject matter of Example 99, and optionally, wherein: the DM-RS is a front-loaded DM-RS; the PDSCH is a symbol-level PDSCH; a location in a time domain of the DM-RS for the PDSCH is based on a location of a first symbol of the PDSCH within a corresponding slot; and the method further includes determining a maximum time gap number of symbols between the front-loaded DM-RS for slot-level scheduling and the PDSCH based on one of a predetermined maximum time gap, and a maximum time gap configured via higher layers including NR minimum system information (MSI), NR remaining minimum system information (RMSI), NR system information block (SIB) or radio resource control (RRC) signaling.

Example 118 includes the subject matter of Example 99, and optionally, wherein the DM-RS includes a front-loaded DM-RS, and additional DM-RS, the method further includes configuring a time domain bundling of DM-RS symbols for channel estimation.

Example 119 includes an apparatus of a New Radio (NR) gNodeB, the apparatus comprising: means for determining a multiplexing scheme for a downlink transmission and for a demodulation reference signal (DM-RS) corresponding to the downlink transmission, the downlink transmission including at least one of a physical downlink control channel (PDCCH) or a physical downlink shared channel (PDSCH); means for encoding for transmission to a NR User Equipment (UE) a signal including an indication of the multiplexing scheme; means for determining the downlink transmission; and means for encoding for transmission the downlink transmission based on the indication of the multiplexing scheme.

Example 120 includes the subject matter of Example 119, and optionally, wherein the signal including the indication of the multiplexing scheme is to be addressed to a plurality of NR User Equipments (UEs) including the NR UE.

Example 121 includes the subject matter of Example 119, and optionally, further including means for determining the multiplexing scheme such that, when the PDSCH is transmitted in a symbol different from a symbol used to transmit a corresponding PDCCH, the DM-RS is to be multiplexed with the PDSCH in a time division multiplexing (TDM) manner either before or after the PDSCH.

Example 122 includes a machine-readable medium including code which, when executed, is to cause a machine to perform the method of any one of Examples 99-118.

Example 123 includes an apparatus of a New Radio (NR) User Equipment (UE), the apparatus comprising a memory storing instructions, and processing circuitry to implement the instructions to: process a signal from a NR gNodeB including an indication of a multiplexing scheme for a downlink transmission and for a demodulation reference signal (DM-RS) corresponding to the downlink transmission, the downlink transmission including at least one of a physical downlink control channel (PDCCH) or a physical downlink shared channel (PDSCH); determine the multiplexing scheme from the indication in the signal; and process the downlink transmission based on the indication of the multiplexing scheme.

Example 124 includes the subject matter of Example 123, and optionally, wherein the signal including the indication of the multiplexing scheme is addressed to a plurality of NR User Equipments (UEs) including the NR UE.

Example 125 includes the subject matter of Example 123, and optionally, wherein the processing circuitry is to determine the multiplexing scheme such that, when the PDSCH is transmitted in a symbol different from a symbol used to transmit a corresponding PDCCH, the DM-RS is to be multiplexed with the PDSCH in a time division multiplexing (TDM) manner either before or after the PDSCH.

Example 126 includes the subject matter of Example 123, and optionally, wherein the processing circuitry is to determine from the signal that the multiplexing scheme such that the DM-RS is multiplexed with the downlink transmission in a frequency division multiplexing (FDM) manner and shares at least one symbol with the downlink transmission.

Example 127 includes the subject matter of Example 123, and optionally, wherein the processing circuitry is to determine from the signal that the multiplexing scheme is such that the DM-RS is multiplexed with the downlink transmission in a frequency division multiplexing (FDM) manner or in a time division multiplexing (TDM) manner.

Example 128 includes the subject matter of Example 127, and optionally, wherein the processing circuitry is to implicitly determine from the signal whether the FDM manner or the TDM manner is used based on at least one of a subcarrier spacing, a modulation and coding scheme (MCS), or an allocated bandwidth associated with the downlink transmission.

Example 129 includes the subject matter of Example 127, and optionally, wherein the processing circuitry is to process downlink control information (DCI) from the gNodeB to determine whether the FDM manner or the TDM manner is used.

Example 130 includes the subject matter of Example 123, and optionally, wherein the processing circuitry is to determine from the signal that the multiplexing scheme is such that, when the PDSCH is received in a same symbol as a corresponding PDCCH, the PDSCH and the corresponding PDCCH are multiplexed in an frequency division multiplexing (FDM) manner.

Example 131 includes the subject matter of Example 130, and optionally, wherein the PDSCH and the corresponding PDCCH span a single symbol, and wherein the DM-RS includes a dedicated DM-RS for the PDSCH and a dedicated DM-RS for the corresponding PDCCH.

Example 132 includes the subject matter of Example 130, and optionally, wherein: the PDSCH spans two or more symbols of allocated PDSCH resource; the corresponding PDCCH spans only a first symbol of the two or more symbols of the allocated PDSCH resource; and the DM-RS includes a dedicated DM-RS for the PDSCH and a dedicated DM-RS for the corresponding PDCCH, the dedicated DM-RS for the PDSCH received in allocated frequency resources of a first symbol of the two or more symbols where PDSCH and the corresponding PDCCH do not overlap in a frequency domain.

Example 133 includes the subject matter of Example 130, and optionally, wherein: the PDSCH spans two or more symbols of allocated PDSCH resource; the corresponding PDCCH spans only a first symbol of the two or more symbols of the allocated PDSCH resource; and the DM-RS includes a dedicated DM-RS for the PDSCH and a dedicated DM-RS for the corresponding PDCCH, the dedicated DM-RS for the PDSCH received in allocated frequency resources of a second symbol of the two or more symbols where PDSCH and the corresponding PDCCH overlap in a frequency domain.

Example 134 includes the subject matter of Example 130, and optionally, wherein: the PDSCH spans two or more symbols of allocated PDSCH resource; the corresponding PDCCH spans only a first symbol of the two or more symbols of the allocated PDSCH resource; and the DM-RS includes a dedicated DM-RS for the PDSCH, the dedicated DM-RS for the PDSCH received only in allocated frequency resources of a second symbol of the two or more symbols.

Example 135 includes the subject matter of Example 130, and optionally, wherein: the PDSCH and the corresponding span only two symbols of allocated PDSCH resource; and the DM-RS includes a dedicated DM-RS for the PDSCH and a dedicated DM-RS for the corresponding PDCCH, the dedicated DM-RS for the PDSCH received only in allocated frequency resources of a first symbol of the two symbols, the dedicated DM-RS for the PDCCH received one of: only in allocated frequency resources of the first symbol or in allocated frequency resources of the two symbols.

Example 136 includes the subject matter of Example 123, and optionally, wherein the processing circuitry is to determine from the signal that the multiplexing scheme is such that, when the PDSCH is received in a same symbol as a corresponding PDCCH, the PDSCH and the corresponding PDCCH are multiplexed in an spatial division multiplexing (SDM) manner or in a combination of a SDM manner and a frequency division multiplexing (FDM) manner.

Example 137 includes the subject matter of Example 136, and optionally, wherein the PDSCH is scheduled based on multiple layers transmission, and the PDCCH is received in one layer in a shared physical resource.

Example 138 includes the subject matter of Example 136, and optionally, wherein the DM-RS includes a shared DM-RS for both the PDSCH and the PDCCH on a shared resource.

Example 139 includes the subject matter of Example 123, and optionally, wherein the DM-RS includes a front-loaded DM-RS, and additional DM-RS, DM-RS symbols including the front-loaded DM-RS and the additional DM-RS being time bundled to yield time bundled DM-RS symbols, the processing circuitry to perform channel estimation based on the time bundled DM-RS symbols.

Example 140 includes the subject matter of Example 123, and optionally, further including a front-end module coupled to the processing circuitry.

Example 141 includes the subject matter of Example 140, and optionally, further including at least one antenna coupled to the front-end module.

Example 142 includes a method of operating an apparatus of a New Radio (NR) User Equipment (UE), the method comprising: processing a signal from a NR gNodeB including an indication of a multiplexing scheme for a downlink transmission and for a demodulation reference signal (DM-RS) corresponding to the downlink transmission, the downlink transmission including at least one of a physical downlink control channel (PDCCH) or a physical downlink shared channel (PDSCH); determining the multiplexing scheme from the indication in the signal; and processing the downlink transmission based on the indication of the multiplexing scheme.

Example 143 includes the subject matter of Example 142, and optionally, wherein the signal including the indication of the multiplexing scheme is addressed to a plurality of NR User Equipments (UEs) including the NR UE.

Example 144 includes the subject matter of Example 142, and optionally, wherein the method further includes determining the multiplexing scheme such that, when the PDSCH is transmitted in a symbol different from a symbol used to transmit a corresponding PDCCH, the DM-RS is to be multiplexed with the PDSCH in a time division multiplexing (TDM) manner either before or after the PDSCH.

Example 145 includes the subject matter of Example 142, and optionally, wherein the method further includes determining from the signal that the multiplexing scheme such that the DM-RS is multiplexed with the downlink transmission in a frequency division multiplexing (FDM) manner and shares at least one symbol with the downlink transmission.

Example 146 includes the subject matter of Example 142, and optionally, wherein the method further includes determining from the signal that the multiplexing scheme is such that the DM-RS is multiplexed with the downlink transmission in a frequency division multiplexing (FDM) manner or in a time division multiplexing (TDM) manner.

Example 147 includes the subject matter of Example 146, and optionally, wherein the method further includes implicitly determining from the signal whether the FDM manner or the TDM manner is used based on at least one of a subcarrier spacing, a modulation and coding scheme (MCS), or an allocated bandwidth associated with the downlink transmission.

Example 148 includes the subject matter of Example 146, and optionally, wherein the method further includes processing downlink control information (DCI) from the gNodeB to determine whether the FDM manner or the TDM manner is used.

Example 149 includes the subject matter of Example 142, and optionally, wherein the method further includes determining from the signal that the multiplexing scheme is such that, when the PDSCH is received in a same symbol as a corresponding PDCCH, the PDSCH and the corresponding PDCCH are multiplexed in an frequency division multiplexing (FDM) manner.

Example 150 includes the subject matter of Example 149, and optionally, wherein the PDSCH and the corresponding PDCCH span a single symbol, and wherein the DM-RS includes a dedicated DM-RS for the PDSCH and a dedicated DM-RS for the corresponding PDCCH.

Example 151 includes the subject matter of Example 149, and optionally, wherein: the PDSCH spans two or more symbols of allocated PDSCH resource; the corresponding PDCCH spans only a first symbol of the two or more symbols of the allocated PDSCH resource; and the DM-RS includes a dedicated DM-RS for the PDSCH and a dedicated DM-RS for the corresponding PDCCH, the dedicated DM-RS for the PDSCH received in allocated frequency resources of a first symbol of the two or more symbols where PDSCH and the corresponding PDCCH do not overlap in a frequency domain.

Example 152 includes the subject matter of Example 149, and optionally, wherein: the PDSCH spans two or more symbols of allocated PDSCH resource; the corresponding PDCCH spans only a first symbol of the two or more symbols of the allocated PDSCH resource; and the DM-RS includes a dedicated DM-RS for the PDSCH and a dedicated DM-RS for the corresponding PDCCH, the dedicated DM-RS for the PDSCH received in allocated frequency resources of a second symbol of the two or more symbols where PDSCH and the corresponding PDCCH overlap in a frequency domain.

Example 153 includes the subject matter of Example 149, and optionally, wherein: the PDSCH spans two or more symbols of allocated PDSCH resource; the corresponding PDCCH spans only a first symbol of the two or more symbols of the allocated PDSCH resource; and the DM-RS includes a dedicated DM-RS for the PDSCH, the dedicated DM-RS for the PDSCH received only in allocated frequency resources of a second symbol of the two or more symbols.

Example 154 includes the subject matter of Example 149, and optionally, wherein: the PDSCH and the corresponding span only two symbols of allocated PDSCH resource; and the DM-RS includes a dedicated DM-RS for the PDSCH and a dedicated DM-RS for the corresponding PDCCH, the dedicated DM-RS for the PDSCH received only in allocated frequency resources of a first symbol of the two symbols, the dedicated DM-RS for the PDCCH received one of: only in allocated frequency resources of the first symbol or in allocated frequency resources of the two symbols.

Example 155 includes the subject matter of Example 142, and optionally, wherein the method further includes determining from the signal that the multiplexing scheme is such that, when the PDSCH is received in a same symbol as a corresponding PDCCH, the PDSCH and the corresponding PDCCH are multiplexed in an spatial division multiplexing (SDM) manner or in a combination of a SDM manner and a frequency division multiplexing (FDM) manner.

Example 156 includes the subject matter of Example 155, and optionally, wherein the PDSCH is scheduled based on multiple layers transmission, and the PDCCH is received in one layer in a shared physical resource.

Example 157 includes the subject matter of Example 155, and optionally, wherein the DM-RS includes a shared DM-RS for both the PDSCH and the PDCCH on a shared resource.

Example 158 includes the subject matter of Example 142, and optionally, wherein the DM-RS includes a front-loaded DM-RS, and additional DM-RS, DM-RS symbols including the front-loaded DM-RS and the additional DM-RS being time bundled to yield time bundled DM-RS symbols, the method further includes performing channel estimation based on the time bundled DM-RS symbols.

Example 159 includes an apparatus of a New Radio (NR) User Equipment (UE), the apparatus comprising: means for processing a signal from a NR gNodeB including an indication of a multiplexing scheme for a downlink transmission and for a demodulation reference signal (DM-RS) corresponding to the downlink transmission, the downlink transmission including at least one of a physical downlink control channel (PDCCH) or a physical downlink shared channel (PDSCH); means for determining the multiplexing scheme from the indication in the signal; and means for processing the downlink transmission based on the indication of the multiplexing scheme.

Example 160 includes the subject matter of Example 159, and optionally, wherein the signal including the indication of the multiplexing scheme is addressed to a plurality of NR User Equipments (UEs) including the NR UE.

Example 161 includes a machine-readable medium including code which, when executed, is to cause a machine to perform the method of any one of Examples 142-158.

Example 162 includes an apparatus or method wherein an activation of multiple BWPs with the same numerology is not allowed.

Example 163 includes an apparatus or method wherein an activation of multiple BWPs with the same numerology with different slot durations is allowed.

Example 164 includes an apparatus or method wherein a UE is provided having a UE capability that allows a determination as to how many BWPs with different numerologies can be simultaneously supported, the UE being adapted to signal its UE capability.

Example 165 includes an apparatus or method wherein simultaneously activated BWPs are allowed to overlap or not allowed to overlap.

Example 166 includes an apparatus or method wherein an activation of multiple BWPs with different numerologies is allowed.

Example 167 includes an apparatus or method wherein an activation of multiple BWPs with different numerologies supported for a UE at the same time instance is allowed.

Example 168 includes an apparatus or method wherein an activation of multiple BWPs with different numerologies is allowed but not supported in the same time instance for a UE.

Example 169 includes the subject matter of Example 168, wherein semi-static TDM of multiple BWPs is used.

Example 170 includes the subject matter of Example 169, wherein the semi-static TDM pattern of multiple BWPs is signaled to the UE.

Example 171 includes the subject matter of Example 169, wherein, at a given time instance, the UE monitors only the PDCCH with the corresponding numerology.

Example 172 includes the subject matter of Example 168, wherein a UE is to monitor PDCCH within a default BWP, and wherein: if a switching command is received to switch to a signaled BWP among activated BWPs, the UE is to move to the signaled BWP, and if the UE has not been scheduled over some time period in the BWP, the UE is to go back to a default BWP, the switching command being in a PDCCH in the default BWP.

Example 173 includes the subject matter of Example 168, wherein a current slot is to indicate, e.g., via PDCCH, the BWP of the next slot among the activated BWPs.

Example 174 includes an apparatus or method where self-BWP scheduling is implemented when multiple BWPs are activated.

Example 175 includes the subject matter of Example 174, wherein each CORESET is configured for each BWP.

Example 176 includes the subject matter of Example 174; wherein self BWP scheduling includes the PDCCH and the correspondingly scheduled PDSCH being contained within the same BWP.

Example 177 includes an apparatus or method wherein cross-BWP scheduling is used when multiple BWPs are activated.

Example 178 includes the subject matter of Example 177, wherein a CORESET is configured on only one BWP and other activated BWPs do not have any CORESET.

Example 179 includes the subject matter of Example 178, wherein the PDCCH is sent in only one BWP, and PDSCH in other BWPs are scheduled by the PDCCH sent in the BWP having the configured CORESET.

Example 180 includes the subject matter of Example 178; The UE is configured such that a UE expects to receive PDCCH in one BWP but not PDSCH in the same BWP.

Example 181 includes the subject matter of Example 180, wherein the BWP ID is indicated in a DCI by the gNodeB.

Example 182 includes an apparatus or method wherein, if a UE supports multiple numerologies at a given time instance, a numerology, such as SCS or CP type, is used for a SS block where this numerology is different from a numerology of a BWP containing a frequency range for the SS block.

Example 183 includes an apparatus or method wherein, if a UE supports only a single numerology at a given time instance, the UE is not scheduled during the slots containing SS blocks with different numerologies.

Example 184 includes an apparatus or method wherein, if a UE supports only a single numerology at a given time instance, the UE is not configured for a BWP having a different numerology with respect to a numerology for an SS block.

Example 185 includes an apparatus comprising means to perform one or more elements of a method described in or related to any of the previous examples.

Example 186 includes one or more non-transitory computer-readable media comprising instructions to cause an electronic device, upon execution of the instructions by one or more processors of the electronic device, to perform one or more elements of a method described in or related to any of the previous examples.

Example 187 an apparatus comprising logic, modules, or circuitry to perform one or more elements of a method described in or related to any of the previous examples.

Example 188 may include a signal as described in or related to any of the previous examples.

Example 189 may include a signal in a wireless network as shown and described herein.

Example 190 may include a method of communicating in a wireless network as shown and described herein.

Example 191 may include a system for providing wireless communication as shown and described herein.

Example 192 may include a device for providing wireless communication as shown and described herein.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

What is claimed is:

1. A user equipment (UE), comprising:
a memory;
a transceiver; and
a processor coupled to the memory and the transceiver, wherein the processor is configured to execute instructions stored in the memory to cause the UE to:
receive, via the transceiver, bandwidth part (BWP) configuration information from a base station to configure a plurality of BWPs with different respective numerologies;
receive, via the transceiver, control information from the base station indicating a first BWP of the plurality of BWPs to be used for monitoring a physical downlink control channel (PDCCH);
receive, via the transceiver, a BWP switching command from the base station including a dynamic indication to switch from monitoring the first BWP to monitoring a second BWP;
stop monitoring the first BWP and begin monitoring the second BWP, in response to the BWP switching command;
receive, via the transceiver, a PDCCH transmission from the base station on the second BWP indicating scheduling information for a data transmission on a third BWP of the plurality of BWPs; and
receive, via the transceiver, the data transmission from the base station on the third BWP, wherein the second BWP and the third BWP have different numerologies.

2. The UE of claim 1, wherein the processor further causes the UE to:
receive, via the transceiver, a second PDCCH transmission from the base station on the second BWP indicating scheduling information for a data transmission on a fourth BWP of the plurality of BWPs; and
receive, via the transceiver, the data transmission from the base station on the fourth BWP.

3. The UE of claim 1, wherein the control information indicates a plurality of BWPs to be used for monitoring the PDCCH in a time division multiplexing (TDM) pattern, wherein the plurality of BWPs includes the second BWP.

4. The UE of claim 3, wherein the control information further indicates a plurality of periodicities and a plurality of time offsets corresponding to the plurality of BWPs respectively.

5. The UE of claim 3, wherein the indication of the plurality of BWPs includes a plurality of BWP indexes.

6. The UE of claim 1, wherein the PDCCH transmission includes a BWP index of the third BWP.

7. The UE of claim 1, wherein the processor further causes the UE to:
transmit, via the transceiver, UE capability information indicating a number of BWPs with different numerologies supported by the UE;
wherein BWP configuration information is based on the UE capability information.

8. The UE of claim 1, wherein the processor further causes the UE to:
in response to not receiving scheduling in the second BWP for a time period, stop monitoring the second BWP and return to monitoring the first BWP.

9. The UE of claim 1, wherein the processor further causes the UE to:
in response to not receiving scheduling in the second BWP for a time period, periodically switching between the second BWP and the first BWP to monitor the first BWP according to a configured periodicity.

10. A baseband processor of a user equipment (UE), comprising:
a memory; and
a processor coupled to the memory, wherein the processor is configured to execute instructions stored in the memory to cause the UE to:
receive bandwidth part (BWP) configuration information from a base station to configure a plurality of BWPs with different respective numerologies;
receive control information from the base station indicating a first BWP of the plurality of BWPs to be used for monitoring a physical downlink control channel (PDCCH);
receive a BWP switching command from the base station including a dynamic indication to switch from monitoring the first BWP to monitoring a second BWP;
stop monitoring the first BWP and begin monitoring the second BWP in response to the BWP switching command;
receive a PDCCH transmission from the base station on the second BWP indicating scheduling information for a data transmission on a third BWP of the plurality of BWPs; and
receive the data transmission from the base station on the third BWP, wherein the second BWP and the third BWP have different numerologies.

11. The baseband processor of claim 10, wherein the processor further causes the UE to:
receive a second PDCCH transmission from the base station on the second BWP indicating scheduling information for a data transmission on a fourth BWP of the plurality of BWPs; and
receive the data transmission from the base station on the fourth BWP.

12. The baseband processor of claim 10, wherein the control information indicates a plurality of BWPs to be used for monitoring the PDCCH in a time division multiplexing (TDM) pattern, wherein the plurality of BWPs includes the second BWP.

13. The baseband processor of claim 12, wherein the control information further indicates a plurality of periodicities and a plurality of time offsets corresponding to the plurality of BWPs respectively.

14. The baseband processor of claim 12, wherein the indication of the plurality of BWPs includes a plurality of BWP indexes.

15. The baseband processor of claim 10, wherein the PDCCH transmission includes a BWP index of the third BWP.

16. A method to be performed by a user equipment (UE), comprising:
- receiving bandwidth part (BWP) configuration information from a base station to configure a plurality of BWPs with different respective numerologies;
- receiving control information from the base station indicating a first BWP of the plurality of BWPs to be used for monitoring a physical downlink control channel (PDCCH);
- receiving a BWP switching command from the base station including a dynamic indication to switch from monitoring the first BWP to monitoring a second BWP;
- stopping monitoring of the first BWP and beginning monitoring of the second BWP in response to the BWP switching command;
- receiving a PDCCH transmission from the base station on the second BWP indicating scheduling information for a data transmission on a third BWP of the plurality of BWPs; and
- receiving the data transmission from the base station on the third BWP, wherein the second BWP and the third BWP have different numerologies.

17. The method of claim 16, further comprising:
- receiving a second PDCCH transmission from the base station on the second BWP indicating scheduling information for a data transmission on a fourth BWP of the plurality of BWPs; and
- receiving the data transmission from the base station on the fourth BWP.

18. The method of claim 16, wherein the control information indicates a plurality of BWPs to be used for monitoring the PDCCH in a time division multiplexing (TDM) pattern, wherein the plurality of BWPs includes the second BWP.

19. The method of claim 18, wherein the control information further indicates a plurality of periodicities and a plurality of time offsets corresponding to the plurality of BWPs respectively.

20. The method of claim 16, wherein the PDCCH transmission includes a BWP index of the third BWP.

* * * * *